(12) United States Patent
Hata et al.

(10) Patent No.: US 6,760,480 B2
(45) Date of Patent: Jul. 6, 2004

(54) APPARATUS AND METHOD OF ENCODING AN IMAGE USING A STATISTICAL MODEL BASED ON PIXELS

(75) Inventors: Koichi Hata, Sakai (JP); Minoru Etoh, Katano (JP); Takeshi Ankei, Nara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 83 days.

(21) Appl. No.: 10/293,182

(22) Filed: Nov. 13, 2002

(65) Prior Publication Data

US 2003/0086621 A1 May 8, 2003

Related U.S. Application Data

(62) Division of application No. 09/846,164, filed on May 1, 2001, now Pat. No. 6,510,250, which is a division of application No. 09/846,725, filed on May 1, 2001, now Pat. No. 6,490,373, which is a division of application No. 09/230,755, filed on Feb. 1, 1999, now Pat. No. 6,404,932.

(30) Foreign Application Priority Data

Jul. 31, 1996 (JP) .............................................. 8-202346
Sep. 30, 1996 (JP) .............................................. 8-258077
Oct. 22, 1996 (JP) .............................................. 8-279170

(51) Int. Cl.[7] ............................ G06K 9/36; G06K 9/46; H04N 7/12

(52) U.S. Cl. ....................... 382/239; 382/236; 382/243; 375/240.25

(58) Field of Search ................................. 382/236, 250, 382/232, 239, 243, 233; 375/240.14, 240.02, 240, 13, 240.12, 240.25, 240.01; 348/416.1, 699

(56) References Cited

U.S. PATENT DOCUMENTS

| 4,901,363 A | 2/1990 | Toyokawa ................... 382/239 |
| 5,124,811 A | 6/1992 | Ohsawa et al. .............. 358/448 |

(List continued on next page.)

FOREIGN PATENT DOCUMENTS

| EP | 0597733 | 5/1994 | .......... H04N/1/417 |
| EP | 0 711 078 | 5/1996 | .......... H04N/7/26 |
| JP | 62-29372 | 2/1987 | .......... H04N/1/417 |
| JP | 2-65371 | 3/1990 | .......... H04N/1/417 |
| JP | 2-274080 | 11/1990 | .......... H04N/7/137 |
| JP | 04035469 A | * 2/1992 | ............ H04N/1/41 |
| JP | 6-225274 | 8/1994 | .......... H04N/7/13 |
| JP | 7-254990 | 10/1995 | .......... H04N/1/411 |
| JP | 8-140085 | 5/1996 | ............ H04N/7/24 |

OTHER PUBLICATIONS

Japanese Office Action corresponding to application No. JP 9–204018 (w/English translation).

(List continued on next page.)

*Primary Examiner*—Wenpeng Chen
(74) *Attorney, Agent, or Firm*—RatnerPrestia

(57) ABSTRACT

A decoder decodes encoded binary image data on each block in order to recover a target block of the binary image. The image decoder includes motion compensated blocking which obtains a reference block from a reference binary image by applying motion compensation using motion information. A selector selects a statistical model from among a plurality of statistical models, based on states of pixels surrounding a reference pixel in the reference block, in which the reference pixel also corresponds to a target pixel in the target block. An arithmetic decoder recovers the target block by decoding the encoded data using the selected statistical model. In one embodiment, the pixels surrounding the reference pixel in the reference block are pixels positioned within one pixel distance from the reference pixel.

15 Claims, 59 Drawing Sheets

U.S. PATENT DOCUMENTS

| | | | | |
|---|---|---|---|---|
| 5,295,201 A | | 3/1994 | Yokohama | 382/236 |
| 5,317,411 A | | 5/1994 | Yoshida | 382/232 |
| 5,363,219 A | | 11/1994 | Yoshida | 358/539 |
| 5,442,458 A | | 8/1995 | Rabbani et al. | 382/247 |
| 5,471,207 A | | 11/1995 | Zandi et al. | 341/107 |
| 5,486,863 A | | 1/1996 | Auyeung et al. | 375/240.24 |
| 5,608,458 A | | 3/1997 | Chen et al. | 375/240.14 |
| 5,659,631 A | * | 8/1997 | Gormish et al. | 382/166 |
| 5,689,589 A | | 11/1997 | Gormish et al. | 382/239 |
| 5,768,438 A | | 6/1998 | Etoh | 382/251 |
| 5,815,601 A | | 9/1998 | Katata et al. | 382/232 |
| 5,848,194 A | * | 12/1998 | Ishizuka et al. | 382/234 |
| 6,115,501 A | | 9/2000 | Chun et al. | 382/250 |

OTHER PUBLICATIONS

Japanese Office Action corresponding to application No. JP 2001–105135 (w/English translation).

Japanese Office Action corresponding to application No. JP 2001–105136 (w/English translation).

Japanese Office Action corresponding to application No. JP 2001–105137 (w/English translation).

Ramaswamy et al., "Multiprocessor DSP Architectures that Implement the FCT Based JPEG Still Picture Image Compression Algorithm with Arithmetic Coding," Oct. 20, 1992, pp. 1–5.

European Search Report, Application No. 01107748.4, dated Sep. 26, 2001.

European Search Report, Application No. 01107748.7, dated Sep. 26, 2001.

"A simple and efficient binary shape coding technique based on bitmap representation," Bossen et al, 1997 International Conference on Acoustics, Speech, and Signal Processing, vol. 4, 1977, pp. 3129–3132.

"Binary Shape Coding Using Baseline–based Method," Lee et al., IEEE Transactions on Circuits and Systems for Video Technology, vol. 9, No. 1, Feb., 1999, pp. 44–58.

"A region based motion compensated video codes for very low bitrate applications," Ebrahimi et al., IEEE 1995 International Symposium on Circuits and Systems, vol. 1, 1995, pp. 457–461.

"MPEG–4 video verification model version 1.0," ISO/IEC JTC1/SC29/WG11, Jan. 1996.

"Very low bit rate video coding using arbitrarily shaped region–based motion compensation," Yokoyama et al., IEEE Transactions on Circuits and Systems for Video Technology, vol. 5, No. 6, Dec. 1995, pp. 500–507.

Search Report for Application No. PCT/JP97/02591, dated Nov. 18, 1997.

Mizuki, M. M. et al., "A Binary Block Matching Architecture with Reduced Power Consumsption and Silicon Area Requirement," IEEE International Conference, vol. CONF. 21, May 7, 1996, pp. 3248–3251, XP000681747.

European Search Report for Application No. EP 97933029, dated Oct. 6, 2000.

"Coding of Arbitrarily shaped objects with binary and greyscale alpha–maps: what can MPEG–4 do for you?" Ostermann, Proceedings of the 1998 IEEE International Symposium on Circuits and Systems, vol. 5, 1998, pp. V–273–V–276.

* cited by examiner

Fig. 20
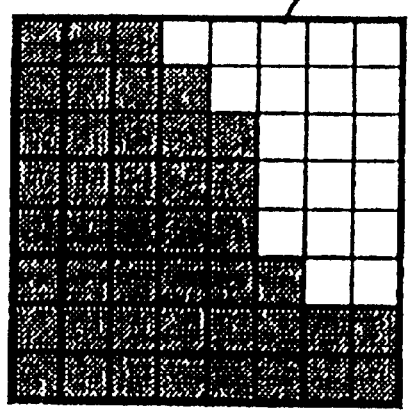
REFERENCE BLOCK
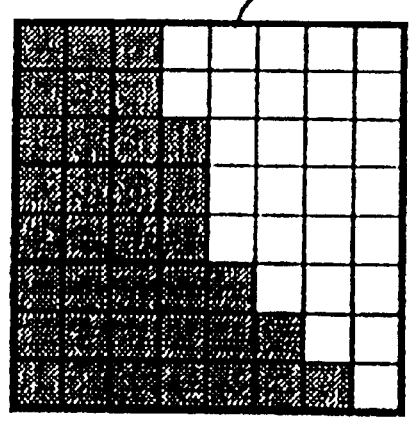
TARGET BLOCK
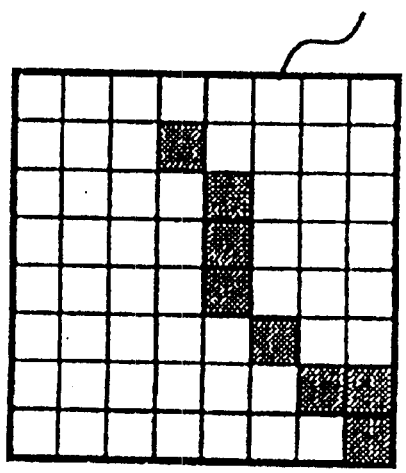
EXCLUSIVE OR BLOCK

Fig. 23

| INDEX | STATISTICAL MODEL SYMBOL 0 | STATISTICAL MODEL SYMBOL 1 | INDEX | STATISTICAL MODEL SYMBOL 0 | STATISTICAL MODEL SYMBOL 1 |
|---|---|---|---|---|---|
| 0 | 0.9 | 0.1 | 16 | 0.8 | 0.2 |
| 1 | 0.8 | 0.2 | 17 | 0.7 | 0.3 |
| 2 | 0.8 | 0.2 | 18 | 0.7 | 0.3 |
| 3 | 0.7 | 0.3 | 19 | 0.6 | 0.4 |
| 4 | 0.8 | 0.2 | 20 | 0.7 | 0.3 |
| 5 | 0.7 | 0.3 | 21 | 0.6 | 0.4 |
| 6 | 0.7 | 0.3 | 22 | 0.6 | 0.4 |
| 7 | 0.6 | 0.4 | 23 | 0.4 | 0.6 |
| 8 | 0.8 | 0.2 | 24 | 0.7 | 0.3 |
| 9 | 0.7 | 0.3 | 25 | 0.6 | 0.4 |
| 10 | 0.7 | 0.3 | 26 | 0.6 | 0.4 |
| 11 | 0.6 | 0.4 | 27 | 0.4 | 0.6 |
| 12 | 0.7 | 0.3 | 28 | 0.6 | 0.4 |
| 13 | 0.6 | 0.4 | 29 | 0.4 | 0.6 |
| 14 | 0.6 | 0.4 | 30 | 0.4 | 0.6 |
| 15 | 0.4 | 0.6 | 31 | 0.3 | 0.7 |

2301 STATISTICAL MODEL TABLE

Fig. 24

| INDEX | STATISTICAL MODEL | | INDEX | STATISTICAL MODEL | |
|---|---|---|---|---|---|
| | SYMBOL 0 | SYMBOL 1 | | SYMBOL 0 | SYMBOL 1 |
| 32 | 0.8 | 0.2 | 48 | 0.7 | 0.3 |
| 33 | 0.7 | 0.3 | 49 | 0.6 | 0.4 |
| 34 | 0.7 | 0.3 | 50 | 0.6 | 0.4 |
| 35 | 0.6 | 0.4 | 51 | 0.4 | 0.6 |
| 36 | 0.7 | 0.3 | 52 | 0.6 | 0.4 |
| 37 | 0.6 | 0.4 | 53 | 0.4 | 0.6 |
| 38 | 0.6 | 0.4 | 54 | 0.4 | 0.6 |
| 39 | 0.4 | 0.6 | 55 | 0.3 | 0.7 |
| 40 | 0.7 | 0.3 | 56 | 0.6 | 0.4 |
| 41 | 0.6 | 0.4 | 57 | 0.4 | 0.6 |
| 42 | 0.6 | 0.4 | 58 | 0.4 | 0.6 |
| 43 | 0.4 | 0.6 | 59 | 0.3 | 0.7 |
| 44 | 0.6 | 0.4 | 60 | 0.4 | 0.6 |
| 45 | 0.4 | 0.6 | 61 | 0.3 | 0.7 |
| 46 | 0.4 | 0.6 | 62 | 0.3 | 0.7 |
| 47 | 0.3 | 0.7 | 63 | 0.2 | 0.8 |

2301 STATISTICAL MODEL TABLE

Fig. 25

| INDEX | STATISTICAL MODEL | | INDEX | STATISTICAL MODEL | |
|---|---|---|---|---|---|
| | SYMBOL 0 | SYMBOL 1 | | SYMBOL 0 | SYMBOL 1 |
| 64 | 0.8 | 0.2 | 80 | 0.7 | 0.3 |
| 65 | 0.7 | 0.3 | 81 | 0.6 | 0.4 |
| 66 | 0.7 | 0.3 | 82 | 0.6 | 0.4 |
| 67 | 0.6 | 0.4 | 83 | 0.4 | 0.6 |
| 68 | 0.7 | 0.3 | 84 | 0.6 | 0.4 |
| 69 | 0.6 | 0.4 | 85 | 0.4 | 0.6 |
| 70 | 0.6 | 0.4 | 86 | 0.4 | 0.6 |
| 71 | 0.4 | 0.6 | 87 | 0.3 | 0.7 |
| 72 | 0.7 | 0.3 | 88 | 0.6 | 0.4 |
| 73 | 0.6 | 0.4 | 89 | 0.4 | 0.6 |
| 74 | 0.6 | 0.4 | 90 | 0.4 | 0.6 |
| 75 | 0.4 | 0.6 | 91 | 0.3 | 0.7 |
| 76 | 0.6 | 0.4 | 92 | 0.4 | 0.6 |
| 77 | 0.4 | 0.6 | 93 | 0.3 | 0.7 |
| 78 | 0.4 | 0.6 | 94 | 0.3 | 0.7 |
| 79 | 0.3 | 0.7 | 95 | 0.2 | 0.8 |

2301 STATISTICAL MODEL TABLE

Fig. 26

| INDEX | STATISTICAL MODEL | | INDEX | STATISTICAL MODEL | |
|---|---|---|---|---|---|
| | SYMBOL 0 | SYMBOL 1 | | SYMBOL 0 | SYMBOL 1 |
| 96 | 0.7 | 0.3 | 112 | 0.6 | 0.4 |
| 97 | 0.6 | 0.4 | 113 | 0.4 | 0.6 |
| 98 | 0.6 | 0.4 | 114 | 0.4 | 0.6 |
| 99 | 0.4 | 0.6 | 115 | 0.3 | 0.7 |
| 100 | 0.6 | 0.4 | 116 | 0.4 | 0.6 |
| 101 | 0.4 | 0.6 | 117 | 0.3 | 0.7 |
| 102 | 0.4 | 0.6 | 118 | 0.3 | 0.7 |
| 103 | 0.3 | 0.7 | 119 | 0.2 | 0.8 |
| 104 | 0.6 | 0.4 | 120 | 0.4 | 0.6 |
| 105 | 0.4 | 0.6 | 121 | 0.3 | 0.7 |
| 106 | 0.4 | 0.6 | 122 | 0.3 | 0.7 |
| 107 | 0.3 | 0.7 | 123 | 0.2 | 0.8 |
| 108 | 0.4 | 0.6 | 124 | 0.3 | 0.7 |
| 109 | 0.3 | 0.7 | 125 | 0.2 | 0.8 |
| 110 | 0.3 | 0.7 | 126 | 0.2 | 0.8 |
| 111 | 0.2 | 0.8 | 127 | 0.1 | 0.9 |

2301 STATISTICAL MODEL TABLE

2601
CONVERSION GRAPH

Fig. 40

| ANGLE | WINDOW (○: REFERENCE POINT) |
|---|---|
| $0° \leq \theta < 22.5°$<br>$157.5° \leq \theta < 202.5°$<br>$337.5° \leq \theta < 360°$ | ▭◯▭ (horizontal) |
| $22.5° \leq \theta < 67.5°$<br>$202.5° \leq \theta < 247.5°$ | diagonal (up-right) |
| $67.5° \leq \theta < 112.5°$<br>$247.5° \leq \theta < 292.5°$ | vertical |
| $112.5° \leq \theta < 157.5°$<br>$292.5° \leq \theta < 337.5°$ | diagonal (down-right) |

Fig. 41

| NORMALIZED AVERAGE GRADIENT | SMOOTHING FILTER |
|---|---|
| $d_{ave} \geq 191$ | NO SMOOTHING |
| $106 \leq d_{ave} < 191$ | SMOOTHING FILTER 1 |
| $74 \leq d_{ave} < 106$ | SMOOTHING FILTER 2 |
| $10 \leq d_{ave} < 74$ | SMOOTHING FILTER 3 |
| $d_{ave} < 10$ | NO SMOOTHING |

Fig. 49

| NORMALIZED AVERAGE GRADIENT | SMOOTHING FILTER |
|---|---|
| $d_{ave} \geq 191$ | NO SMOOTHING |
| $106 \leq d_{ave} < 191$ | SMOOTHING FILTER STEP 2 |
| $74 \leq d_{ave} < 106$ | SMOOTHING FILTER STEP 3 |
| $10 \leq d_{ave} < 74$ | SMOOTHING FILTER STEP 4 |
| $d_{ave} < 10$ | NO SMOOTHING |

SMOOTHING FILTER STEP 2     SMOOTHING FILTER STEP 3     SMOOTHING FILTER STEP 4

| | 11404 |
|---|---|
| $a_1$  $b_1$  $c_1$  $d_1$ | $1/4$ |
| $a_2$  $b_2$  $c_2$  $d_2$  $e_2$  $f_2$  $g_2$  $h_2$  $i_2$ | $1/9$ |
| $a_3$  $b_3$  $c_3$  $d_3$  $e_3$  $f_3$  $g_3$  $h_3$  $i_3$ <br> $k_3$  $l_3$  $p_3$  $o_3$  $n_3$  $m_3$ | $1/16$ |

SMOOTHING FILTER COEFFICIENT TABLE

MORPHOLOGICAL FILTER 1    MORPHOLOGICAL FILTER 2    MORPHOLOGICAL FILTER 3

SMOOTHING FILTER          SCALE

SMOOTHING PATTERN

FIRST STAGE OF SMOOTHING

SECOND STAGE OF SMOOTHING

APPARATUS AND METHOD OF ENCODING AN IMAGE USING A STATISTICAL MODEL BASED ON PIXELS This application is a division of U.S. patent application Ser. No. 09/846,164, filed May 1, 2001, now U.S. Pat. No. 6,510,250, which is a division of Ser. No. 09/846,725, filed May 1, 2001, now U.S. Pat. No. 6,490,373 which is a divisional of Ser. No. 09/230,755, filed Feb. 1, 1999, now U.S. Pat. No. 6,404,932.

TECHNICAL FIELD

The present invention relates to an image encoding apparatus, an image decoding apparatus, an image encoding method, an image decoding method, and a medium, which may be utilized for the transmission and storage of images.

BACKGROUND ART

When compositing images, there are cases where information called an alpha value indicating the overlay area and the degree of transparency of an object is appended in addition to the luminance of the object. The alpha value is determined for each pixel, an alpha value of 1 indicating complete opacity or occlusion and an alpha value of 0 complete transparency or nonocclusion. Alpha values become necessary when overlaying an image of an object onto a background image. Hereinafter, an image represented only by such alpha values is called an alpha plane.

In the case of a cloud, frosted glass, etc., an alpha value intermediate between [0, 1] may be used to represent the image, but there are cases where two values {0, 1} are sufficient.

For the encoding of a conventional binary alpha plane, binary image coding techniques such as MR and MMR, defined in CCITT's international standards traditionally used for facsimile systems, etc., or coding techniques standardized by JBIG can be used. These coding schemes are referred to generically as binary still image coding. In binary still image coding, efficient coding can be achieved by predicting a low order pixel from a high order pixel in the scanning direction and by entropy-encoding the difference between them.

In a binary moving image, such as two successive alpha planes of a moving image, correlation between successive frames can be utilized. That is, efficient coding can be achieved by predicting a pixel to be encoded, from a previously obtained binary image having high correlation, and by encoding the difference between them, rather than predicting a low-order pixel from a high-order pixel in the scanning direction and encoding the difference between them.

However, binary still image coding in the prior art has exploited only the correlation between the high-order and low-order pixels in the scanning direction even when a binary image having high correlation with the binary image to be encoded or decoded is obtained at the encoder or decoder, and hence the prior art has had the problem that a large number of code bits are required.

For the encoding of a conventional alpha plane, waveform coding is used, as is done in the JPEG coding scheme.

However, many alpha planes have the property that most portions are uniform and intermediate values are distributed along the boundary.

Since such alpha planes contain high frequency components along the boundary, the waveform coding as employed in the prior art has had the problem that efficient coding is difficult to achieve.

DISCLOSURE OF THE INVENTION

In view of the above-described problems of the prior art, it is an object of the present invention to provide an image encoding apparatus, an image decoding apparatus, an image encoding method, an image decoding method, and a medium having recorded thereon a program which causes a computer to carry out their processing operations, wherein a pixel to be encoded is predicted from a previously obtained binary image having high correlation, and the difference between them is encoded, thereby achieving more efficient encoding and decoding than can be achieved with the binary image encoding and decoding techniques used in the prior art.

In view of the above-described problems, it is also an object of the present invention to provide an image encoding apparatus and its corresponding decoding apparatus, an image encoding method and its corresponding decoding method, and media storing their execution programs, wherein the distribution of intermediate values is analyzed, and a smoothing function approximating the distribution and a binary base image having only two values, a maximum value and a minimum value, are encoded respectively, thereby achieving more efficient coding than the prior art.

An aspect of present invention is an image encoding apparatus comprising: blocking means 1 for taking as an input a target binary image to be encoded, and for obtaining a target block by dividing said target binary image into blocks each containing a plurality of pixels; blocking means 2 for obtaining a reference block by dividing a previously obtained reference binary image into blocks each containing a plurality of pixels;

exclusive OR block constructing means for constructing an exclusive OR block by sequentially scanning said target block and said reference block and by exclusive-ORing pixel values between said two blocks; and exclusive OR encoding means for generating a coded sequence representative of the results of said exclusive-ORing, and for outputting the same as encoded data.

Another aspect of present invention is an image decoding apparatus comprising: blocking means 2 for obtaining a reference block by dividing a previously obtained reference binary image into blocks each containing a plurality of pixels; exclusive OR decoding means for recovering said exclusive OR block by decoding the encoded data encoded by the image encoding apparatus; and target block constructing means for constructing a target block by combining said exclusive OR block with said reference block.

Another aspect of present invention is an image encoding apparatus comprising: blocking means 1 for taking as an input a target binary image to be encoded, and for obtaining a target block by dividing said target binary image into blocks each containing a plurality of pixels; blocking means 2 for obtaining a reference block by dividing a previously obtained reference binary image into blocks each containing a plurality of pixels;

statistical model selecting means for selecting a statistical model from among a plurality of statistical models, based on the states of pixels surrounding a reference pixel in said reference block, said reference pixel corresponding to a target pixel in said target block; and entropy encoding means for entropy-encoding said target pixel based on said selected statistical model, and for outputting the same as encoded data.

Still another aspect of present invention is an image decoding apparatus comprising: blocking means 2 for obtaining a reference block by dividing a previously obtained reference binary image into blocks each containing a plurality of pixels; statistical model selecting means for selecting a statistical model from among a plurality of statistical models, based on the states of pixels surrounding a reference pixel in said reference block, said reference pixel corresponding to a target pixel in said target block; and entropy decoding means for recovering said target block by entropy-decoding, based on said selected statistical model, the encoded data output from the image encoding apparatus.

Still another aspect of the present invention is an image encoding apparatus, further comprising: motion estimating means for searching through said reference binary image for a block that most resembles said target block, and for obtaining motion information from the result of said searching, and wherein: said blocking means 2 is a motion compensated blocking means 2 which obtains a reference block by applying motion compensation to said reference binary image using said motion information, and said motion information also is output from said image encoding apparatus.

Still another aspect of the present invention is an image decoding apparatus, wherein said blocking means 2 is a motion compensated blocking means 2 which obtains a reference block by applying motion compensation to said previously obtained reference binary image using the motion information output from the image encoding apparatus.

Still another aspect of present invention is an image encoding apparatus, further comprising: reference block adoption determining means for comparing said target block with said reference block, and for determining, based on the result of said comparison, whether said reference block is to be adopted or not, and thereby switching the remainder of processing between various means; and target pixel encoding means for generating a coded sequence representative of pixel values in said target block, and for outputting the same as encoded data, and wherein: when said reference block adoption determining means determines that said reference block is to be adopted, said entropy encoding means and said statistical model selecting means are operated so that said encoded data from said entropy encoding means is output, while on the other hand, when it is determined that said reference block is not to be adopted, said target pixel encoding means is operated so that said encoded data from said target pixel encoding means is output, and the result of the determination as to whether said reference block is to be adopted or not is output as a reference block adoption determining signal.

Still another aspect of the present invention is an image decoding apparatus, further comprising: reference block adoption control means for determining, based on the reference block adoption determining signal output from the image encoding apparatus, whether said reference block is to be adopted or not, and thereby switching the remainder of processing between various means; and target pixel decoding means for recovering said target block by decoding said encoded data output from said image encoding apparatus, and wherein: when said reference block adoption control means determines that said reference block is to be adopted, said entropy decoding means and said statistical model selecting means are operated so that said target block from said entropy decoding means is output, while on the other hand, when it is determined that said reference block is not to be adopted, said target pixel decoding means is operated so that said target block from said target pixel decoding means is output.

Still another aspect of the present invention is an image encoding apparatus comprising: blocking means 1 for taking as an input a target binary image to be encoded, and for obtaining a target block by dividing said target binary image into blocks each containing a plurality of pixels; blocking means 2 for obtaining a reference block by dividing a previously obtained reference binary image into blocks each containing a plurality of pixels; statistical model generating means for generating a statistical model for a target pixel from said reference block; and entropy encoding means for entropy-encoding said target pixel based on said generated statistical model, and for outputting the same as encoded data.

Still another aspect of present invention is an image decoding apparatus comprising: blocking means 2 for obtaining a reference block by dividing a previously obtained reference binary image into blocks each containing a plurality of pixels; statistical model generating means for generating a statistical model for a target pixel from said reference block; and entropy decoding means for recovering said target block by entropy-decoding, based on said generated statistical model, the encoded data output from the image encoding apparatus.

Still another aspect of the present invention is an image encoding method comprising the steps of: taking as an input a target binary image to be encoded, and obtaining a target block by dividing said target binary image into blocks each containing a plurality of pixels; obtaining a reference block by dividing a previously obtained reference binary image into blocks each containing a plurality of pixels; constructing an exclusive OR block by sequentially scanning said target block and said reference block and by exclusive-ORing pixel values between said two blocks; and generating a coded sequence representative of the results of said exclusive-ORing, and outputting the same as encoded data.

Still another aspect of the present invention is an image decoding method comprising the steps of: obtaining a reference block by dividing a previously obtained reference binary image into blocks each containing a plurality of pixels; taking the encoded data encoded by the image encoding method as an input, and recovering said exclusive OR block by decoding said encoded data; and constructing a target block by combining said exclusive OR block with said reference block.

Still another aspect of the present invention is an image encoding method comprising: blocking step 1 for taking as an input a target binary image to be encoded, and for obtaining a target block by dividing said target binary image into blocks each containing a plurality of pixels; blocking step 2 for obtaining a reference block by dividing a previously obtained reference binary image into blocks each containing a plurality of pixels; statistical model selecting step for selecting a statistical model from among a plurality of statistical models, based on the states of pixels surrounding a reference pixel in said reference block, said reference pixel corresponding to a target pixel in said target block; and entropy encoding step for entropy-encoding said target pixel based on said selected statistical model, and for outputting the same as encoded data.

Still another aspect of the present invention is an image decoding method comprising: blocking step 2 for obtaining a reference block by dividing a previously obtained reference binary image into blocks each containing a plurality of pixels; statistical model selecting step for selecting a statistical model from among a plurality of statistical models, based on the states of pixels surrounding a reference pixel in said reference block, said reference pixel corresponding to a target pixel in said target block; and entropy decoding step for recovering said target block by entropy-decoding, based on said selected statistical model, the encoded data output in accordance with the image encoding method.

Still another aspect of the present invention is an image encoding method, further comprising: motion estimating step for searching through said reference binary image for a block that most resembles said target block, and for obtaining motion information from the result of said searching, and wherein: said blocking step 2 is a motion compensated blocking step 2 which obtains a reference block by applying motion compensation to said reference binary image using said motion information, and said motion information also is output from said image encoding method.

Still another aspect of the present invention of claim 31 is an image decoding method, wherein said blocking step 2 is a motion compensated blocking step 2 which obtains a reference block by applying motion compensation to said previously obtained reference binary image using the motion information output in accordance with the image encoding method.

Still another aspect of the present invention is an image encoding method, further comprising: reference block adoption determining step for comparing said target block with said reference block, and for determining, based on the result of said comparison, whether said reference block is to be adopted or not, and thereby switching the execution of subsequent steps; and target pixel encoding step for generating a coded sequence representative of pixel values in said target block, and for outputting the same as encoded data, and wherein: when it is determined in said reference block adoption determining step that said reference block is to be adopted, said entropy encoding step and said statistical model selecting step are executed so that said encoded data from said entropy encoding step is output, while on the other hand, when it is determined that said reference block is not to be adopted, said target pixel encoding step is executed so that said encoded data from said target pixel encoding step is output, and the result of the determination as to whether said reference block is to be adopted or not is output as a reference block adoption determining signal.

Still another aspect of the present invention is an image decoding method, further comprising: reference block adoption control step for determining, based on the reference block adoption determining signal output in accordance with the image encoding method, whether said reference block is to be adopted or not, and thereby switching the execution of subsequent steps; and target pixel decoding step for recovering said target block by decoding said encoded data output in accordance with said image encoding method, and wherein: when it is determined in said reference block adoption control step that said reference block is to be adopted, said entropy decoding step and said statistical model selecting step are executed so that said target block from said entropy decoding step is output, while on the other hand, when it is determined that said reference block is not to be adopted, said target pixel decoding step is executed so that said target block from said target pixel decoding step is output.

Still another aspect of the present invention is an image encoding method comprising the steps of: taking as an input a target binary image to be encoded, and obtaining a target block by dividing said target binary image into blocks each containing a plurality of pixels; obtaining a reference block by dividing a previously obtained reference binary image into blocks each containing a plurality of pixels; generating a statistical model for a target pixel from said reference block; and entropy-encoding said target pixel based on said generated statistical model, and outputting the same as encoded data.

Still another aspect of the present invention is an image decoding method comprising: obtaining a reference block by dividing a previously obtained reference binary image into blocks each containing a plurality of pixels; generating a statistical model for a target pixel from said reference block; and recovering said target block by entropy-decoding, based on said generated statistical model, the encoded data output in accordance with the image encoding method.

Still another aspect of the present invention is an image encoding apparatus comprising: multi-value to binary converting means for taking a target multi-value image to be encoded and a smoothing function as inputs, and for generating a binary image from said multi-value image on the basis of said smoothing function; binary image encoding means for encoding said binary image, and for outputting the same as binary image encoded data; and smoothing function encoding means for encoding said smoothing function, and for outputting the same as smoothing function encoded data, and wherein: said smoothing function is a function so adjusted that the original multi-value image could, in effect, be reproduced if said smoothing function were applied to said binary image.

Still another aspect of the present invention is an image encoding apparatus comprising: smoothing function estimating means for estimating a smoothing function from a target multi-value image to be encoded; multi-value to binary converting means for converting said multi-value image to a binary image based on a multi-value to binary conversion criterion determined to match said estimated smoothing function; binary image encoding means for encoding said binary image, and for outputting the same as binary image encoded data; and smoothing function encoding means for encoding said estimated smoothing function, and for outputting the same as smoothing function encoded data.

Still another aspect of the present invention is an image encoding apparatus comprising: multi-value to binary converting means for generating a binary image from a target multi-value image to be encoded; binary image encoding means for encoding said binary image, and for outputting the same as binary image encoded data; smoothing function generating means for generating a smoothing function from said binary image and said target multi-value image; and smoothing function encoding means for encoding said smoothing function, and for outputting the same as smoothing function encoded data.

Still another aspect present invention is an image encoding apparatus, wherein said smoothing function is expressed using one or more tables consisting of binarization patterns of neighboring pixels and substitution values corresponding to said patterns.

Still another aspect of the present invention is an image encoding apparatus, further comprising: binary to multi-value converting means for generating a multi-value image by smoothing said binary image using said smoothing function; and residual component encoding means for encoding a residual component existing between the multi-value image generated by said binary to multi-value converting means and said target multi-value image input for conversion by said multi-value to binary converting means.

Still another aspect of the present invention is an image encoding apparatus comprising: multi-value to binary converting means for converting a multi-value image, which is a target image to be encoded, to a binary image based on a multi-value to binary conversion criterion determined to match said multi-value image; smoothing function estimating means for estimating a smoothing function such that the original multi-value image could, in effect, be reproduced if said smoothing function were applied to said binary image; binary image encoding means for encoding said binary image, and for outputting the same as binary image encoded data; and smoothing function encoding means for encoding said estimated smoothing function, and for outputting the same as smoothing function encoded data.

Still another aspect of the present invention is an image decoding apparatus comprising: means for receiving as inputs thereto the various encoded data encoded by the image encoding apparatus; binary image decoding means for recovering said binary image by decoding said binary image encoded data out of said encoded data; smoothing function decoding means for recovering said smoothing function by decoding said smoothing function encoded data out of said encoded data; and binary to multi-value converting means for recovering said multi-value image by smoothing said decoded binary image using said decoded smoothing function.

Still another aspect of the present invention is an image decoding apparatus comprising: means for receiving as inputs thereto the various encoded data encoded by the image encoding apparatus; binary image decoding means for recovering said binary image by decoding said binary image encoded data out of said encoded data; smoothing function decoding means for recovering said smoothing function by decoding said smoothing function encoded data out of said encoded data; dynamic range decoding means for recovering said dynamic range by decoding said dynamic range encoded data out of said encoded data; and binary to multi-value converting means for recovering said multi-value image by smoothing said decoded binary image using said decoded smoothing function and by converting pixel values using said decoded dynamic range.

Still another aspect of the present invention is an image decoding apparatus comprising: means for receiving as inputs thereto the various encoded data encoded by the image encoding apparatus; binary image decoding means for recovering said binary image by decoding said binary image encoded data out of said encoded data; smoothing function decoding means for recovering said smoothing function by decoding said smoothing function encoded data out of said encoded data; and binary to multi-value converting means for recovering said multi-value image by smoothing said decoded binary image using said decoded smoothing function, and wherein: said decoded smoothing function is expressed using one or more tables consisting of binarization patterns of neighboring pixels and substitution values corresponding to said patterns.

Still another aspect of the present invention is an image decoding apparatus comprising: means for receiving as inputs thereto the various encoded data encoded by the image encoding apparatus; binary image decoding means for recovering said binary image by decoding said binary image encoded data out of said encoded data; smoothing function decoding means for recovering said smoothing function by decoding said smoothing function encoded data out of said encoded data; binary to multi-value converting means for recovering said multi-value image by smoothing said decoded binary image using said decoded smoothing function; and residual component decoding means for decoding said residual component, and wherein: an output image is obtained by adding said decoded residual component to the output from said binary to multi-value converting means.

BRIEF DESCRIPTION OF THE DRAWINGS

FIG. 20 is a diagram for explaining how an exclusive OR block is constructed.

FIG. 23 is a diagram showing a portion of a statistical model table.

FIG. 24 is a diagram showing a portion of the statistical model table.

FIG. 25 is a diagram showing a portion of the statistical model table.

FIG. 26 is a diagram showing a portion of the statistical model table.

FIG. 40 is a diagram for explaining non-maximum value suppression used in the embodiment.

FIG. 41 is a diagram showing the correspondence between normalized average gradient and smoothing filter according to the B1st embodiment.

FIG. 49 is a diagram showing the correspondence between normalized average gradient and smoothing filter according to the B3rd embodiment.

FIG. 50 is a diagram for explaining the smoothing filter according to the B3rd embodiment.

DESCRIPTION OF NUMERALS

Figure 1:
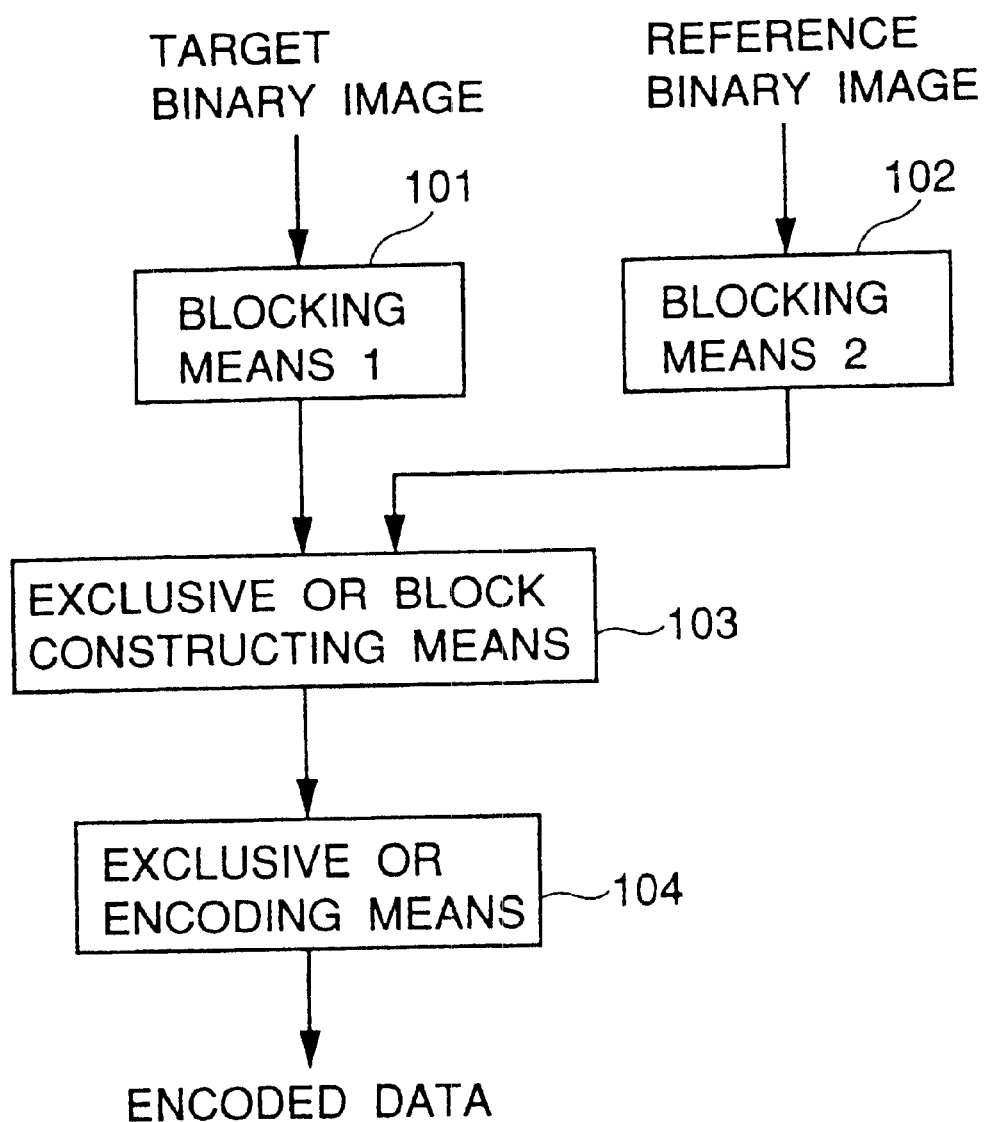
FIG. 1 is a block diagram of an image encoding apparatus according to an A1st embodiment of the present invention.

101. BLOCKING MEANS 1
102. BLOCKING MEANS 2
103. EXCLUSIVE OR BLOCK CONSTRUCTING MEANS
104. EXCLUSIVE OR ENCODING MEANS
201. EXCLUSIVE OR DECODING MEANS
202. BLOCKING MEANS 2
203. TARGET BLOCK CONSTRUCTING MEANS
301. BLOCKING MEANS 1
302. MOTION COMPENSATED BLOCKING MEANS 2
303. EXCLUSIVE OR BLOCK CONSTRUCTING MEANS
304. EXCLUSIVE OR ENCODING MEANS
305. MOTION ESTIMATING MEANS
401. EXCLUSIVE OR DECODING MEANS
402. MOTION COMPENSATED BLOCKING MEANS 2
403. TARGET BLOCK CONSTRUCTING MEANS
501. BLOCKING MEANS 1
502. BLOCKING MEANS 2
503. EXCLUSIVE OR BLOCK CONSTRUCTING MEANS
504. EXCLUSIVE OR ENCODING MEANS
505. REFERENCE BLOCK ADOPTION DETERMINING MEANS
506. TARGET PIXEL ENCODING MEANS
601. EXCLUSIVE OR DECODING MEANS
602. BLOCKING MEANS 2
603. TARGET BLOCK CONSTRUCTING MEANS
604. REFERENCE BLOCK ADOPTION CONTROL MEANS
605. TARGET PIXEL DECODING MEANS
701. BLOCKING MEANS 1
702. BLOCKING MEANS 2
703. STATISTICAL MODEL ESTIMATING MEANS

704. STATISTICAL MODEL
705. ENTROPY ENCODING MEANS
801. ENTROPY DECODING MEANS
802. BLOCKING MEANS 2
803. STATISTICAL MODEL ESTIMATING MEANS
804. STATISTICAL MODEL
901. BLOCKING MEANS 1
902. MOTION COMPENSATED BLOCKING MEANS
903. STATISTICAL MODEL ESTIMATING MEANS
904. STATISTICAL MODEL
905. ENTROPY ENCODING MEANS
906. MOTION ESTIMATING MEANS
1001. ENTROPY DECODING MEANS
1002. MOTION COMPENSATED BLOCKING MEANS 2
1003. STATISTICAL MODEL SELECTING MEANS
1004. STATISTICAL MODEL TABLE
1101. BLOCKING MEANS 1
1102. BLOCKING MEANS 2
1103. STATISTICAL MODEL SELECTING MEANS
1104. STATISTICAL MODEL TABLE
1105. ENTROPY ENCODING MEANS
1106. REFERENCE BLOCK ADOPTION DETERMINING MEANS
1107. TARGET PIXEL ENCODING MEANS
1201. ENTROPY DECODING MEANS
1202. BLOCKING MEANS 2
1203. STATISTICAL MODEL SELECTING MEANS
1204. STATISTICAL MODEL TABLE
1205. REFERENCE BLOCK ADOPTION CONTROL MEANS
1206. TARGET PIXEL DECODING MEANS
1301. BLOCKING MEANS 1
1302. BLOCKING MEANS 2
1303. STATISTICAL MODEL ESTIMATING MEANS
1304. STATISTICAL MODEL
1305. ENTROPY ENCODING MEANS
1401. ENTROPY DECODING MEANS
1402. BLOCKING MEANS 2
1403. STATISTICAL MODEL ESTIMATING MEANS
1404. STATISTICAL MODEL
1501. BLOCKING MEANS 1
1502. MOTION COMPENSATED BLOCKING MEANS 2
1503. ENTROPY ENCODING MEANS
1504. STATISTICAL MODEL ESTIMATING MEANS
1505. STATISTICAL MODEL
1506. MOTION ESTIMATING MEANS
1601. ENTROPY DECODING MEANS
1602. MOTION COMPENSATED BLOCKING MEANS 2
1603. STATISTICAL MODEL ESTIMATING MEANS
1604. STATISTICAL MODEL
1701. BLOCKING MEANS 1
1702. BLOCKING MEANS 2
1703. STATISTICAL MODEL ESTIMATING MEANS
1704. STATISTICAL MODEL
1705. ENTROPY ENCODING MEANS
1706. REFERENCE BLOCK ADOPTION DETERMINING MEANS
1707. TARGET PIXEL ENCODING MEANS
1801. ENTROPY DECODING MEANS
1802. BLOCKING MEANS 2
1803. STATISTICAL MODEL ESTIMATING MEANS
1804. STATISTICAL MODEL
1805. REFERENCE BLOCK ADOPTION CONTROL MEANS
1806. TARGET PIXEL DECODING MEANS
1901. MASK MOVING IMAGE
1902. REFERENCE IMAGE
1903. TARGET IMAGE
1904. REFERENCE BLOCK IMAGE
1905. TARGET BLOCK IMAGE
2001. REFERENCE BLOCK
2002. TARGET BLOCK
2003. EXCLUSIVE OR BLOCK
2101. NUMBER LINE
2102. RANGE
2103. BINARY POINT
2104. GENERATION PROBABILITY MODEL
2105. SYMBOL STRING
2201. START
2202. INITIALIZE RANGE
2203. INPUT SYMBOL
2204. LIMIT RANGE
2205. END SYMBOL?
2206. OUTPUT BINARY POINT
2207. END
2301. STATISTICAL MODEL TABLE
2401. REFERENCE BLOCK
2402. EXTRAPOLATED REFERENCE BLOCK
2403. EXTRAPOLATED REFERENCE BLOCK
2501. REFERENCE BLOCK
2502. TARGET BLOCK
2503. REFERENCE MASK
2504. TARGET MASK
2601. CONVERSION GRAPH
10101. DYNAMIC RANGE ESTIMATING MEANS
10102. SMOOTHING FUNCTION ESTIMATING MEANS
10103. MULTI-VALUE TO BINARY CONVERTING MEANS
10104. BINARY IMAGE ENCODING MEANS
10105. DYNAMIC RANGE ENCODING MEANS
10106. SMOOTHING FUNCTION ENCODING MEANS
10201. MULTI-VALUE IMAGE
10301. X-DIRECTION FILTERING
10302. Y-DIRECTION FILTERING
10303. GRADIENT DETECTION
10304. GRADIENT DIRECTION DETECTION
10305. NON-MAXIMUM VALUE SUPPRESSION
10306. AVERAGE GRADIENT DETECTION
10307. SMOOTHING FUNCTION SELECTION
10601. FILTER 1
10602. FILTER 2
10603. FILTER 3
10604. FILTER 4
10901. BINARY IMAGE DECODING MEANS
10902. SMOOTHING FUNCTION DECODING MEANS
10903. DYNAMIC RANGE DECODING MEANS
10904. BINARY TO MULTI-VALUE CONVERTING MEANS
10905. BINARY MASK APPLYING MEANS
11101. DYNAMIC RANGE ESTIMATING MEANS
11102. SMOOTHING FUNCTION ESTIMATING MEANS
11103. MULTI-VALUE TO BINARY CONVERTING MEANS
11104. BINARY IMAGE ENCODING MEANS
11105. DYNAMIC RANGE ENCODING MEANS
11106. SMOOTHING FUNCTION ENCODING MEANS
11201. X-DIRECTION FILTERING
11202. Y-DIRECTION FILTERING
11203. GRADIENT DETECTION
11204. GRADIENT DIRECTION DETECTION
11205. NON-MAXIMUM VALUE SUPPRESSION
11206. AVERAGE GRADIENT DETECTION
11207. SMOOTHING FUNCTION CONSTRUCTION

11401. SMOOTHING FILTER STEP 2
11402. SMOOTHING FILTER STEP 3
11403. SMOOTHING FILTER STEP 4
11404. SMOOTHING FILTER COEFFICIENT TABLE
11601. MORPHOLOGICAL FILTER 1
11602. MORPHOLOGICAL FILTER 2
11603. MORPHOLOGICAL FILTER 3
11701. BINARY IMAGE DECODING MEANS
11702. SMOOTHING FUNCTION DECODING MEANS
11703. DYNAMIC RANGE DECODING MEANS
11704. BINARY TO MULTI-VALUE CONVERTING MEANS
11801. DYNAMIC RANGE ESTIMATING MEANS
11802. SMOOTHING FUNCTION ESTIMATING MEANS
11803. MULTI-VALUE TO BINARY CONVERTING MEANS
11804. BINARY IMAGE ENCODING MEANS
11805. DYNAMIC RANGE ENCODING MEANS
11806. SMOOTHING FUNCTION COEFFICIENT ENCODING MEANS
11901. X-DIRECTION FILTERING
11902. Y-DIRECTION FILTERING
11903. GRADIENT DETECTION
11904. GRADIENT DIRECTION DETECTION
11905. NON-MAXIMUM VALUE SUPPRESSION
11906. AVERAGE GRADIENT DETECTION
11907. SMOOTHING FUNCTION GENERATION
12101. BINARY IMAGE DECODING MEANS
12102. SMOOTHING FUNCTION COEFFICIENT DECODING MEANS
12103. DYNAMIC RANGE DECODING MEANS
12104. BINARY TO MULTI-VALUE CONVERTING MEANS
12201. MULTI-VALUE TO BINARY CONVERTING MEANS
12202. BINARY IMAGE ENCODING MEANS
12203. SMOOTHING FUNCTION ESTIMATING MEANS
12204. SMOOTHING FUNCTION ENCODING MEANS
12301. BINARY IMAGE DECODING MEANS
12302. SMOOTHING FUNCTION DECODING MEANS
12303. BINARY TO MULTI-VALUE CONVERTING MEANS
12601. MULTI-VALUE TO BINARY CONVERTING MEANS
12602. BINARY IMAGE ENCODING MEANS
12603. SMOOTHING FUNCTION ESTIMATING MEANS
12604. SMOOTHING FUNCTION ENCODING MEANS
12605. BINARY TO MULTI-VALUE CONVERTING MEANS
12606. DIFFERENCE CALCULATOR
12607. RESIDUAL ENCODING MEANS
12701. BINARY IMAGE DECODING MEANS
12702. SMOOTHING FUNCTION DECODING MEANS
12703. BINARY TO MULTI-VALUE CONVERTING MEANS
12704. RESIDUAL DECODING MEANS
12705. ADDER

BEST MODE FOR CARRYING OUT THE INVENTION

Embodiments according to the present invention will be described below with reference to the accompanying drawings.

Embodiment A1

FIG. 1 is a block diagram showing the configuration of an image encoding apparatus according to an embodiment of the present invention.

In FIG. 1, blocking means 1 (101) is a means which takes as an input a target image to be encoded, and which divides the input image into blocks each consisting of a plurality of pixels. Blocking means 2 (102) is a means which divides a previously obtained reference image into blocks each consisting of a plurality of pixels. Exclusive OR block constructing means (103) is a means which constructs an exclusive OR block by scanning a target block taken from the image divided by the blocking means 1 (101) and a reference block taken from the image divided by the blocking means 2 (102), and by exclusive-ORing pixel values between them. Exclusive OR encoding means (104) is a means which encodes the exclusive OR block and outputs the encoded data.

The operation of the thus configured image encoding apparatus of the present embodiment will be described below, together with the operation of an image encoding method according to one embodiment of the present invention.

Figure 19:
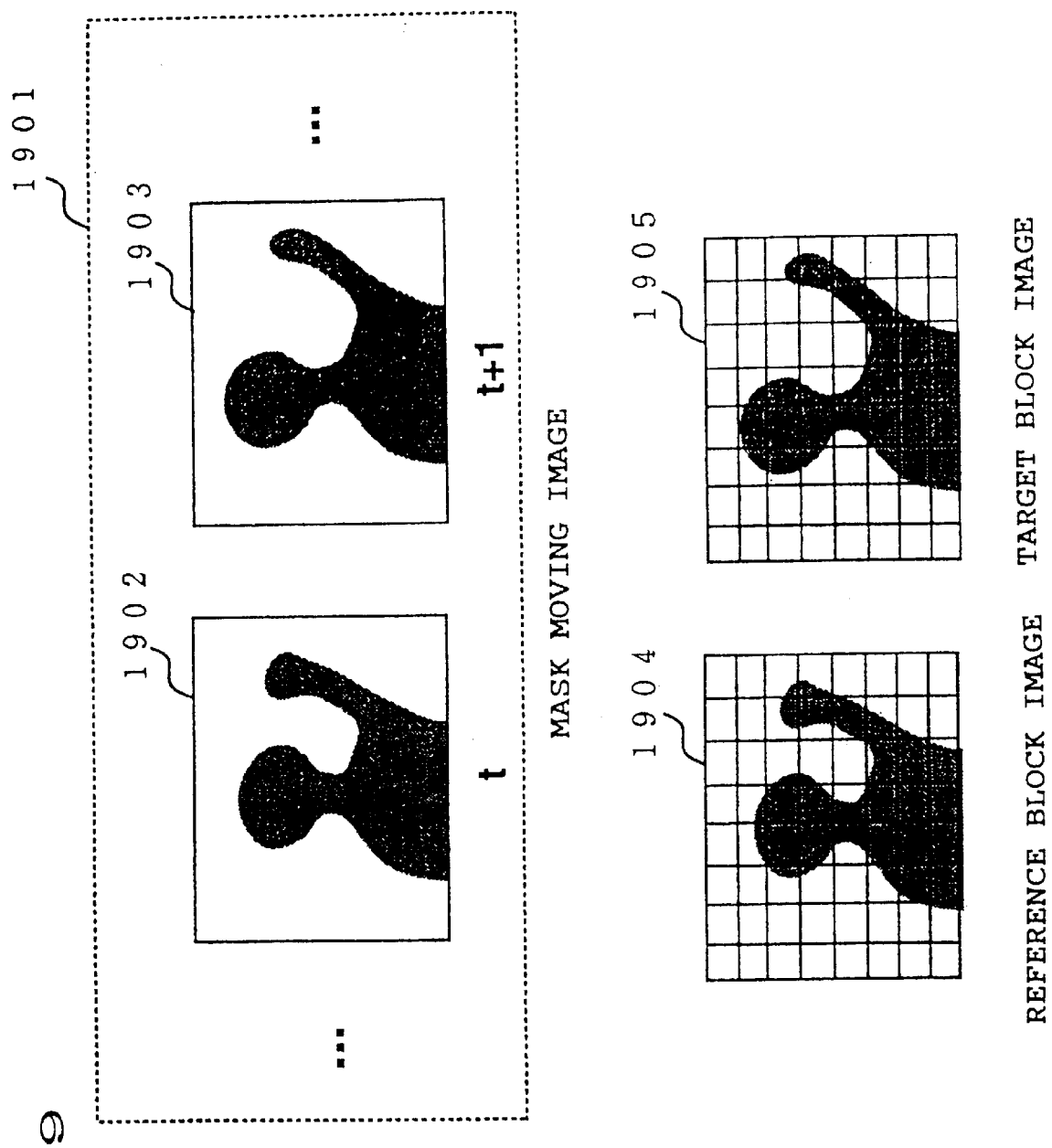
FIG. 19 is a diagram showing a reference image and target image in a mask moving image.

Here, the (t+1)th frame (1903) of a person's moving mask image (1901), shown in FIG. 19, is taken as a target binary image, and the t-th frame (1902) as a reference binary image. In the diagrams hereinafter described, value 1 is represented by black and value 0 by white. The target binary image (1903) is divided by the blocking means 1 (101) into target blocks of 8×8 pixels, as shown in a target block image (1905). Image blocking in the blocking means 1 (101), however, is not limited to blocks of 8×8 pixels or 16×16 pixels. The reference binary image (1902) is likewise divided into reference blocks, as shown in a reference block image (1904).

The reference binary image (1902) is divided by the blocking means 2 (102) into reference blocks of 8×8 pixels, as shown in the reference block image (1904). Image blocking in the blocking means 2 (102), however, is not limited to blocks of 8×8 pixels or 16×16 pixels.

The target block (2002) shown in FIG. 20 is one block taken from the target block image (1905). The reference block (2001) shown is one block, taken from the reference block image (1904), that matches the target block (2002). The exclusive OR block constructing means (103) scans the target block (2002) and the reference block (2001) from top left to bottom right, exclusive-ORs the pixels values between them, and thereby constructs the exclusive OR block (2003). The exclusive OR block (2003), consisting of 0s and 1s, is encoded by the exclusive OR encoding means (104) using a technique generally known as arithmetic coding. Arithmetic coding will be briefly described below (refer to Hiroshi Yasuda, "International Standards for Multimedia Encoding," Chapter 3 Arithmetic Coding, published by Maruzen).

Figure 21:
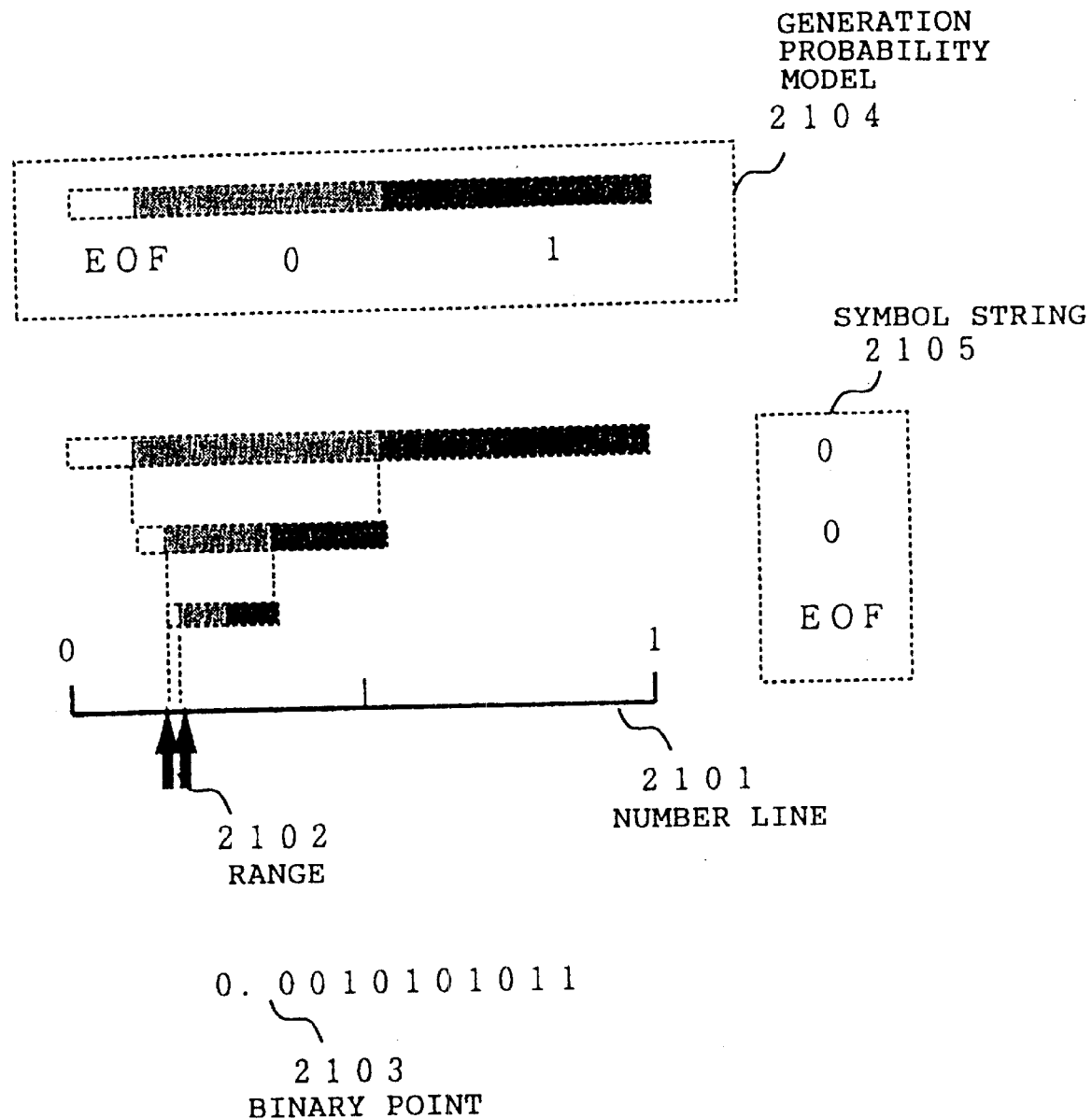
FIG. 21 is a diagram for explaining the principle of arithmetic coding.

FIG. 21 is a diagram for explaining the principle of arithmetic coding. In arithmetic coding, using a symbol string (2105) and a symbol generation probability model (2104), a number line (2101) from 0 to 1 is successively limited with each input of a symbol from the symbol string (2105), and the shortest binary point (2103) that does not go outside the obtained range (2102) whatever follows next is output as the encoded data.

Figure 22:
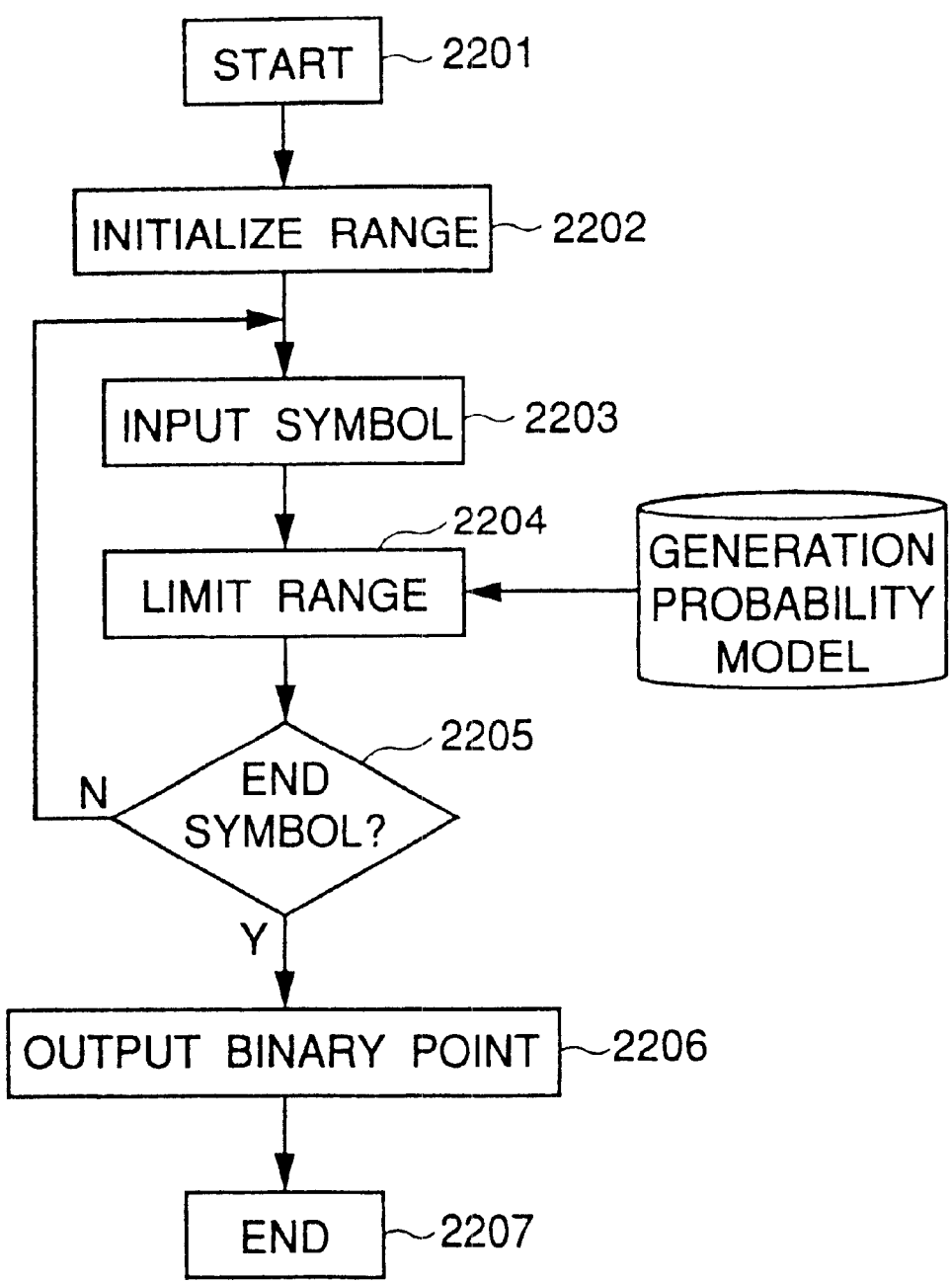
FIG. 22 is a block diagram for arithmetic coding.

FIG. 22 shows a flowchart for arithmetic coding. In 2201, arithmetic coding is started. In 2202, the range is initialized to an interval bounded by 0 and 1. In 2203, a symbol is input. In 2204, a generation probability model is assigned to the current range, and the probability range of the input symbol is set as the new range. In 2205, if the symbol is an end symbol, then in 2206 the range is expressed by a binary point which is output, and the arithmetic coding is terminated in 2207. If, in 2205, the symbol is not an end symbol, then the next symbol is input in 2203. If the number of symbols is predetermined, the end symbol can be omitted.

Decoding is performed by determining the symbol string from the binary point. It is known that arithmetic coding has the property that the better the symbol matches the generation probability model of the symbol, and the more biased the symbol generation probability is, the fewer the code bits to encode the symbol string. It is also known that even if the generation probability model is changed during the encoding, decoding can be done if the way the model is changed is known.

Using the above-descried arithmetic coding and a generation probability model with [0, 0.9) as symbol 0 and [0.9, 1.0) as symbol 1, the exclusive OR encoding means (104) generates a coded sequence for the exclusive OR block consisting of a symbol string of 0s and 1s, and outputs the same as encoded data.

As described above, in the present embodiment, efficient encoding with fewer code bits can be achieved by utilizing the property that in the case of a mask moving image or the like, the generation probabilities of symbol 0 and symbol 1 from the exclusive ORing of the target block and reference block are at a ratio of about 9:1, and by combining the exclusive ORing with the arithmetic coding.

Embodiment A2

Figure 2:
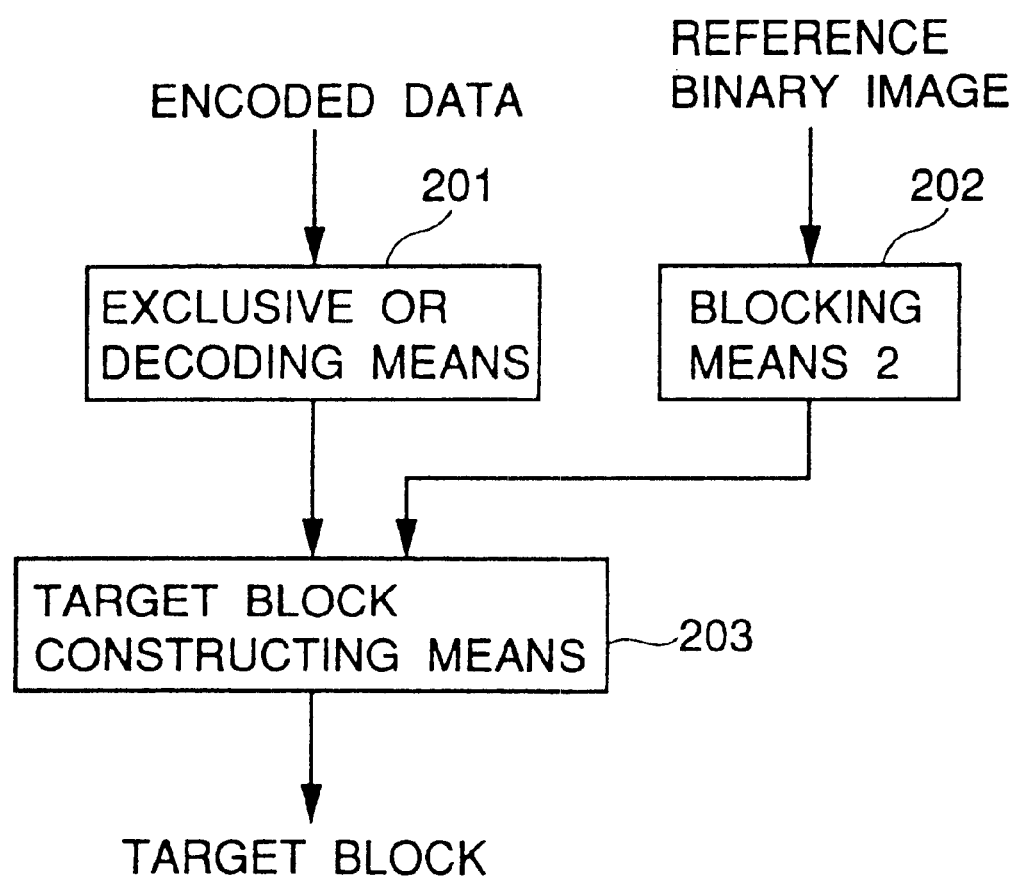
FIG. 2 is a block diagram of an image decoding apparatus according to an A2nd embodiment of the present invention.

FIG. 2 is a block diagram showing the configuration of an image decoding apparatus according to an embodiment of the present invention. The configuration of this embodiment will be described with reference to same figure.

In the figure, exclusive OR decoding means (201) is a means which takes the encoded data as an input and decodes it to recover the exclusive OR block. Blocking means 2 (202) is a means which divides a previously obtained reference image into reference blocks each consisting of a plurality of pixels. Target block constructing means (203) is a means which recovers the target block from the exclusive OR block supplied from the exclusive OR decoding means (201) and a reference block supplied from the blocking means (202).

The operation of the thus configured image decoding apparatus of the present embodiment will be described below, together with the operation of an image decoding method according to one embodiment of the present invention.

The exclusive OR decoding means (201) is a decoder for arithmetic coding that has a generation probability model with [0, 0.9) as symbol 0 and [0.9, 1.0) as symbol 1, as does the exclusive OR encoding means (104). The exclusive OR block is constructed by generating a symbol string from the binary point as the encoded data and the generation probability model, and by arranging the symbols in the scanning direction.

In operation, the blocking means 2 (202) is equivalent to the blocking means 2 (102). The target block constructing means (203) constructs the target block by scanning the exclusive OR block and the reference block, and by inverting pixel values in the reference block for pixels whose values in the exclusive OR block are 1.

As described above, in the present embodiment, efficient decoding with fewer code bits can be achieved by utilizing the property that in the case of a mask moving image or the like, the generation probabilities of symbol 0 and symbol 1 from the exclusive ORing of the target block and reference block is at a ratio of about 9:1, and by combining the exclusive ORing with the arithmetic coding.

Embodiment A3

Figure 3:
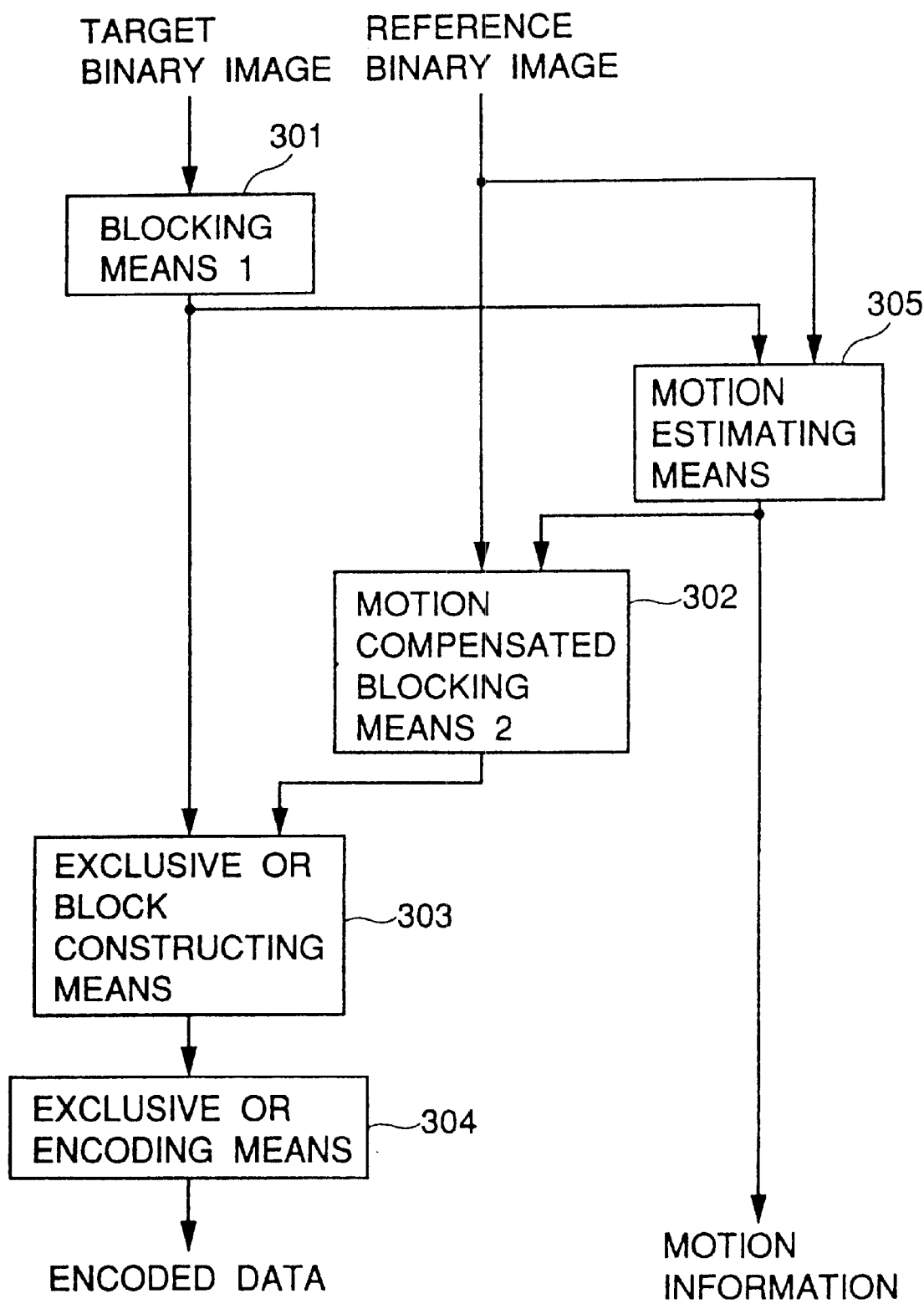
FIG. 3 is a block diagram of an image encoding apparatus according to an A3rd embodiment of the present invention.

FIG. 3 is a block diagram showing the configuration of an image encoding apparatus according to an embodiment of the present invention. The configuration of this embodiment will be described below with reference to same figure.

In the figure, blocking means 1 (301) is a mean which takes as an input a target image to be encoded, and which divides the input image into blocks each consisting of a plurality of pixels. Motion estimating means (305) is a means which searches through a reference image for a block that resembles the target block, and which generates a motion vector for the block. Motion compensated blocking means 2 (302) is a means which takes the reference image and motion information as inputs and which, based on the motion information, divides the input reference image into blocks each consisting of a plurality of pixels. Exclusive OR block constructing means (303) is a means which constructs an exclusive OR block by scanning a target block taken from the image divided by the blocking means 1 (301) and a reference block taken from the image divided by the motion compensated blocking means 2 (302), and by exclusive-ORing pixel values between them. Exclusive OR encoding means (304) is a means which encodes the exclusive OR block and outputs the encoded data.

The operation of the thus configured image encoding apparatus of the present embodiment will be described below, together with the operation of an image encoding method according to one embodiment of the present invention.

In operation, the blocking means 1 (301) is equivalent to the blocking means 1 (101). When the motion vector to be estimated is denoted by v, the number of pixels in the target block by m, the location of each pixel in the image by u_i (i is 1 to m), the pixel value at location x in the target image by A(x), and the pixel value at location x in the reference image by B(x), the motion estimating means (305) detects from within a predetermined range the v that minimizes the similarity S(v) (equation A1), and outputs the v as the motion vector.

Equation A1

$$S(v) = \sum_{i=1}^{m} |A(u\_i + v) - B(u\_i)| \qquad (1)$$

The motion compensated blocking means (302) moves the block, taken from the reference image, by the motion vector and generates the reference block which is output. In operation, the exclusive OR block constructing means (303) is equivalent to the exclusive OR block constructing means (103). The exclusive OR encoding means (304) is equivalent to the exclusive OR encoding means (104).

As described above, according to the present embodiment, efficient encoding with fewer code bits can be achieved by using the motion estimating means and motion compensated blocking means and applying motion compensation to a block for which the generation probabilities of symbol 0 and symbol 1 in the exclusive OR block differs widely from the ratio of 9:1, in such a manner that the ratio of the generation probabilities is brought closer to 9:1.

Embodiment A4

Figure 4:
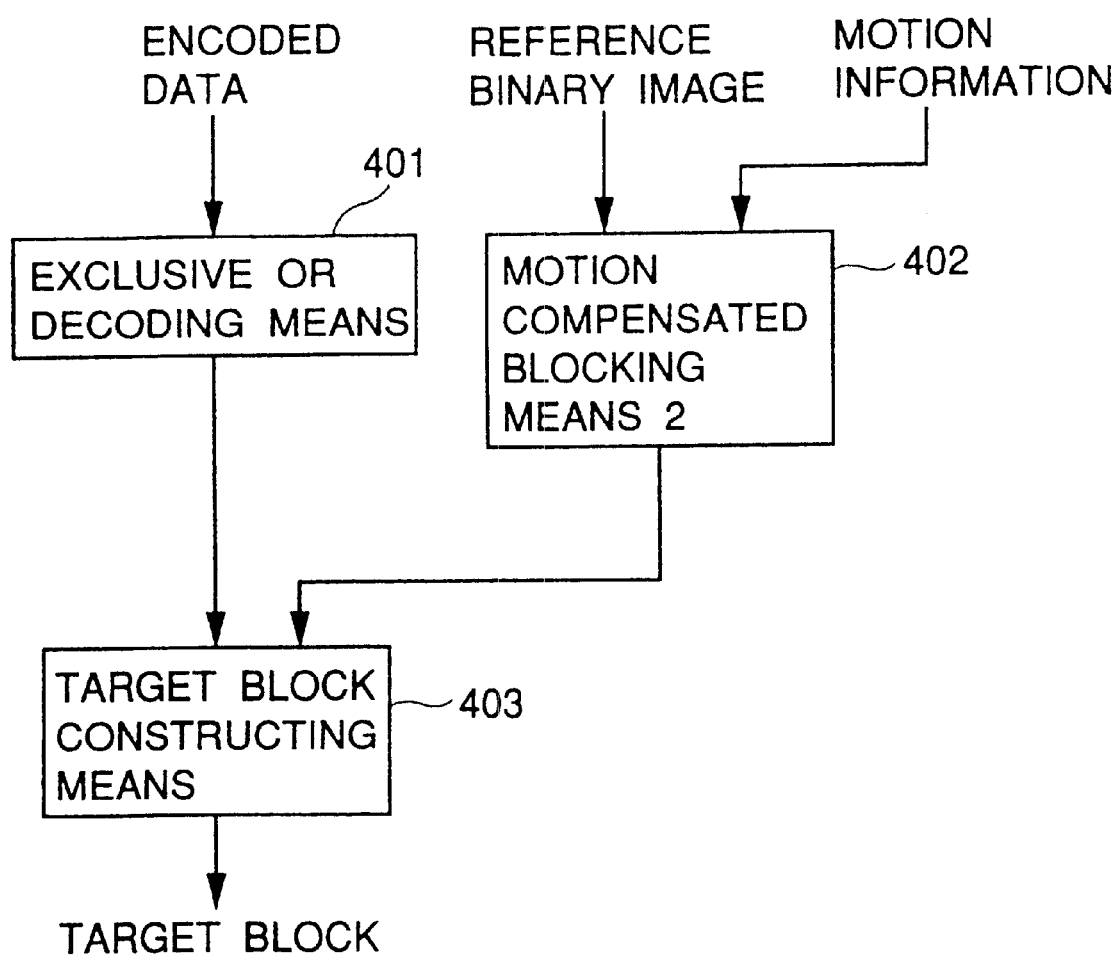
FIG. 4 is a block diagram of an image decoding apparatus according to an A4th embodiment of the present invention.

FIG. 4 is a block diagram showing the configuration of an image decoding apparatus according to an embodiment of the present invention. The configuration of this embodiment will be described with reference to same figure.

In the figure, exclusive OR decoding means (401) is a means which takes the encoded data as an input and decodes it to recover the exclusive OR block. Motion compensated blocking means 2 (402) is a means which takes a reference image and the motion information as inputs and which, based on the motion information, divides the input reference image into blocks each consisting of a plurality of pixels. Target block constructing means (403) is a means which recovers the target block from the exclusive OR block supplied from the exclusive OR decoding means (401) and a reference block supplied from the motion compensated blocking means (402).

The operation of the thus configured image decoding apparatus of the present embodiment will be described below, together with the operation of an image decoding method according to one embodiment of the present invention.

In operation, the exclusive OR decoding means (401) is equivalent to the exclusive OR decoding means (201). The motion compensated blocking means 2 (402) is equivalent to the motion compensated blocking means 2 (302). The target block constructing means (403) is equivalent to the target block constructing means (203).

As described above, according to the present embodiment, efficient decoding with fewer code bits can be achieved by using the motion estimating means and motion compensated blocking means and applying motion compensation to a block for which the generation probabilities of symbol 0 and symbol 1 in the exclusive OR block differs widely from the ratio of 9:1, in such a manner that the ratio of the generation probabilities is brought closer to 9:1.

Embodiment A5

Figure 5:
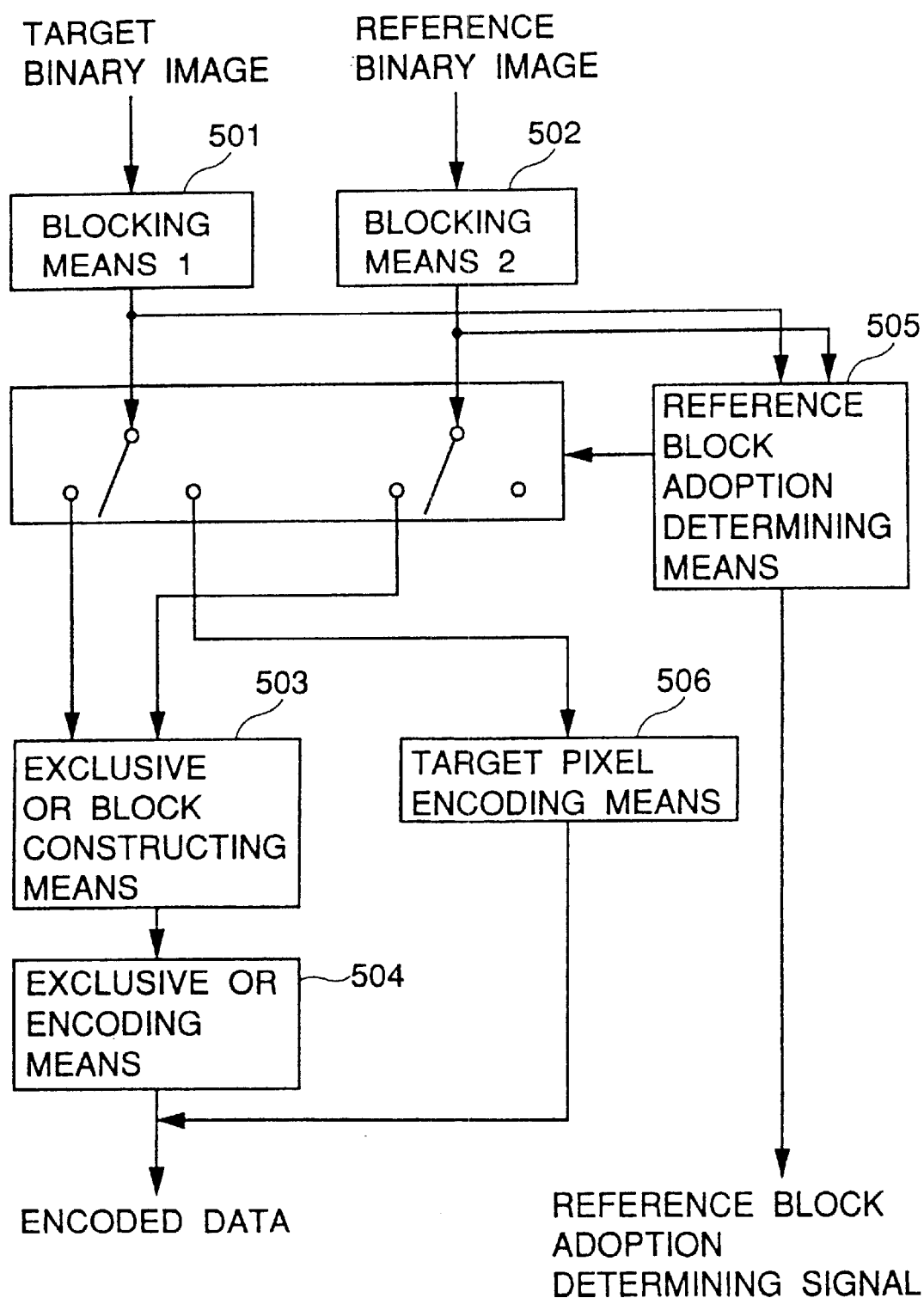
FIG. 5 is a block diagram of an image encoding apparatus according to an A5th embodiment of the present invention.

FIG. 5 is a block diagram showing the configuration of an image encoding apparatus according to an embodiment of the present invention. The configuration of this embodiment will be described below with reference to same figure.

In the figure, blocking means 1 (501) is a means which takes as an input a target image to be encoded, and which divides the input image into blocks each consisting of a plurality of pixels. Blocking means 2 (502) is a means which takes a reference image as an input and divides the input reference image into blocks each consisting of a plurality of pixels. Exclusive OR block constructing means (503) is a means which constructs an exclusive OR block by scanning a target block taken from the image divided by the blocking means 1 (501) and a reference block taken from the image divided by the blocking means 2 (502), and by exclusive-ORing pixel values between them. Exclusive OR encoding means (504) is a means which encodes the exclusive OR block and outputs the encoded data. Reference block adoption determining means (505) is a means which compares the target block with the reference block, and which outputs a reference block adoption determining signal for switching the subsequent processing. Target pixel encoding means (506) is a means which encodes the target block and outputs the encoded data.

The operation of the thus configured image encoding apparatus of the present embodiment will be described below, together with the operation of an image encoding method according to one embodiment of the present invention.

In operation, the blocking means 1 (501) is equivalent to the blocking means 1 (101). The blocking means 2 (502) is equivalent to the blocking means 2 (102). The reference block adoption determining means (505) outputs the reference block adoption determining signal for switching the processing, based on the sum of the absolute differences (SAD) between the target block and the reference block, in such a manner that encoding is performed using the target pixel encoding means (506) if the sum of the absolute differences is larger than or equal to a threshold value, and using the exclusive OR block constructing means (503) and exclusive OR encoding means (504) if the sum of the absolute differences is less than the threshold value. Here, 5 is used as the threshold value. In operation, the exclusive OR block constructing means (503) is equivalent to the exclusive OR block constructing means (103). The exclusive OR encoding means (504) is equivalent to the exclusive OR encoding means (104). The target pixel encoding means (506) is substantially equivalent to the exclusive OR encoding means (504), and is an arithmetic encoder that takes the target block as an input and has a generation probability model with $[0, 0.5)$ as symbol 0 and $[0.5, 1.0)$ as symbol 1.

As described above, according to the present embodiment, blocks for which the generation probabilities of symbol 0 and symbol 1 differs widely from the ratio of 9:1 are regarded as blocks that yield large sums of absolute differences, and the reference block adoption determining means changes the coding scheme to reduce the number of blocks inefficient in coding, thereby achieving efficient encoding with fewer code bits.

Embodiment A6

Figure 6:
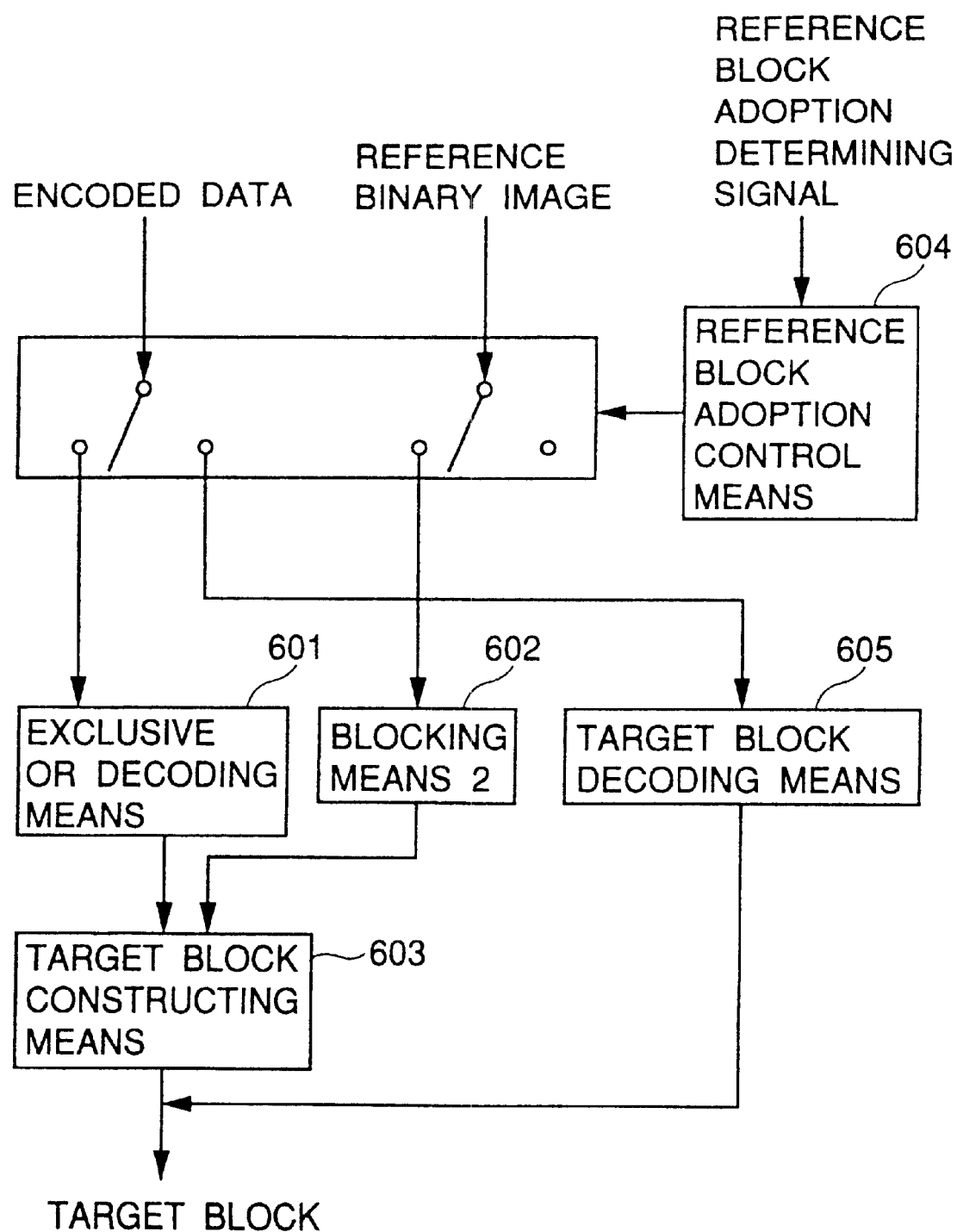
FIG. 6 is a block diagram of an image decoding apparatus according to an A6th embodiment of the present invention.

FIG. 6 is a block diagram showing the configuration of an image decoding apparatus according to an embodiment of the present invention. The configuration of this embodiment will be described below with reference to same figure.

In the figure, exclusive OR decoding means (601) is a means which takes the encoded data as an input and decodes it to recover the exclusive OR block. Blocking means 2 (602) is a means which takes a reference image as an input, and which divides the input reference image into reference blocks each consisting of a plurality of pixels. Target block constructing means (603) is a means which takes as inputs the exclusive OR block recovered by the exclusive OR decoding means (601) and a reference block supplied from the blocking means (602), and which thereby recovers the target block. Reference block adoption control means (604) is a means which switches the subsequent processing in accordance with the reference block adoption determining signal. Target pixel decoding means (605) is a means which decodes the encoded data and recovers the target block.

The operation of the thus configured image decoding apparatus of the present embodiment will be described below, together with the operation of an image decoding method according to one embodiment of the present invention.

In operation, the exclusive OR decoding means (601) is equivalent to the exclusive OR decoding means (201). The blocking means 2 (602) is equivalent to the blocking means 2 (102).

The target block constructing means (603) is equivalent to the target block constructing means (203). The reference block adoption control means (604), based on the reference block adoption determining signal, switches the subsequent processing between the target block constructing means (603) and blocking means 2 (602) when using the reference block and the target pixel decoding means (605) when not using the reference block.

The target pixel decoding means (605) is a decoder for arithmetic encoding that has a generation probability model with $[0, 0.5)$ as symbol 0 and $[0.5, 1.0)$ as symbol 1, as does the target pixel encoding means (506). The target block is constructed by generating a symbol string from the binary point as the encoded data and the generation probability model, and by arranging the symbols in the scanning direction.

As described above, according to the present embodiment, blocks for which the generation probabilities of symbol 0 and symbol 1 differs widely from the ratio of 9:1 are regarded as blocks that yield large sums of absolute differences, and the reference block adoption control means changes the coding scheme to reduce the number of blocks inefficient in coding, thereby achieving efficient decoding with fewer code bits.

Embodiment A7

Figure 7:
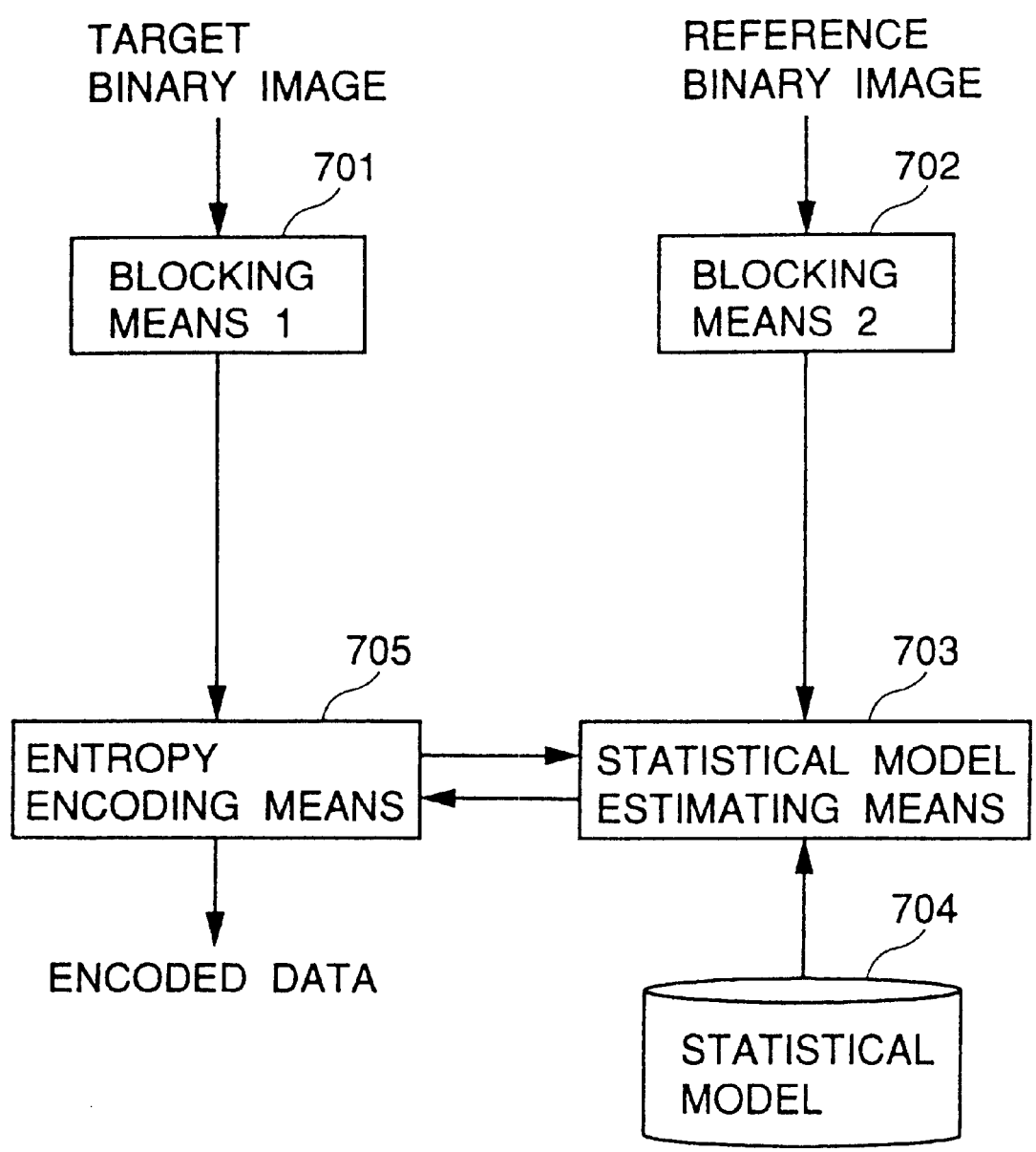
FIG. 7 is a block diagram of an image encoding apparatus according to an A7th embodiment of the present invention.

FIG. 7 is a block diagram showing the configuration of an image encoding apparatus according to an embodiment of the present invention. The configuration of this embodiment will be described below with reference to same figure.

In the figure, blocking means 1 (701) is a means which takes as an input an image to be encoded, and which divides the input image into blocks each consisting of a plurality of pixels.

Blocking means 2 (702) is a means which takes a reference image as an input and divides the input reference image into blocks each consisting of a plurality of pixels. Statistical model selecting means (703) is a means which takes as inputs the location of the target pixel to be encoded, a reference block, and a statistical model table hereinafter described, and which selects a statistical model from the statistical model table (704) in accordance with the states of the pixels surrounding the corresponding location of the target pixel in the reference block, and supplies the selected model to an entropy encoding means (705). That is, the statistical model selecting means 703 is a means that selects a statistical model from among a plurality of statistical models, based on the states of the pixels surrounding a reference pixel in the reference block that corresponds to the target pixel in the target block. The entropy encoding means (705) is a means that supplies the location of the target pixel to be encoded to the statistical model selecting means (703), and that entropy-encodes the target block based on the statistical model supplied from the statistical model selecting means (703), and outputs the same as encoded data.

The operation of the thus configured image encoding apparatus of the present embodiment will be described below, together with the operation of an image encoding method according to one embodiment of the present invention.

In operation, the blocking means 1 (701) is equivalent to the blocking means 1 (101). The blocking means 2 (702) is equivalent to the blocking means 2 (102).

Figure 27:
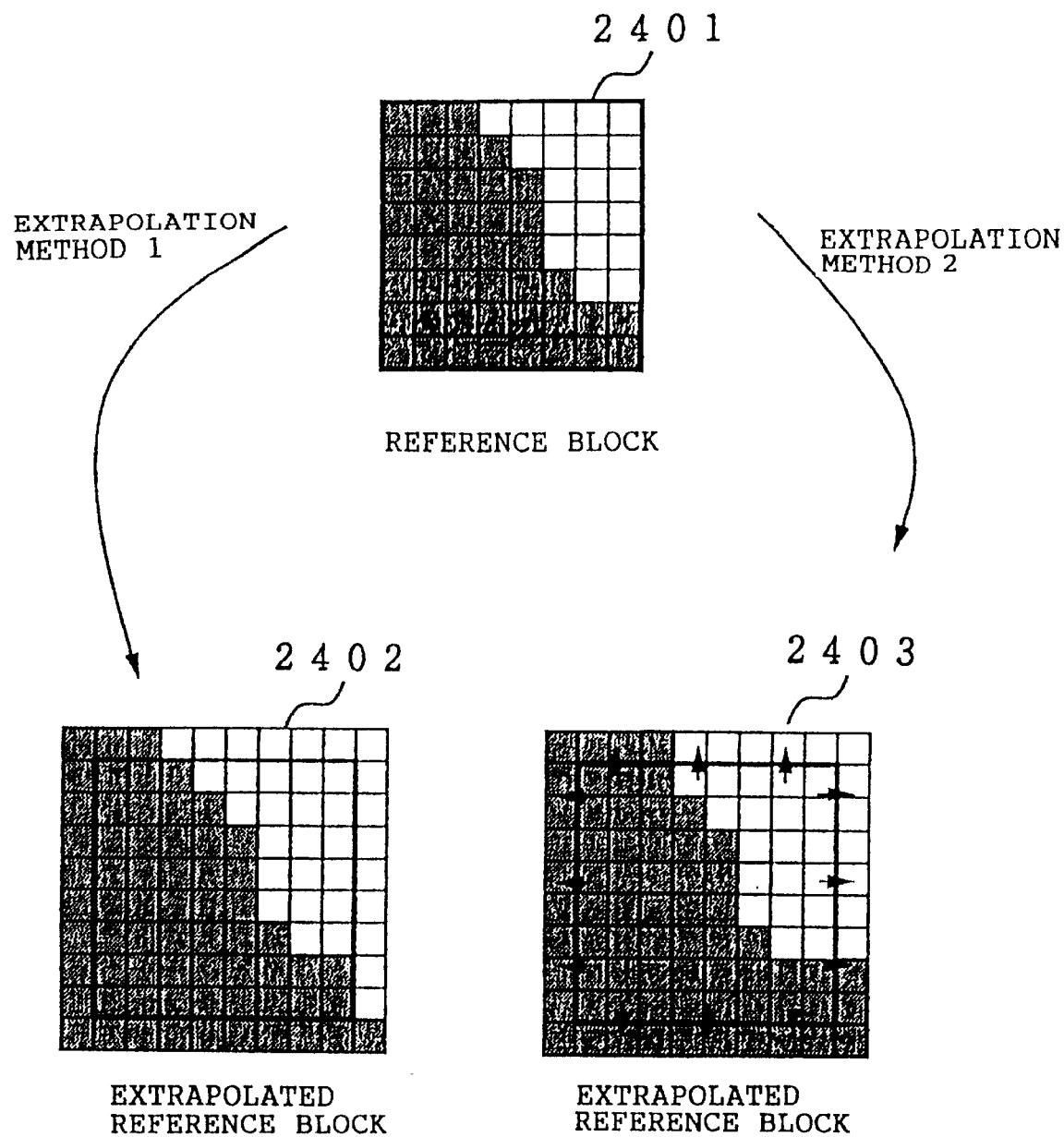
FIG. 27 is a diagram for explaining extrapolated reference blocks.

The statistical model selecting means (703) selects a statistical model from among a plurality of statistical models, and supplies the selected model to the entropy encoding means (705). The statistical model table (2301) is a table in which an index is assigned to each surrounding pixel state and a statistical model is assigned to each index, as shown in FIGS. 23 to 26. Correspondence between the state and index will be described with reference to FIGS. 27 and 28.

Since the states of the pixels surrounding the corresponding pixel are considered, first the reference block (2401) is extrapolated to create an extrapolated reference block.

In one method of creation, if the values of the surrounding pixels are obtained from the reference image, these pixels are added to create the extrapolated reference block (2402). In the present embodiment, this method is referred to as the extrapolation method 1.

If the values of the surrounding pixels are not obtained from the reference image, the pixels in the outer periphery of the reference block are simply extended outside to create the extrapolated reference block (2403). This method is referred to as the extrapolation method 2. In like manner, an extrapolated target block is created from the target block.

Figure 28:
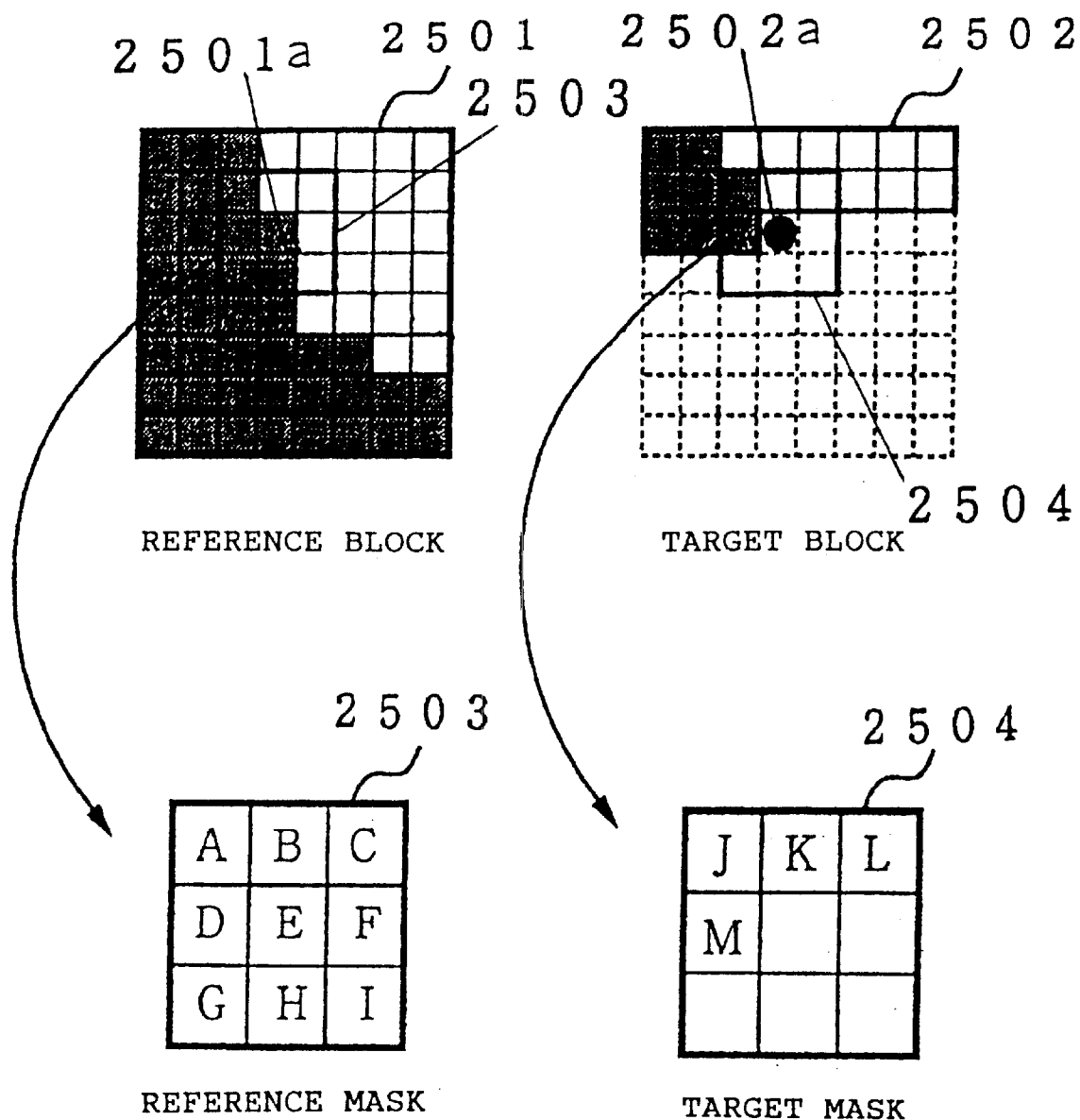
FIG. 28 is a diagram for explaining indices in the statistical model table.

The states of the pixels surrounding the corresponding location of the target pixel in the reference block are obtained by applying a reference mask (2503) to the reference block (2501) and a target mask (2504) to the target block (2502), as shown in FIG. 28. When the pixel values at the respective locations in the reference mask (2503) and target mask (2504) are denoted by A, B, C, D, E, F, G, H, I, J, K, L, and M, as shown in FIG. 28, index i is expressed by equation A2 below. In FIG. 28, the target pixel to be encoded next is designated by reference numeral 2502a, and the reference pixel corresponding to the target pixel (2502a) is designated by reference numeral 2501a. In order to also consider the states of the already encoded pixels in the neighborhood of the target pixel (2502a) in the target block, the statistical model selecting means (703) of the present embodiment obtains the states of the pixels in the neighborhood of the target pixel (2502a) in the same manner as described above by using the extrapolated target block. This achieves more appropriate selection of the statistical model than when using the surrounding pixel states only in the reference block. It is, of course, possible to use the configuration where the surrounding pixel states only in the reference block are used.

Equation A2

$$i = B + 2D + 4E + 8F + 16H + 32K + 64M \qquad (2)$$

At this time, the statistical model corresponding to the index i in the statistical model table (2301) is selected.

In this way, the statistical model selecting means (703) selects a statistical model from the statistical model table and supplies the selected model to the entropy encoding means (705).

The entropy encoding means (705) uses an arithmetic encoder, as in the exclusive OR encoding means (104), but the arithmetic encoder here uses as the generation probability model the statistical model (704) selected by the statistical model selecting means (703), and encodes the target pixel using the selected statistical model.

As described above, according to the present embodiment, the statistical model is changed by the statistical model selecting means in accordance with the states of the pixels surrounding the corresponding location of the target pixel in the reference block; this increases the efficiency of entropy encoding and achieves efficient encoding with fewer code bits.

Embodiment A8

Figure 8:
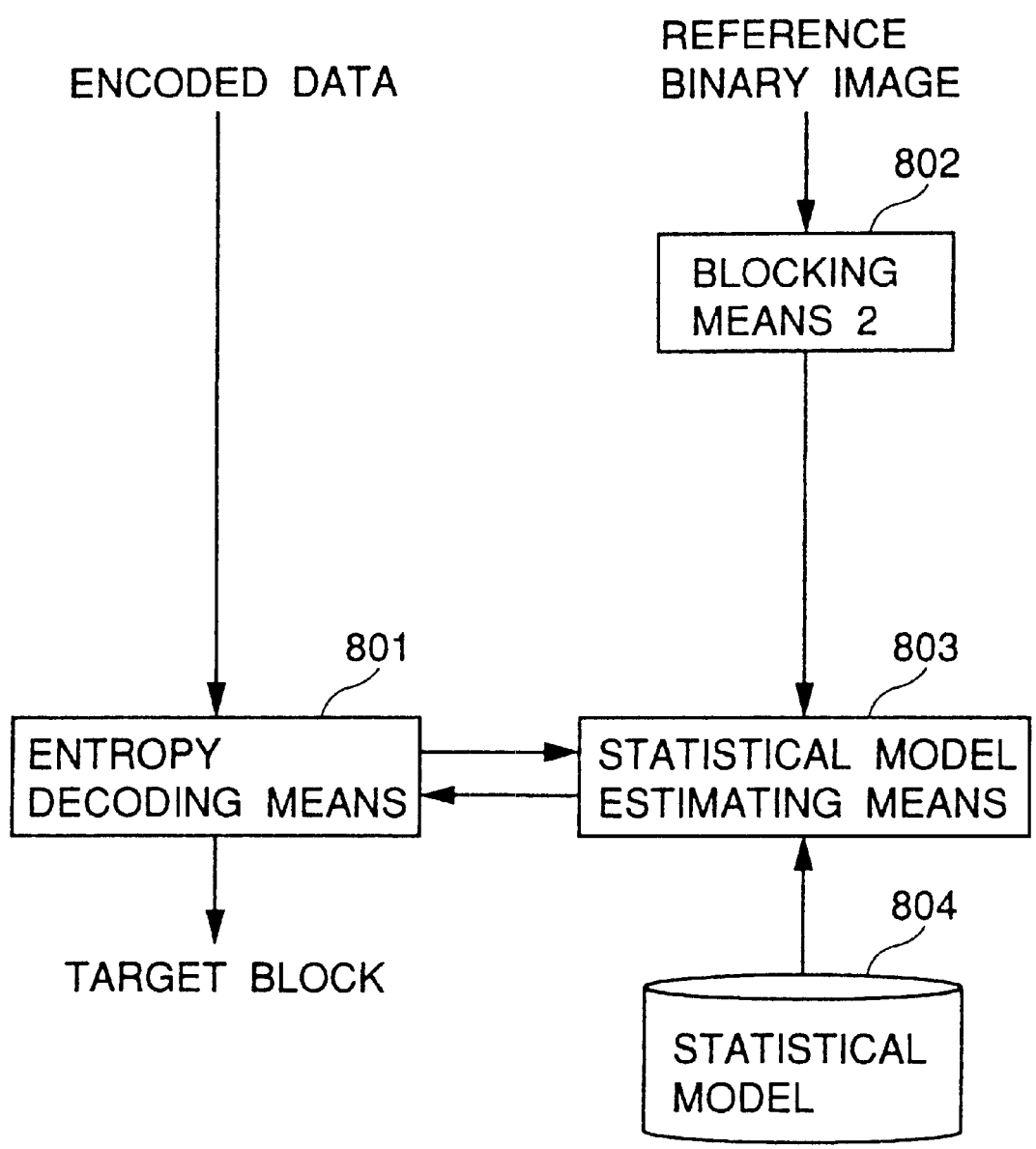
FIG. 8 is a block diagram of an image decoding apparatus according to an A8th embodiment of the present invention.

FIG. 8 is a block diagram showing the configuration of an image decoding apparatus according to an embodiment of the present invention. The configuration of this embodiment will be described below with reference to same figure.

In the figure, blocking means 2 (802) is a means which takes a reference image as an input and divides the input reference image into blocks each consisting of a plurality of pixels. Statistical model selecting means (803) is a means which takes as inputs the location of the target pixel to be encoded, a reference block, and the statistical model table, and which selects a statistical model from the statistical model table (804) in accordance with the states of the pixels surrounding the corresponding location of the target pixel in the reference block, and supplies the selected model to an entropy encoding means (801). The entropy decoding means (801) is a means that takes the encoded data as an input, and which, based on the statistical model (804), decodes the encoded data and recovers the target block.

The operation of the thus configured image decoding apparatus of the present embodiment will be described below, together with the operation of an image decoding method according to one embodiment of the present invention.

In operation, the blocking means 2 (802) is equivalent to the blocking means 2 (102). The statistical model selecting means (803) is equivalent to the statistical model selecting means (703).

The entropy decoding means (801) uses an arithmetic decoder, as in the exclusive OR decoding means (201), but the arithmetic decoder here uses the statistical model (804) selected by the statistical model selecting means (803). The statistical model table (804) is equivalent to the statistical model table (704).

As described above, according to the present embodiment, the statistical model is changed by the statistical model selecting means in accordance with the states of the pixels surrounding the corresponding location of the target pixel in the reference block; this increases the efficiency of entropy coding and,achieves efficient decoding with fewer code bits.

Embodiment A9

Figure 9:
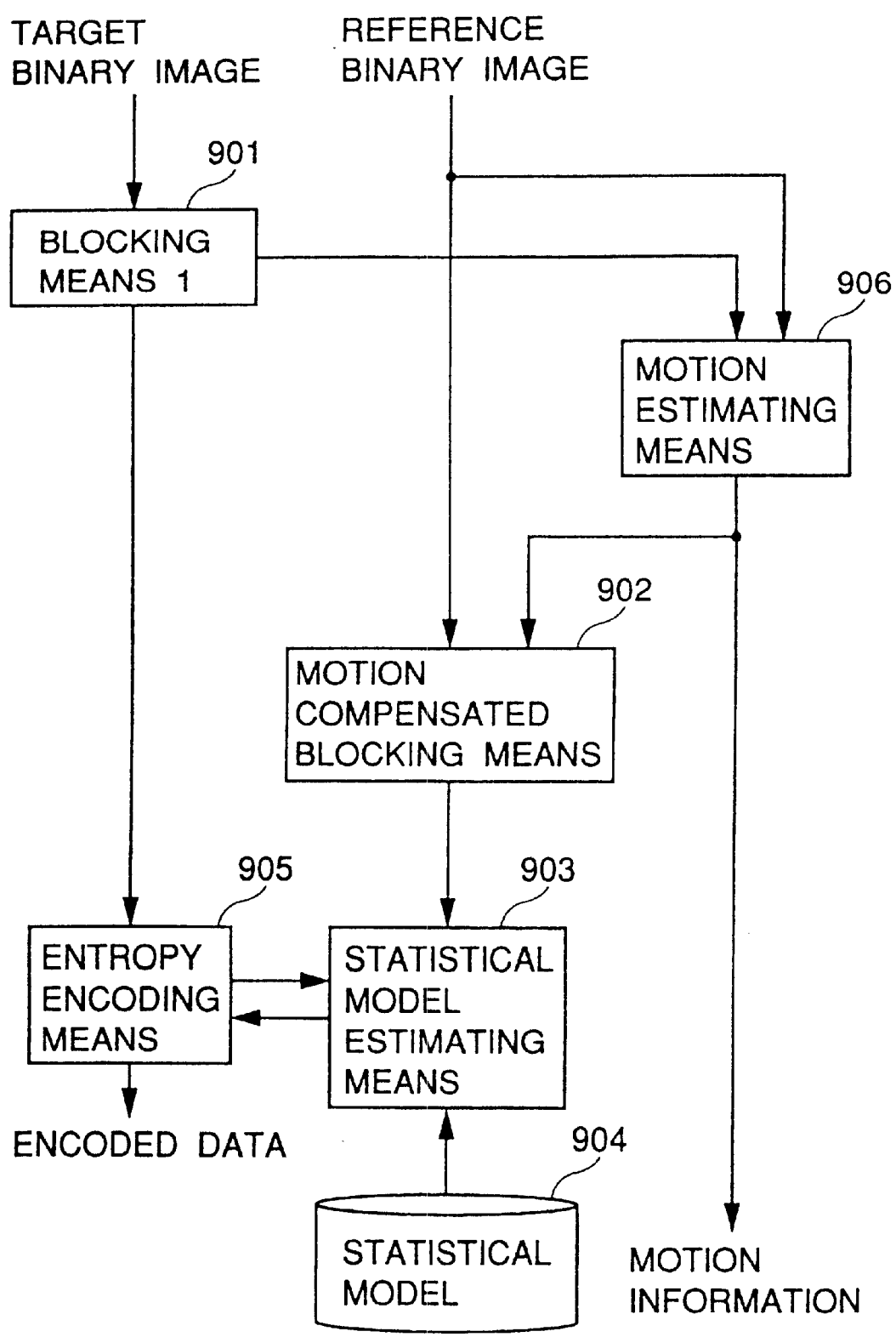
FIG. 9 is a block diagram of an image encoding apparatus according to an A9th embodiment of the present invention.

FIG. 9 is a block diagram showing the configuration of an image encoding apparatus according to an embodiment of the present invention. The configuration of this embodiment will be described below with reference to same figure.

In the figure, blocking means 1 (901) is a means which takes as an input a target image to be encoded and divides the input image into blocks each consisting of a plurality of pixels.

Motion estimating means (906) is a means which searches through a reference image for a block that resembles the target block, and which generates a motion vector for the block. Motion compensated blocking means 2 (902) is a means which takes the reference image and motion information as inputs and which, based on the motion information, divides the input reference image into blocks each consisting of a plurality of pixels. Statistical model selecting means (903) is a means which takes as inputs the location of the target pixel to be encoded, a reference block, and a statistical model table, and which selects a statistical model from the statistical model table (904) in accordance with the states of the pixels surrounding the corresponding location of the target pixel in the reference block, and supplies the selected model to an entropy encoding means (905). The entropy encoding means (905) is a means that entropy-encodes the target block based on the statistical model supplied from the statistical model selecting means (903), and outputs the same as encoded data.

The operation of the thus configured image encoding apparatus of the present embodiment will be described below, together with the operation of an image encoding method according to one embodiment of the present invention.

In operation, the blocking means 1 (901) is equivalent to the blocking means 1 (101).

The motion estimating means (906) is equivalent to the motion estimating means (305). The motion compensated blocking means 2 (902) is equivalent to the motion compensated blocking means 2 (302).

The statistical model selecting means (903) is equivalent to the statistical model selecting means (703). The statistical model table (904) is equivalent to the statistical model table (704). The entropy encoding means (905) is equivalent to the entropy encoding means (705).

As described above, according to the present embodiment, using the motion estimating means and motion compensated blocking means, the statistical model accuracy is increased, achieving efficient encoding with fewer code bits.

Embodiment A10

Figure 10:
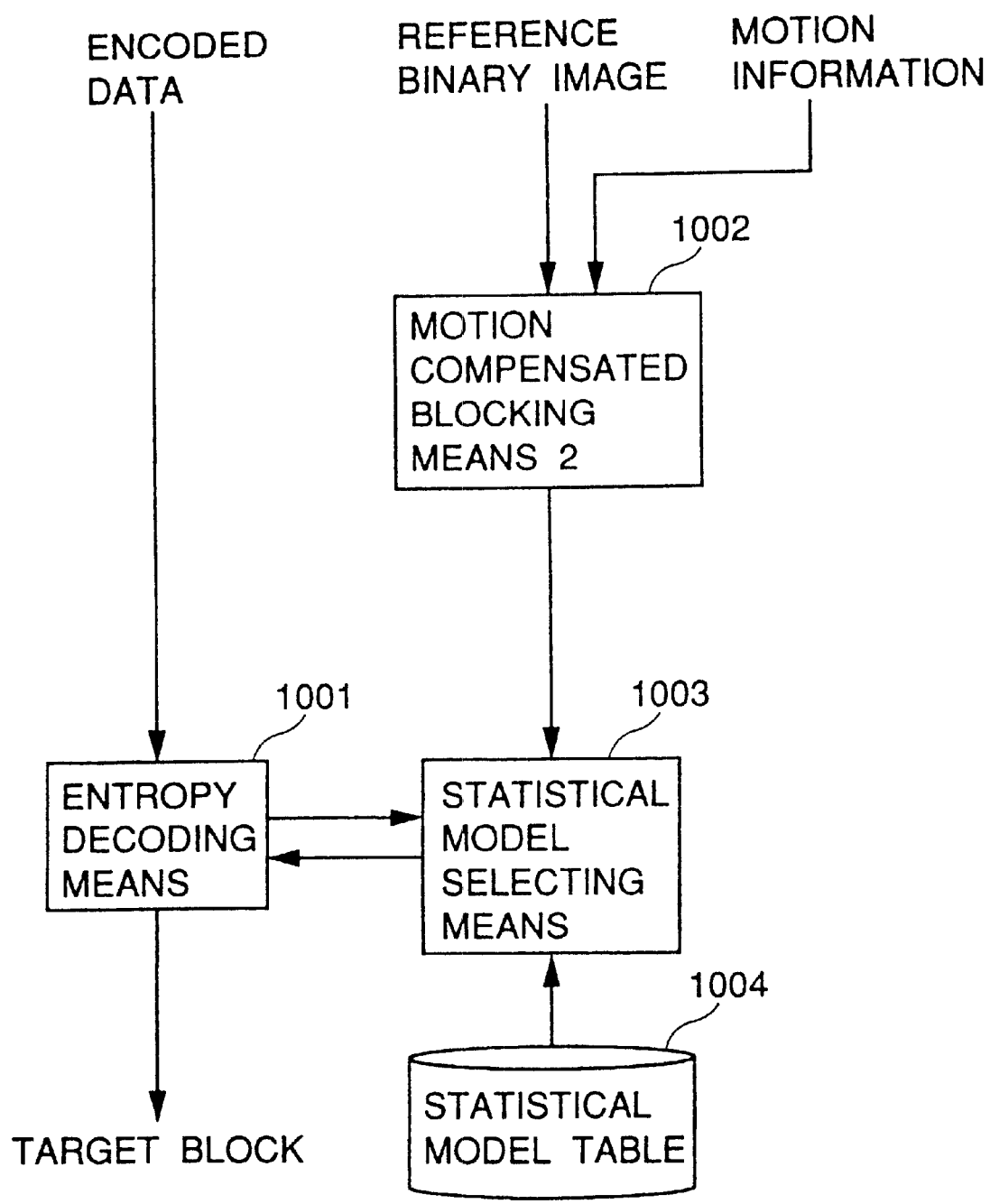
FIG. 10 is a block diagram of an image decoding apparatus according to an A10th embodiment of the present invention.

FIG. 10 is a block diagram showing the configuration of an image decoding apparatus according to an embodiment of the present invention. The configuration of this embodiment will be described below with reference to same figure.

In the figure, motion compensated blocking means 2 (1002) is a means which takes a reference image and the motion information as inputs and which, based on the motion information, divides the input reference image into blocks each consisting of a plurality of pixels. Statistical model selecting means (1003) is a means which takes as inputs the location of the target pixel to be decoded, a reference block, and a statistical model table, and which selects a statistical model from a statistical model table (1004) in accordance with the states of the pixels surrounding the corresponding location of the target pixel in the reference block, and supplies the selected model to an entropy decoding means (1001). The entropy decoding means (1001) is a means that takes the encoded data as an input and that, based on the statistical model, decodes the encoded data and recovers the target block.

The operation of the thus configured image decoding apparatus of the present embodiment will be described below, together with the operation of an image decoding method according to one embodiment of the present invention.

In operation, the motion compensated blocking means 2 (1002) is equivalent to the motion compensated blocking means 2 (402). The statistical model selecting means (1003) is equivalent to the statistical model selecting means (803). The entropy decoding means (1001) is equivalent to the entropy decoding means (801). The statistical model table (1004) is equivalent to the statistical model table (704).

As described above, according to the present embodiment, using the motion compensated blocking means 2, the statistical model accuracy is increased, achieving efficient decoding with fewer code bits.

Embodiment A11

Figure 11:
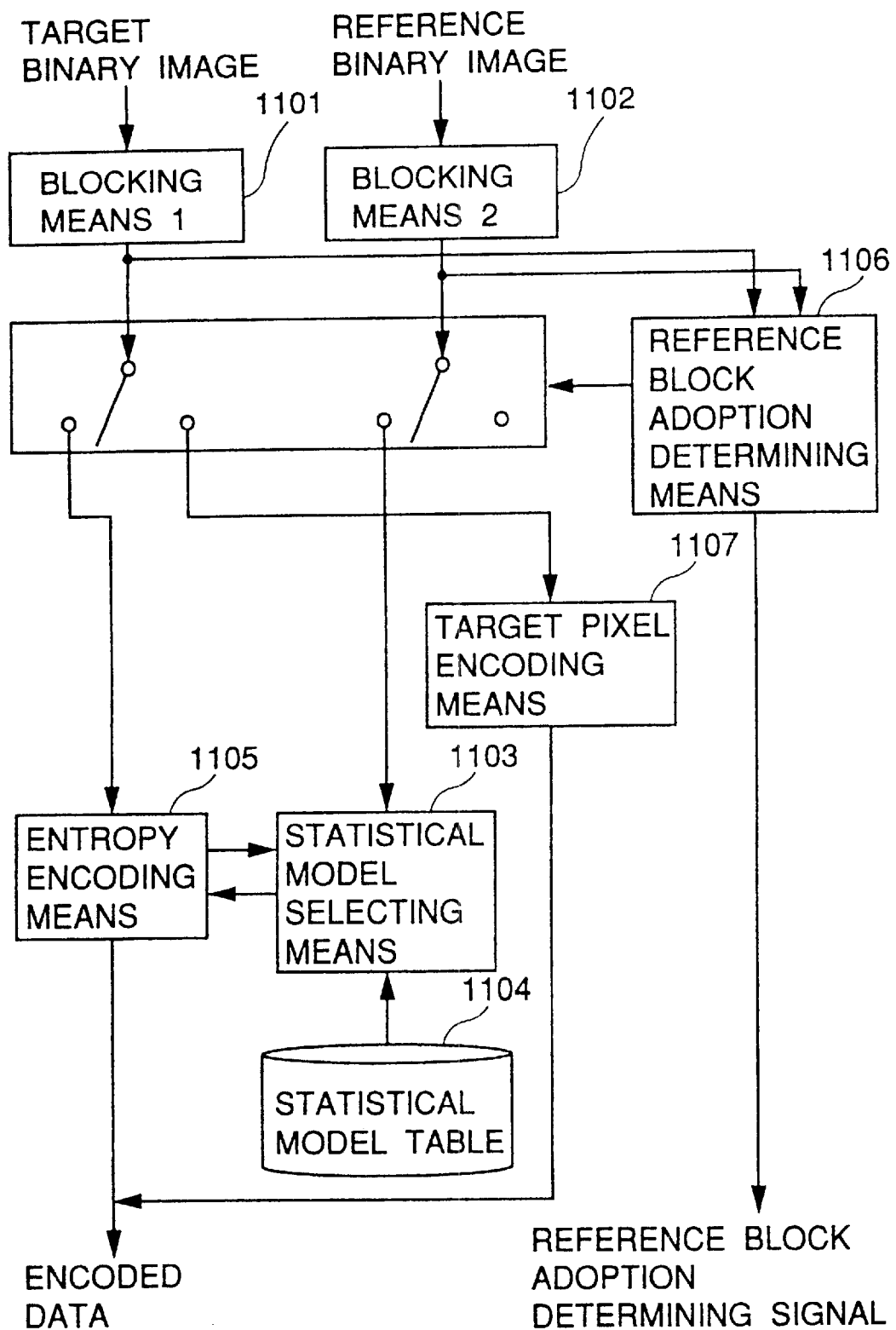
FIG. 11 is a block diagram of an image encoding apparatus according to an A11th embodiment of the present invention.

FIG. 11 is a block diagram showing the configuration of an image encoding apparatus according to an embodiment of the present invention. The configuration of this embodiment will be described below with reference to same figure.

In the figure, blocking means 1 (1101) is a means which takes as an input a target image to be encoded and divides the input image into blocks each consisting of a plurality of pixels.

Blocking means 2 (1102) is a means which takes a reference image as an input and divides the input reference image into blocks each consisting of a plurality of pixels. Statistical model selecting means (1103) is a means which takes as inputs the location of the target pixel to be encoded, a reference block, and a statistical model table, and which selects a statistical model from a statistical model table (1104) in accordance with the states of the pixels surrounding the corresponding location of the target pixel in the reference block, and supplies the selected model to an entropy encoding means (1105). Reference block adoption determining means (1105) is a means which compares the target block with the reference block, and which outputs a reference block adoption determining signal for switching the subsequent processing. The entropy encoding means (1106) is a means which entropy-encodes the target block based on the statistical model, and outputs the same as encoded data. Target pixel encoding means (1107) is a means which encodes the target block and outputs the same as encoded data.

The operation of the thus configured image encoding apparatus of the present embodiment will be described below, together with the operation of an image encoding method according to one embodiment of the present invention.

In operation, the blocking means 1 (1101) is equivalent to the blocking means 1 (101). The blocking means 2 (1102) is equivalent to the blocking means 2 (102). The statistical model selecting means (1103) is equivalent to the statistical model selecting means (703). The statistical model table (1104) is equivalent to the statistical model table (704). The entropy encoding means (1105) is equivalent to the entropy encoding means (705). The reference block adoption determining means (1106) is equivalent to the reference block adoption determining means (505). The target pixel encoding means (1107) is equivalent to the target pixel encoding means (506).

As described above, according to the present embodiment, the reference block adoption determining means changes the coding scheme for a block that does not match the statistical model, thereby reducing the number of blocks inefficient in encoding and thus achieving efficient encoding with fewer code bits.

Embodiment A12

Figure 12:
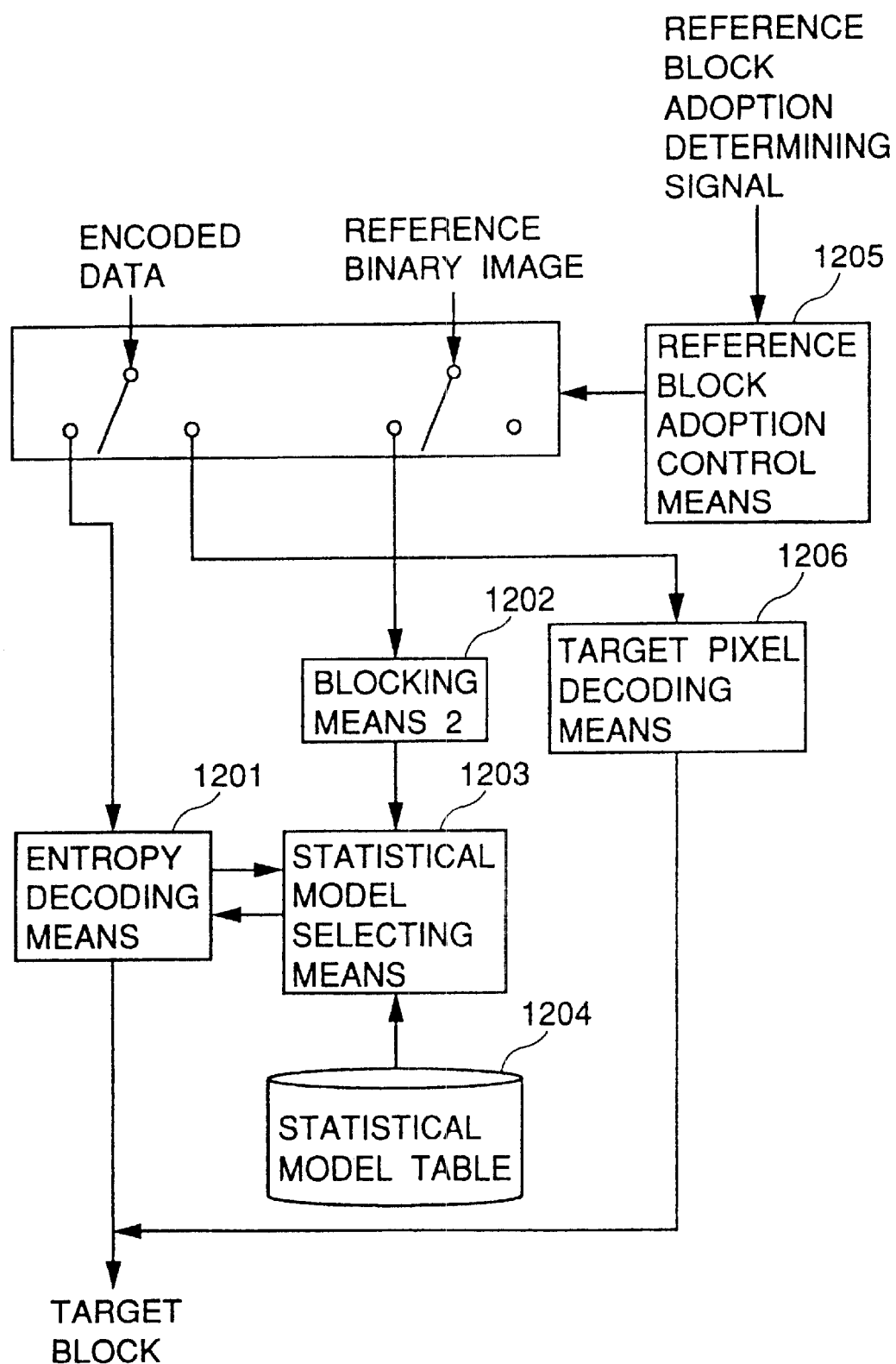
FIG. 12 is a block diagram of an image decoding apparatus according to an A12th embodiment of the present invention.

FIG. 12 is a block diagram showing the configuration of an image decoding apparatus according to an embodiment of the present invention. The configuration of this embodiment will be described below with reference to same figure.

In the figure, blocking means 2 (1202) is a means which takes a reference image as an input and divides the input reference image into blocks each consisting of a plurality of pixels. Statistical model selecting means (1203) is a means which takes as inputs the location of the target pixel to be decoded, a reference block, and a statistical model table, and which selects a statistical model from a statistical model table (1204) in accordance with the states of the pixels surrounding the corresponding location of the target pixel in the reference block, and supplies the selected model to an entropy decoding means (1201). The entropy decoding means (1201) is a means which takes the encoded data as an input and which, based on the statistical model, decodes the encoded data and recovers the target block. Reference block adoption control means (1205) is a means which compares the target block with the reference block and switches the subsequent processing. Target pixel decoding means (605) is a means which decodes the encoded data and recovers the target block.

The operation of the thus configured image decoding apparatus of the present embodiment will be described below, together with the operation of an image decoding method according to one embodiment of the present invention.

In operation, the entropy decoding means (1201) is equivalent to the entropy decoding means (801). The blocking means 2 (1202) is equivalent to the blocking means 2 (102). The statistical model selecting means (1203) is equivalent to the statistical model selecting means (703). The statistical model table (1204) is equivalent to the statistical model table (704). The reference block adoption control means (1205) is equivalent to the reference block adoption control means (604). The target pixel decoding means (1206) is equivalent to the target pixel decoding means (605).

As described above, according to the present embodiment, the reference block adoption control means changes the coding scheme for a block that does not match the statistical model, thereby reducing the number of blocks inefficient in coding and thus achieving efficient decoding with fewer code bits.

Embodiment A13

Figure 13:
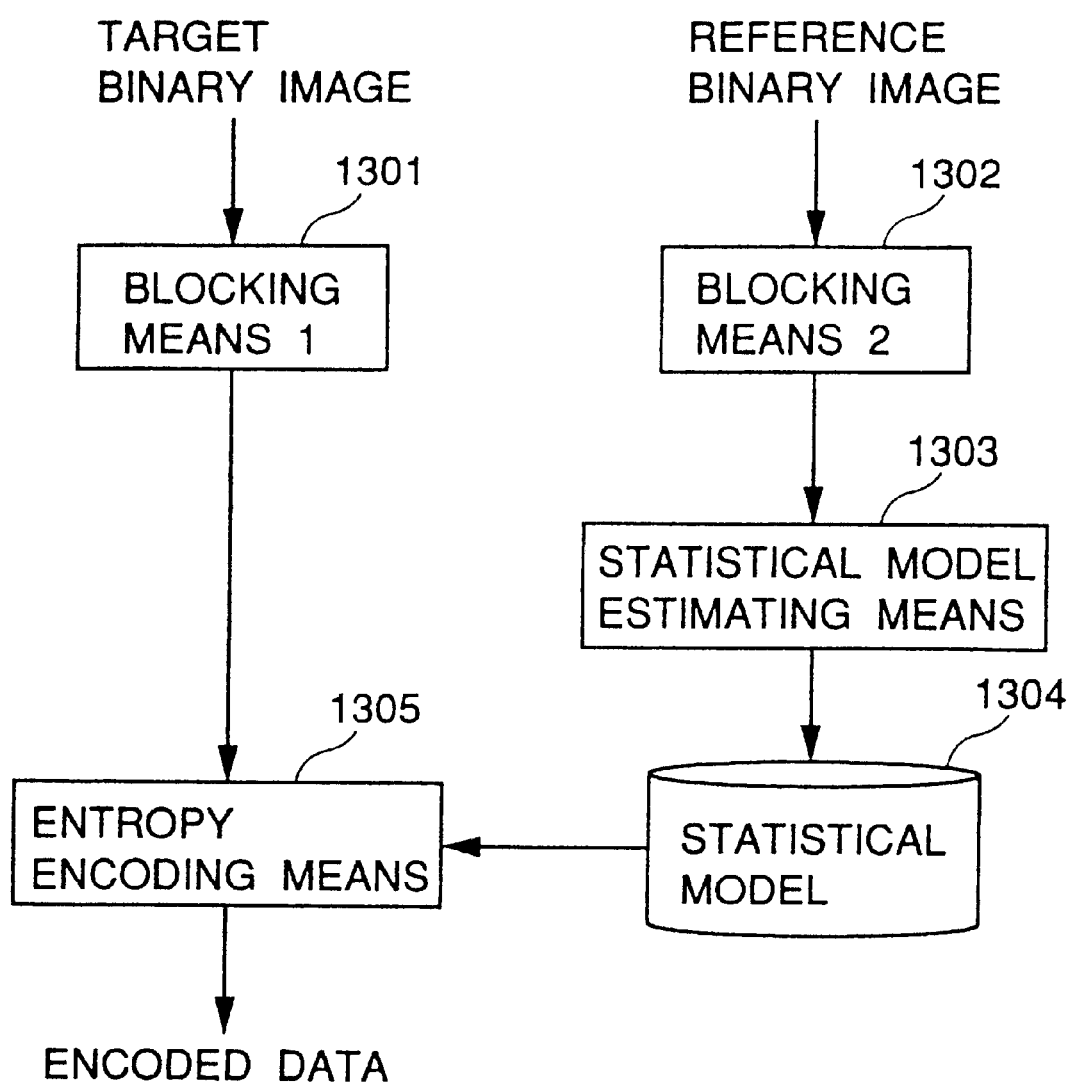
FIG. 13 is a block diagram of an image encoding apparatus according to an A13th embodiment of the present invention.

FIG. 13 is a block diagram showing the configuration of an image encoding apparatus according to an embodiment of the present invention. The configuration of this embodiment will be described below with reference to same figure.

In the figure, blocking means 1 (1301) is a means which takes as an input an image to be encoded and divides the input image into blocks each consisting of a plurality of pixels. Blocking means 2 (1302) is a means which takes a reference image as an input and divides the input reference image into blocks each consisting of a plurality of pixels. Statistical model estimating means (1303) is a means which estimates a statistical model for a target block from a reference block, and stores the estimated model in a statistical model (1304). Entropy encoding means (1305) is a means which encodes pixels in the target block based on the statistical model (1304), and outputs the encoded data.

The operation of the thus configured image encoding apparatus of the present embodiment will be described below, together with the operation of an image encoding method according to one embodiment of the present invention.

Figure 29:
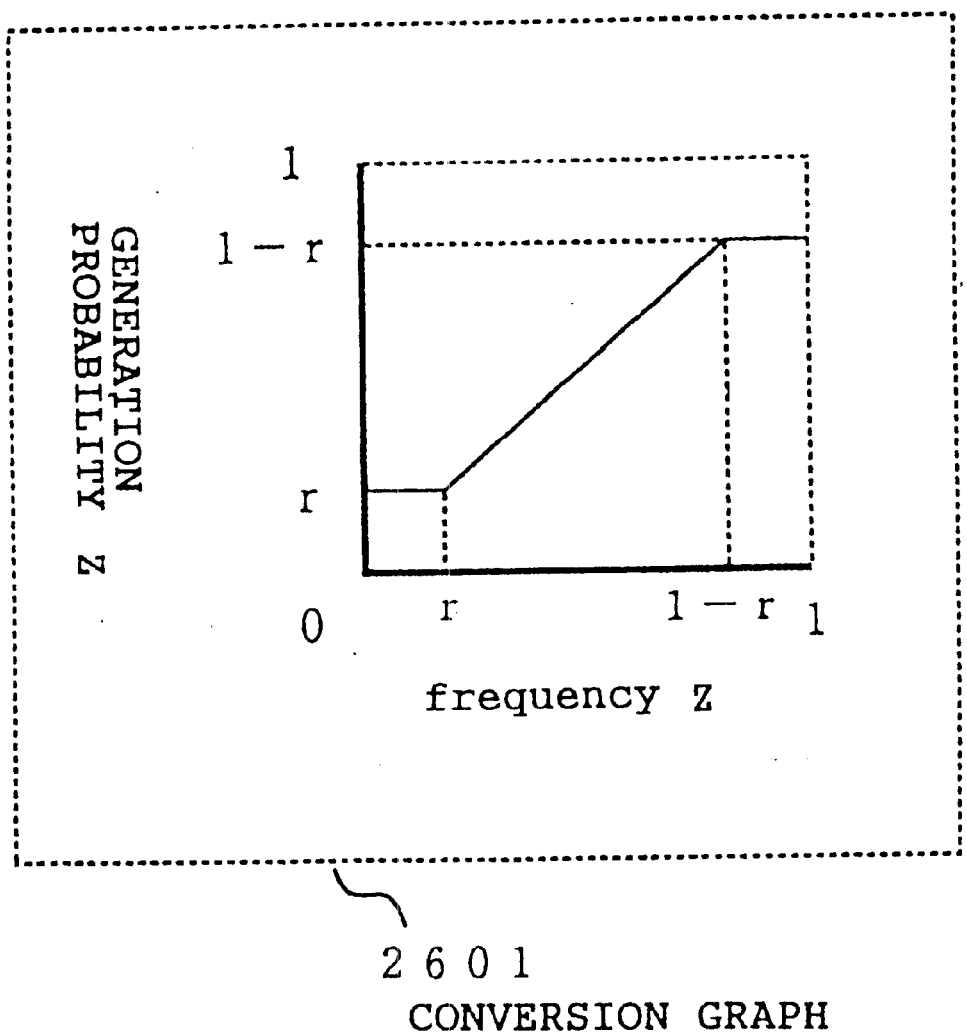
FIG. 29 is a diagram for explaining a frequency to generation probability conversion graph.

In operation, the blocking means 1 (1301) is equivalent to the blocking means 1 (101). The blocking means 2 (1302) is equivalent to the blocking means 2 (102). The statistical model estimating means (1303) estimates a statistical model from the reference block. FIG. 29 is a diagram for explaining how the statistical model is estimated by the statistical model estimating means (1303).

Statistical model estimation begins by obtaining the frequency Z of the symbol 0. The frequency Z is obtained by counting the number of occurrences of the symbol 0 in the reference block and by dividing the number by the total number of pixels, 64. The frequency Z is converted to the generation probability of the symbol 0 by using a conversion graph (2601). In the conversion graph, r=0.1.

Using the generation probability z obtained from the conversion graph, a statistical model is estimated in which any number in [0, z) is taken as the symbol 0 and any number in [z, 1.0) as the symbol 1. The estimated statistical model is stored in the statistical model (1304).

The entropy encoding means (1305), like the entropy encoding means (102), encodes the target block by using an arithmetic encoder and the estimated statistical model (1304).

As described above, according to the present embodiment, a statistical model for the symbols in the target block is estimated from the reference block by the statistical model estimating means, thereby increasing the efficiency of entropy encoding and achieving efficient encoding with fewer code bits.

In the present embodiment, a statistical model is generated for each target block, but the configuration is not limited to the illustrated arrangement; for example, a statistical model may be generated for each target pixel.

Embodiment A14

Figure 14:
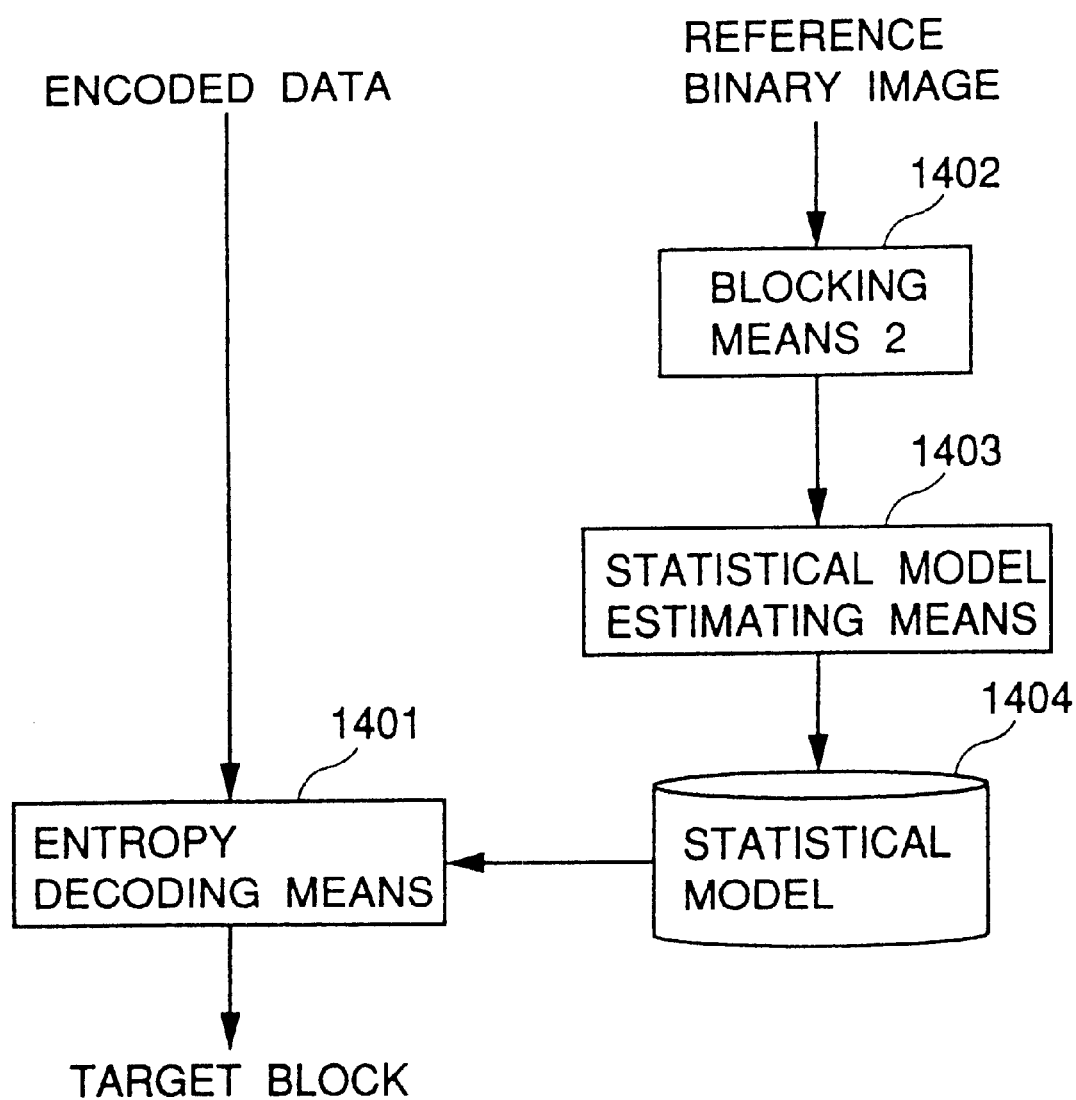
FIG. 14 is a block diagram of an image decoding apparatus according to an A14th embodiment of the present invention.

FIG. 14 is a block diagram showing the configuration of an image decoding apparatus according to an embodiment of the present invention. The configuration of this embodiment will be described below with reference to same figure.

In the figure, blocking means 2 (1402) is a means which takes a reference image as an input and divides the input reference image into blocks each consisting of a plurality of pixels. Statistical model estimating means (1403) is a means which estimates a statistical model for a target block from a reference block, and stores the estimated model in a statistical model (1404). Entropy decoding means (1401) is a means which takes the encoded data as an input, and which decodes the encoded data based on the statistical model (1404) and recovers the target block.

The operation of the thus configured image decoding apparatus of the present embodiment will be described below, together with the operation of an image decoding method according to one embodiment of the present invention.

In operation, the blocking means 2 (1402) is equivalent to the blocking means 2 (102). The statistical model estimating means (1403) is equivalent to the statistical model estimating means (1303). The entropy decoding means (1401), like the exclusive OR decoding means (201), decodes the encoded data and recovers the target block by using an arithmetic decoder and the statistical model estimated by the statistical model estimating means (1403).

As described above, according to the present embodiment, a statistical model for the symbols in the target block is estimated from the reference block by the statistical model estimating means, thereby increasing the efficiency of entropy coding and achieving efficient decoding with fewer code bits.

Embodiment A15

Figure 15:
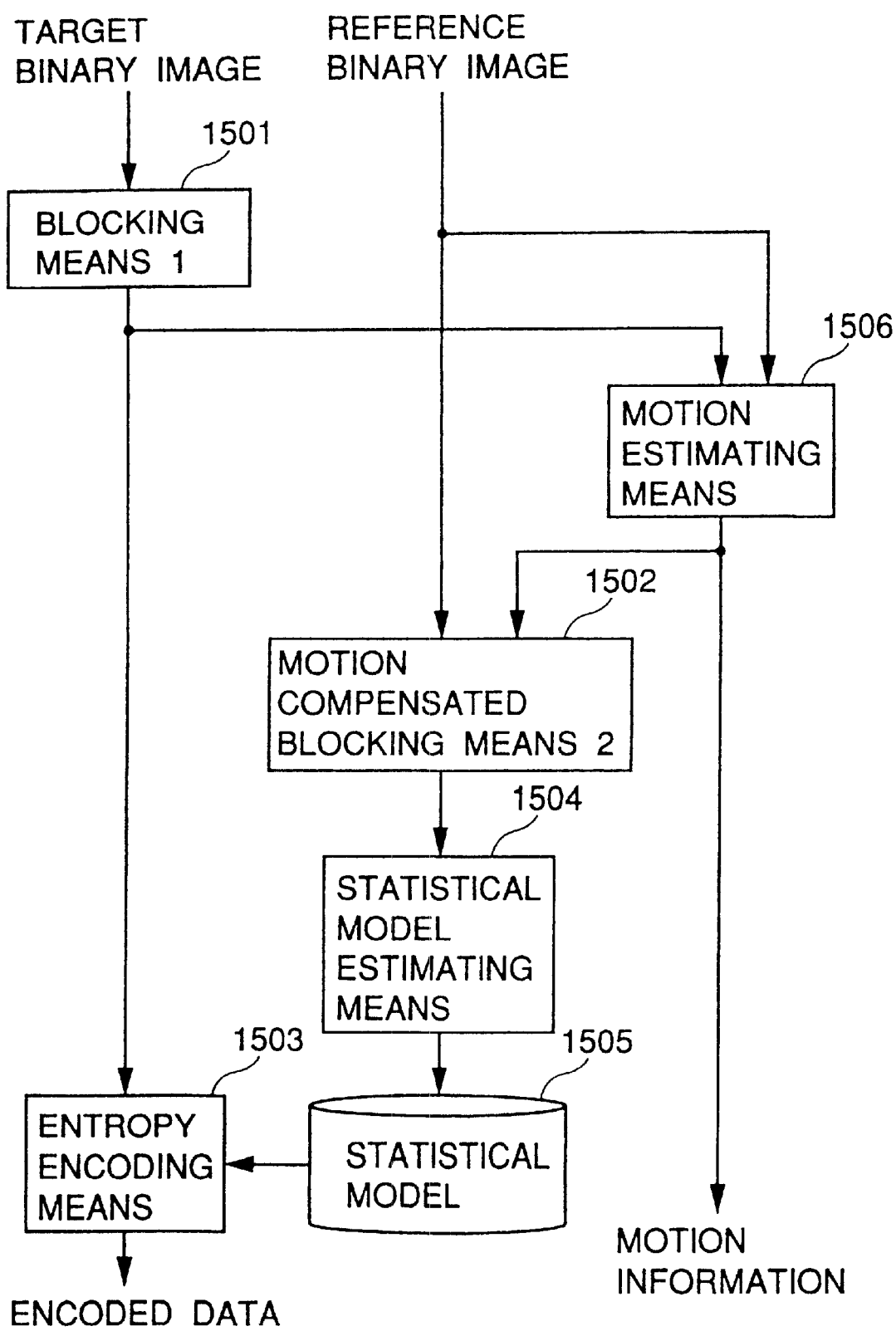
FIG. 15 is a block diagram of an image encoding apparatus according to an A15th embodiment of the present invention.

FIG. 15 is a block diagram showing the configuration of an image encoding apparatus according to an embodiment of the present invention. The configuration of this embodiment will be described below with reference to same figure.

In the figure, blocking means 1 (1501) is a means which takes as an input an image to be encoded and divides the input image into blocks each consisting of a plurality of pixels. Motion estimating means (1506) is a means which searches through a reference image for a block that resembles a target block, and which generates a motion vector for the block.

Motion compensated blocking means 2 (1502) is a means which takes the reference image and motion information as inputs and which, based on the motion information, divides the input reference image into blocks each consisting of a plurality of pixels.

Statistical model estimating means (1503) is a means which estimates a statistical model for a target block from a reference block, and stores the estimated model in a statistical model (1504).

Entropy encoding means (1505) is a means which encodes pixels in the target block based on the statistical model (1504), and outputs the encoded data.

The operation of the thus configured image encoding apparatus of the present embodiment will be described below, together with the operation of an image encoding method according to one embodiment of the present invention.

In operation, the blocking means 1 (1501) is equivalent to the blocking means 1 (101). The motion compensated blocking means 2 (1502) is equivalent to the motion compensated blocking means 2 (302). The statistical model estimating means (1504) is equivalent to the statistical model estimating means (1303). The entropy encoding means (1503) is equivalent to the entropy encoding means (1305). The motion estimating means (1506) is equivalent to the motion estimating means (305).

As described above, according to the present embodiment, using the motion estimating means and motion compensated blocking means, the accuracy of statistical model estimation is increased, thereby achieving efficient encoding with fewer code bits.

Embodiment A16

Figure 16:
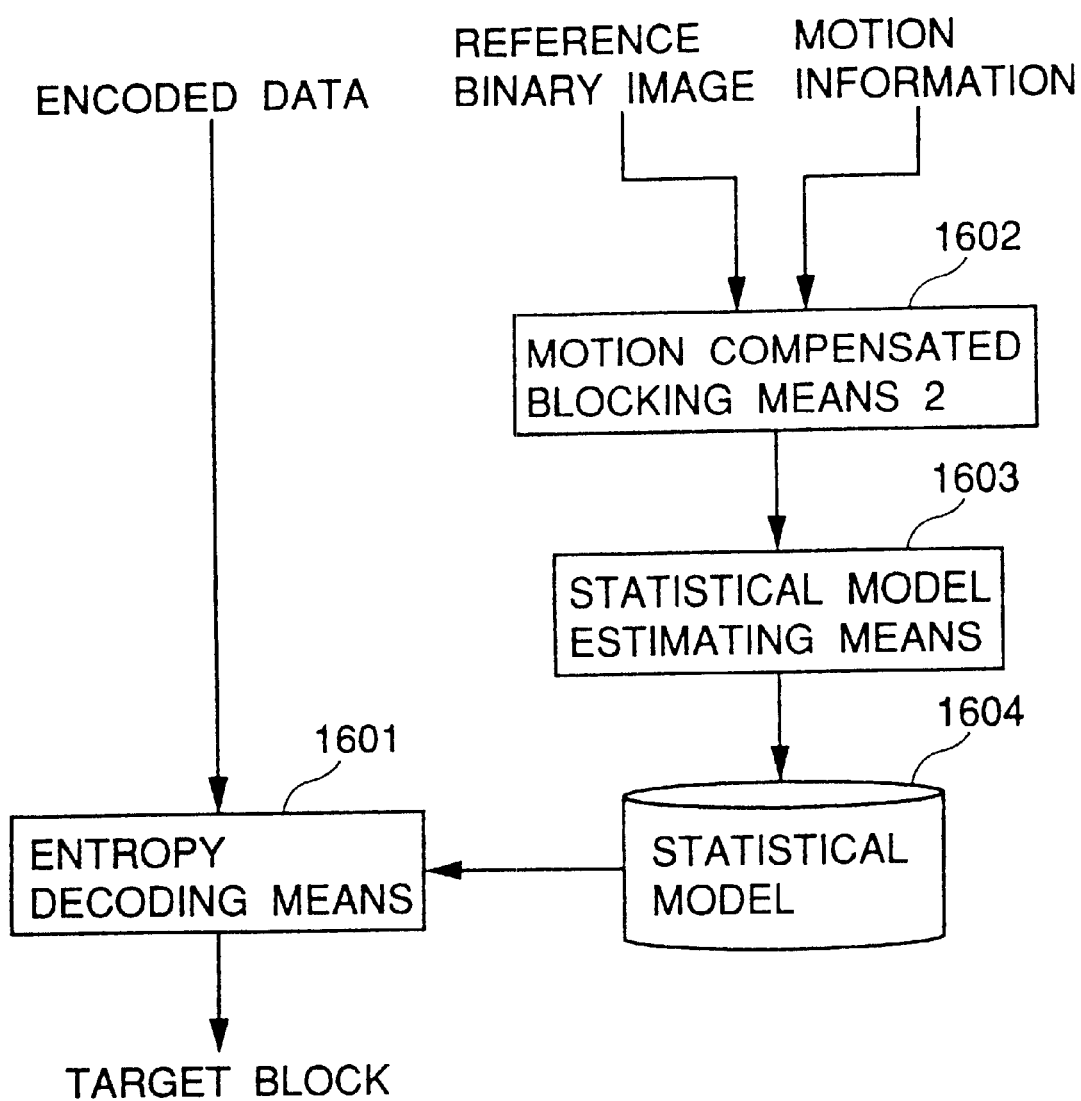
FIG. 16 is a block diagram of an image decoding apparatus according to an A16th embodiment of the present invention.

FIG. 16 is a block diagram showing the configuration of an image decoding apparatus according to an embodiment of the present invention. The configuration of this embodiment will be described below with reference to same figure.

In the figure, motion compensated blocking means 2 (1602) is a means which takes a reference image and the motion information as inputs and which, based on the motion information, divides the input reference image into blocks each consisting of a plurality of pixels. Statistical model estimating means (1603) is a means which estimates a statistical model for a target block from a reference block, and stores the estimated model in a statistical model (1604). Entropy decoding means (1601) is a means which takes the encoded data as an input, and which decodes the encoded data based on the statistical model (1604) and recovers the target block.

The operation of the thus configured image decoding apparatus of the present embodiment will be described below, together with the operation of an image decoding method according to one embodiment of the present invention.

In operation, the motion compensated blocking means 2 (1602) is equivalent to the motion compensated blocking means 2 (402). The statistical model estimating means (1603) is equivalent to the statistical model estimating means (1303). The entropy decoding means (1601) is equivalent to the entropy decoding means (1401).

As described above, according to the present embodiment, using the motion compensated blocking means 2, the accuracy of statistical model estimation is increased, thereby achieving efficient decoding with fewer code bits.

Embodiment A17

Figure 17:
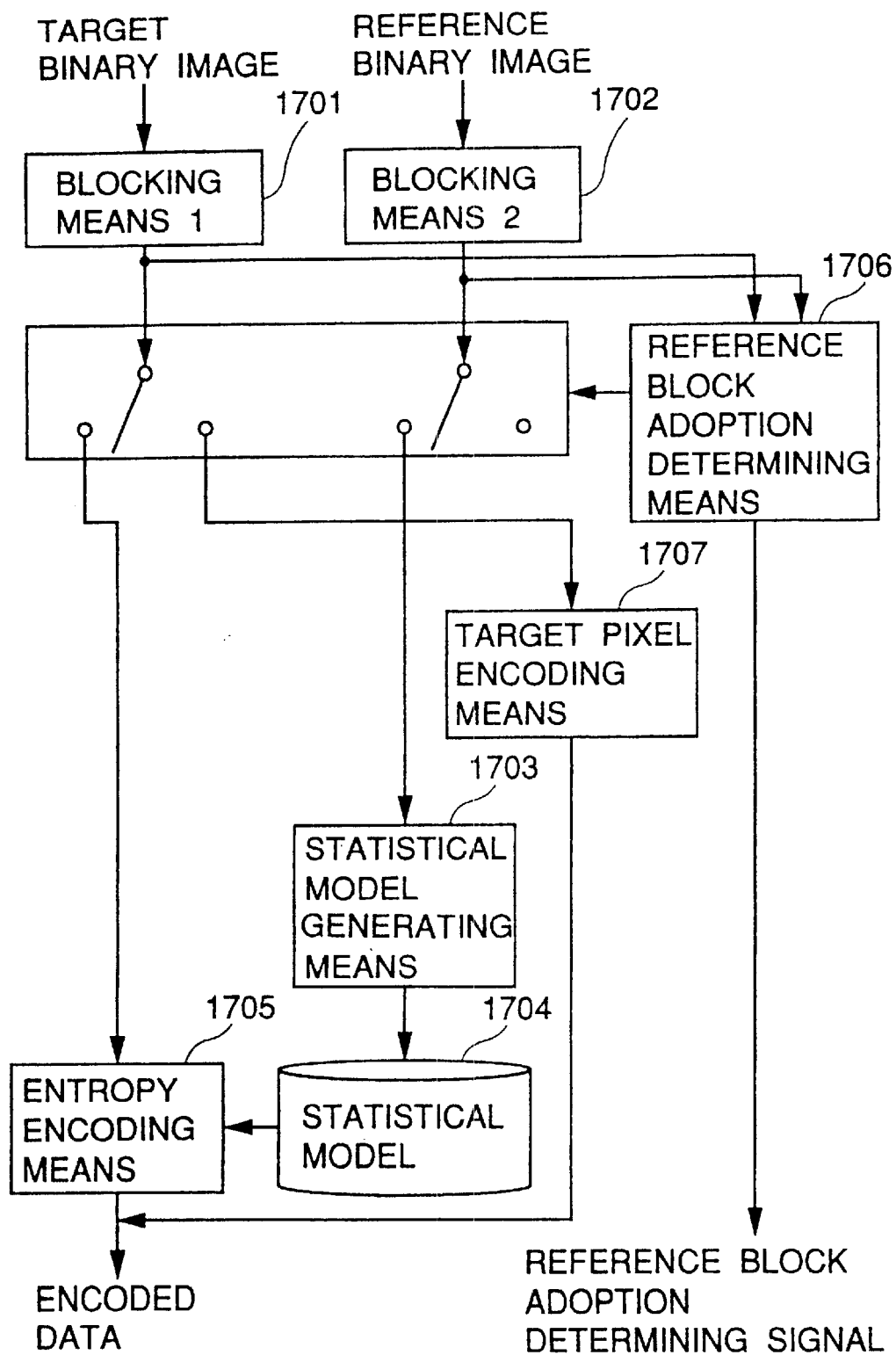
FIG. 17 is a block diagram of an image encoding apparatus according to an A17th embodiment of the present invention.

FIG. 17 is a block diagram showing the configuration of an image encoding apparatus according to an embodiment of the present invention. The configuration of this embodiment will be described below with reference to same figure.

In the figure, blocking means 1 (1701) is a means which takes as an input an image to be encoded and divides the input image into blocks each consisting of a plurality of pixels. Blocking means 2 (1702) is a means which takes a reference image as an input and divides the input reference image into blocks each consisting of a plurality of pixels. Statistical model estimating means (1703) is a means which estimates a statistical model for a target block from a reference block, and stores the estimated model in a statistical model (1704). Entropy encoding means (1705) is a means which inputs the output data from the blocking means 1 (1701), and which encoded the input data based on the statistical model (1704) and recovers the enclosed data. Reference block adoption determining means (1706) is a means which compares the target block with the reference block and outputs a reference block adoption determining signal for switching the subsequent processing.

The operation of the thus configured image encoding apparatus of the present embodiment will be described below, together with the operation of an image encoding method according to one embodiment of the present invention.

In operation, the blocking means 1 (1701) is equivalent to the blocking means 1 (101). The blocking means 2 (1702) is equivalent to the blocking means 2 (102). The statistical model estimating means (1703) is equivalent to the statistical model estimating means (1303). The entropy encoding means (1705) is equivalent to the entropy encoding means (1305). The reference block adoption determining means (1706) is equivalent to the reference block adoption determining means (505). The target pixel encoding means (1707) is equivalent to the target pixel encoding means (506).

As described above, according to the present embodiment, the reference block adoption determining means changes the coding scheme for a block that does not match the statistical model, thereby reducing the number of blocks inefficient in coding and thus achieving efficient encoding with fewer code bits.

Embodiment A18

Figure 18:
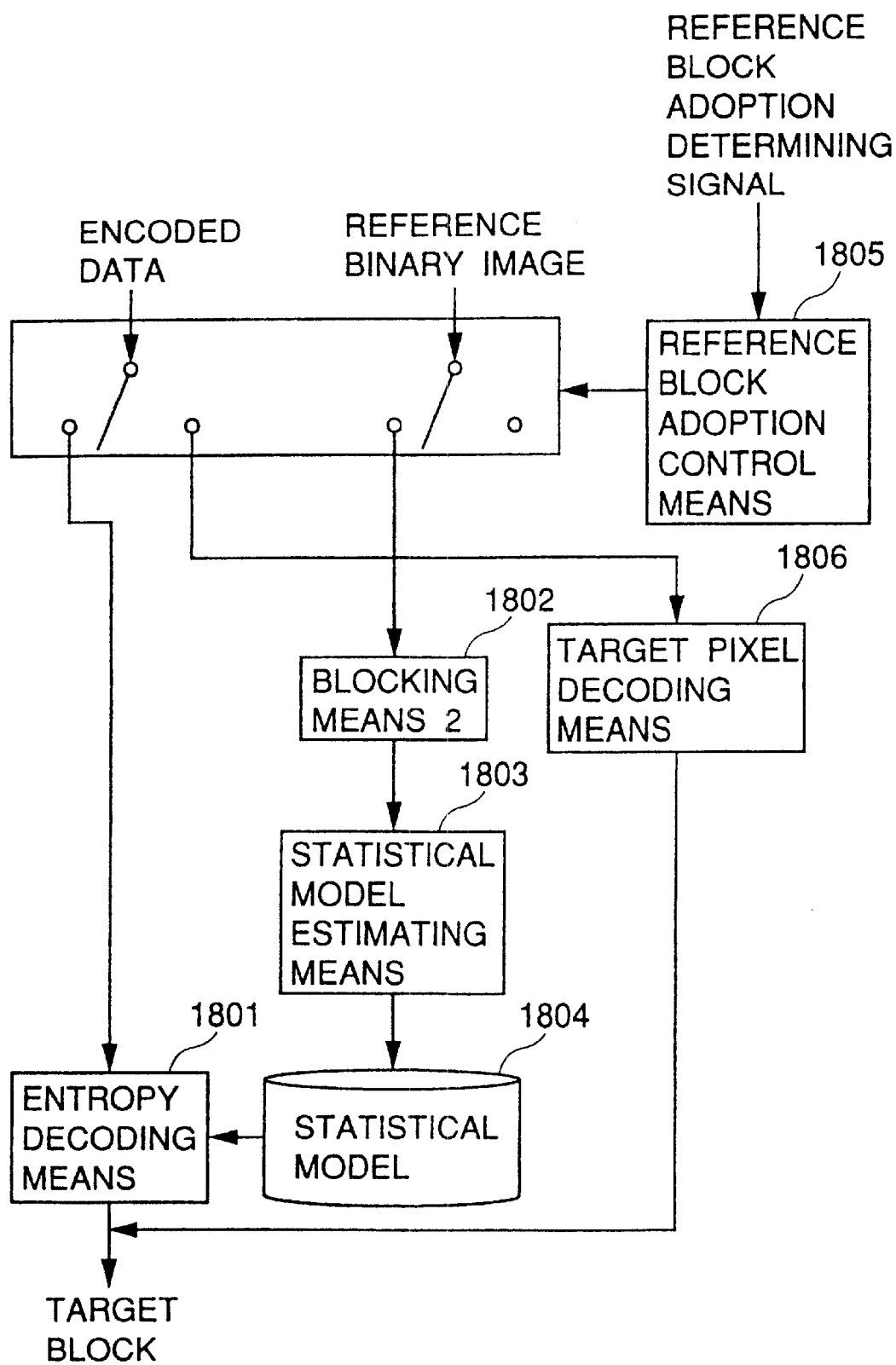
FIG. 18 is a block diagram of an image decoding apparatus according to an A18th embodiment of the present invention.

FIG. 18 is a block diagram showing the configuration of an image decoding apparatus according to an embodiment of the present invention. The configuration of this embodiment of will be described below with reference to same figure.

In the figure, blocking means 2 (1802) is a means which takes a reference image as an input and divides the input reference image into blocks each consisting of a plurality of pixels. Statistical model estimating means (1803) is a means which estimates a statistical model for a target block from a reference block, and stores the estimated model in a statistical model (1804). Entropy decoding means (1801) is a means which takes the encoded data as an input, and which decodes the encoded data based on the statistical model (1804) and recovers the target block. Reference block adoption control means (1805) is a means which switches the subsequent processing in accordance with the reference block adoption determining signal. Target pixel decoding means (1806) is a means which decodes the encoded data and outputs the decoded data of the target pixel.

The operation of the thus configured image decoding apparatus of the present embodiment will be described below, together with the operation of an image decoding method according to one embodiment of the present invention.

In operation, the blocking means 2 (1802) is equivalent to the blocking means 2 (102). The statistical model estimating means (1803) is equivalent to the statistical model estimating means (1303). The entropy decoding means (1801) is equivalent to the entropy decoding means (1401). The reference block adoption control means (1805) is equivalent to the reference block adoption control means (604). The target pixel decoding means (1806) is equivalent to the target pixel decoding means (605).

As described above, according to the present embodiment, the reference block adoption control means changes the coding scheme for a block that does not match the statistical model, thereby reducing the number of blocks inefficient in coding and thus achieving efficient decoding with fewer code bits.

In any one of the above-described embodiments, a magnetic recording medium or an optical recording medium may be created that holds a program for having a computer implement the functions of all or part of the means so far described so that the program can be run on the computer to carry out the above-described operations. In that case also, the same effects as described in connection with the respective embodiments can be obtained.

As described above, using the image encoding apparatus, image decoding apparatus, image encoding method, and image decoding method of the present invention, more efficient encoding and decoding can be achieved than when using the prior known binary image encoding and decoding techniques, for the reasons given below.

(1) In a binary moving image sequence, a target image is predicted from a reference image, and the residual is expressed by exclusive ORs.

(2) Appropriate statistical model is always used by changing the statistical model in accordance with the states of surrounding pixels in another frame having correlation.

(3) Appropriate statistical model is used by creating a statistical model from a reference image.

(4) The number of blocks that do not match the statistical model is reduced by using motion compensation or by changing the coding scheme using a threshold value and a sum of absolute differences.

Figure 30:
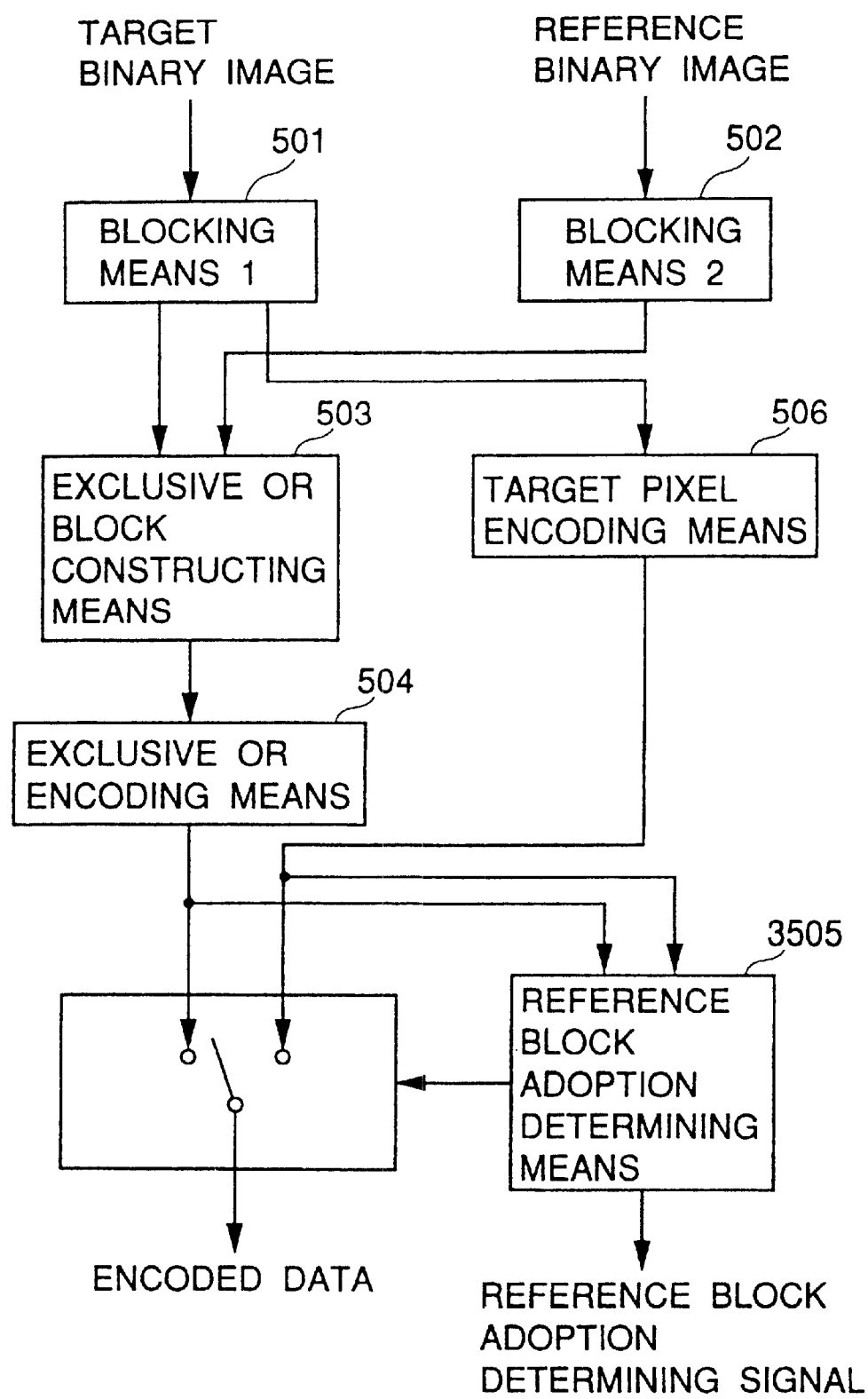
FIG. 30 is a block diagram of an image encoding apparatus according to another embodiment of the present invention.

The reference block adoption determining means of the present invention has been described in the fifth embodiment as being applied to the configuration shown in FIG. 5, but the applicable configuration is not limited to the previously described one; for example, the configuration shown in FIG. 30 is also applicable. That is, in the case of the image encoding apparatus shown in FIG. 30, the reference block adoption determining means 3505 outputs a reference block adoption determining signal for switching the subsequent processing, by comparing the number of code bits of the target block with that of the reference block. This point constitutes a major difference from the configuration of FIG. 5. More specifically, the reference block adoption determining means 3505 compares the number of code bits used in the target pixel encoding means 506 with the number of code bits used in the exclusive OR encoding means 504, and performs switching in such a manner that if the number of code bits from the target pixel encoding means 506 is smaller, the encoded data from that means is output, and if the number of code bits from the exclusive OR encoding means 504 is smaller, the encoded data from that means is output. Further, when the number of code bits from the target pixel encoding means 506 is smaller, the reference block adoption determining signal is output. In this way, according to this embodiment, the reference block adoption determining means 3505 switches the output of the encoded data by reference to the number of code bits, thereby reducing the number of blocks inefficient in coding and thus achieving efficient coding with fewer number of code bits. In FIG. 30, elements fundamentally the same as those in FIG. 5 are designated by the same reference numerals.

Figure 31:
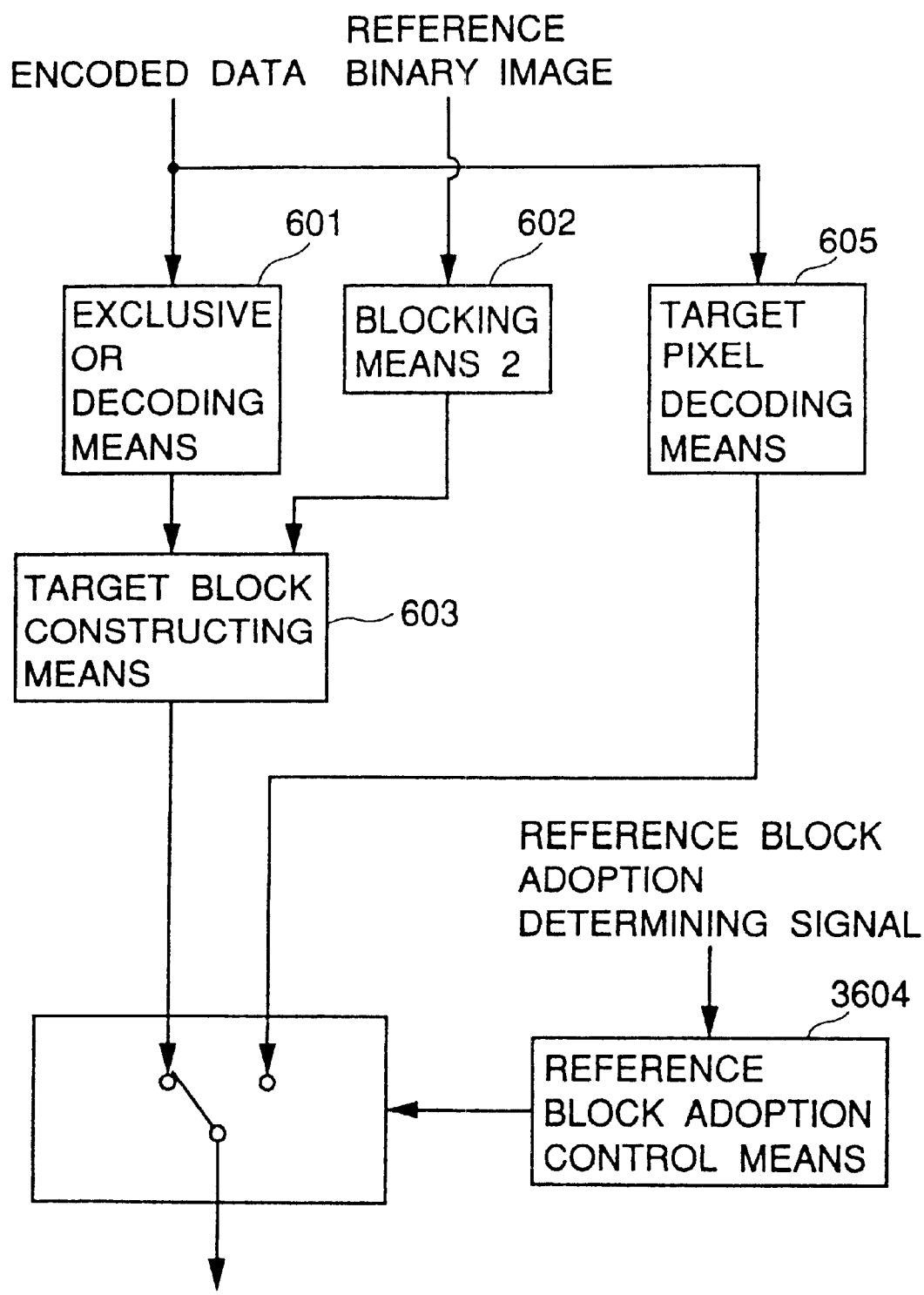
FIG. 31 is a block diagram of an image decoding apparatus according to the same embodiment.

The reference block adoption control means of the present invention has been described in the sixth embodiment as being applied to the configuration shown in FIG. 6, but the applicable configuration is not limited to the previously described one; for example, the configuration shown in FIG. 31 is also applicable. That is, the configuration of the image decoding apparatus shown in FIG. 31 includes: target pixel decoding means 605 for recovering the target block by decoding the encoded data output from the image encoding apparatus shown in FIG. 5 or 30; and reference block adoption control means 3604 for selecting, based on the reference block adoption determining signal output from the image encoding apparatus, the output from the target block constructing means 603 or the output from the target pixel decoding means 605 for output as the target block. This configuration achieves more efficient decoding compared with the prior art. In FIG. 31, elements fundamentally the same as those in FIG. 6 are designated by the same reference numerals.

Figure 32:
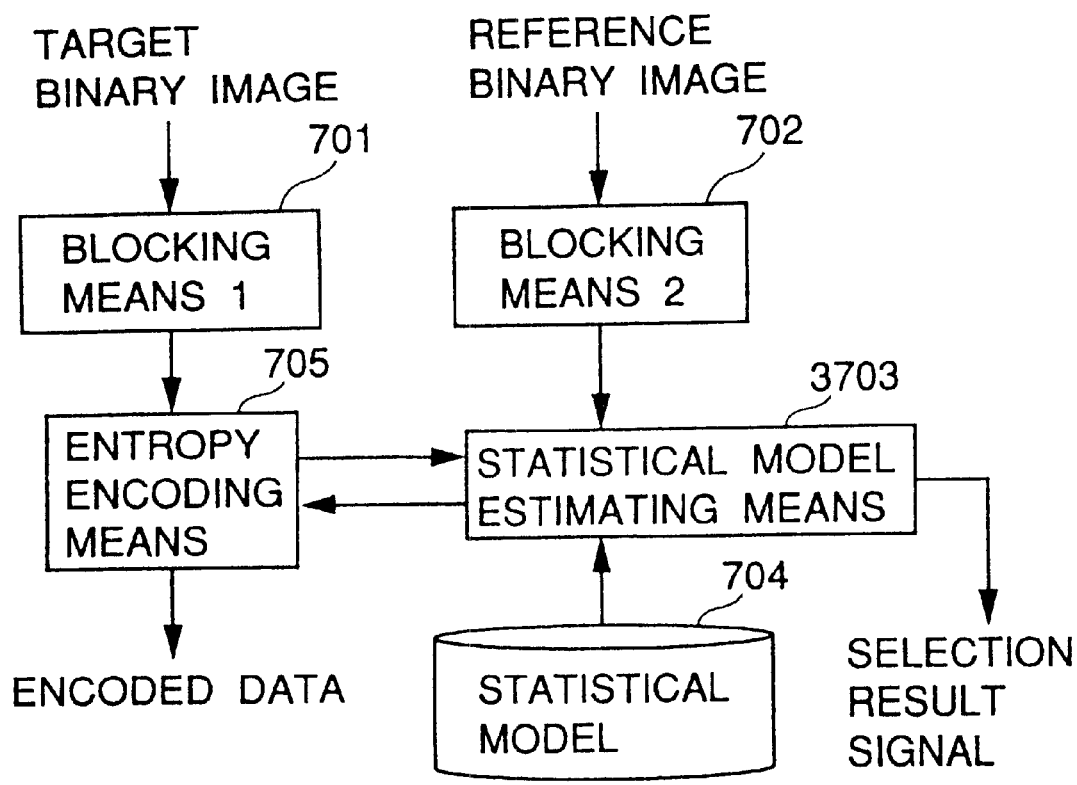
FIG. 32 is a block diagram of an image encoding apparatus according to still another embodiment of the present invention.

The statistical model selecting means of the present invention has been described in the seventh embodiment as being applied to the configuration in which the result of the statistical model selection is not transmitted to the decoding apparatus, but the applicable configuration is not limited to the previously described one; for example, as shown in FIG. 32, the statistical model selecting means 3703 may be configured to output the result of the statistical model selection as a selection result signal to the decoding apparatus. In FIG. 32, elements fundamentally the same as those in FIG. 7 are designated by the same reference numerals.

Figure 33:
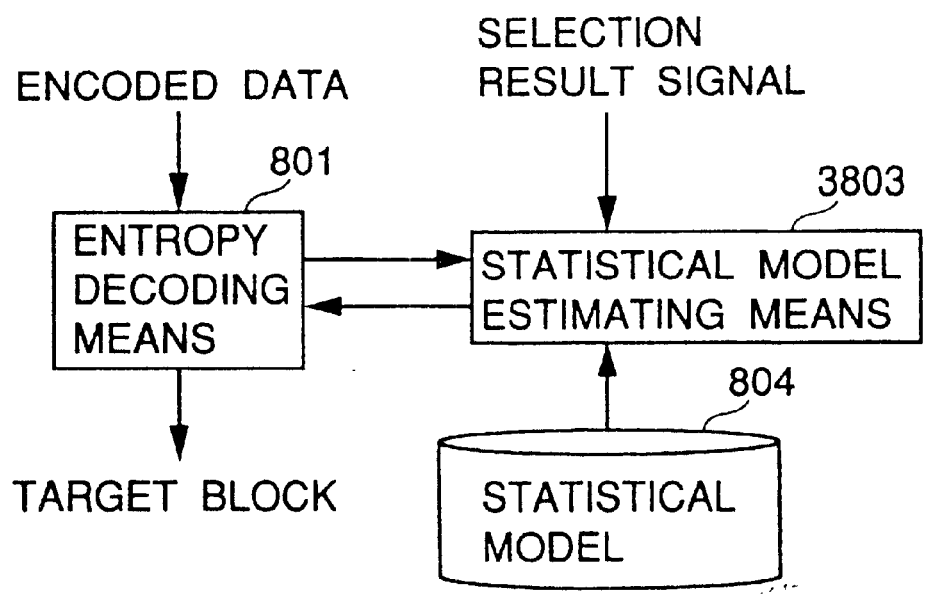
FIG. 33 is a block diagram of an image decoding apparatus according to the same embodiment.

The image decoding apparatus of the present invention has been described in the eighth embodiment as having a configuration corresponding to the configuration of the image encoding apparatus of the type that does not transmit the result of the statistical model selection to the decoding apparatus, but the configuration is not limited to the previously described one; for example, the configuration shown in FIG. 33 is also applicable. That is, the image decoding apparatus shown in FIG. 33 comprises: statistical model selecting means 3803 for receiving the selection result signal output from the image encoding apparatus shown in FIG. 32, and for selecting from among a plurality of statistical models a statistical model corresponding to the selection result signal; and entropy decoding means 801 for recovering the target block by entropy-decoding the encoded data output from the image encoding apparatus by using the selected statistical model. This configuration achieves more efficient decoding compared with the prior art. In this embodiment, blocking means 2 (802) such as shown in FIG. 8 can be eliminated. In FIG. 33, elements fundamentally the same as those in FIG. 8 are designated by the same reference numerals.

Figure 34:
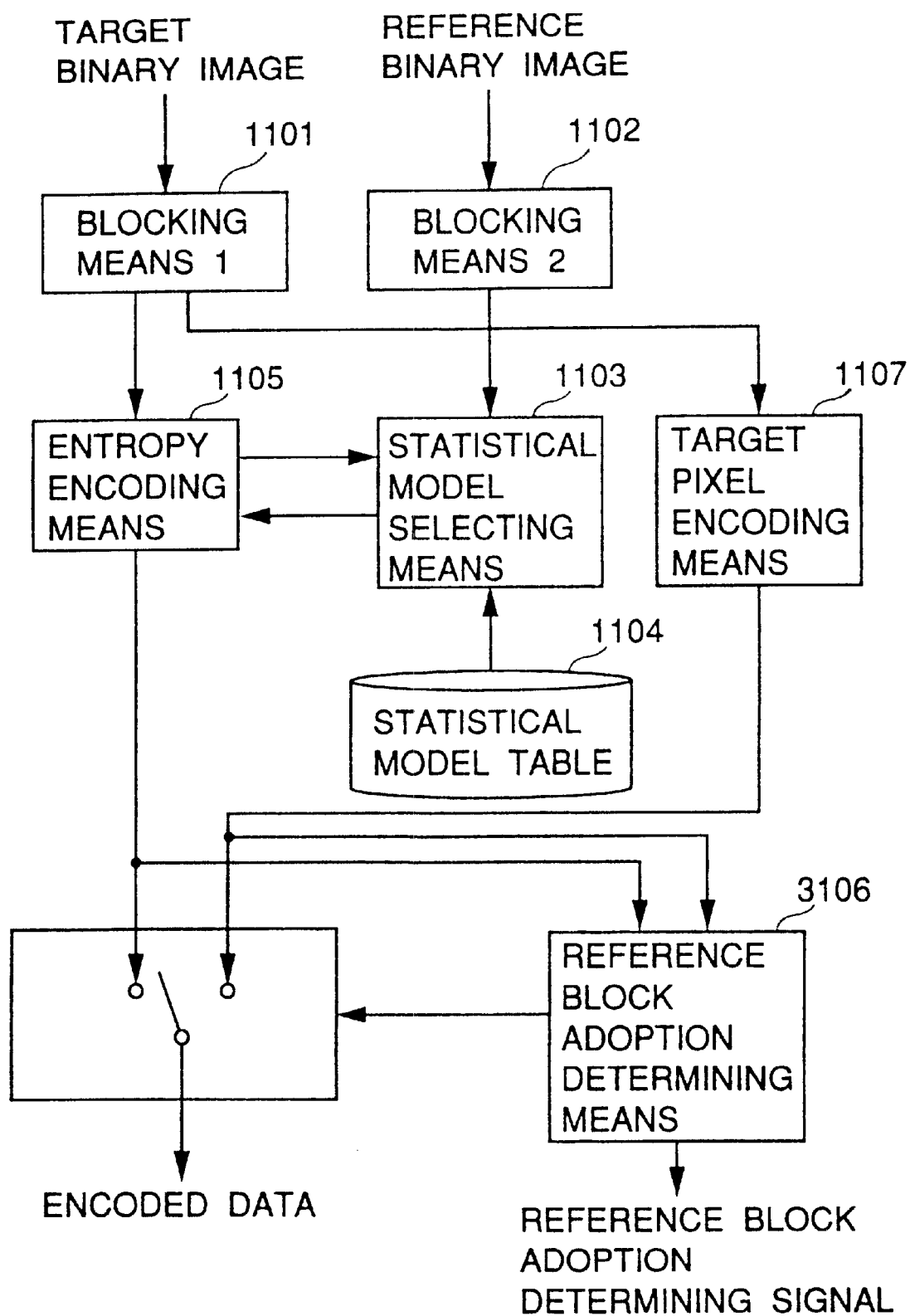
FIG. 34 is a block diagram of an image encoding apparatus according to yet another embodiment of the present invention.

The reference block adoption determining means of the present invention has been described in the 11th embodiment as being applied to the configuration shown in FIG. 11, but the applicable configuration is not limited to the previously described one; for example, the configuration shown in FIG. 34 is also applicable. That is, in the case of the image encoding apparatus shown in FIG. 34, the reference block adoption determining means 3106 outputs a reference block adoption determining signal for switching the subsequent processing, by comparing the number of code bits of the target block with that of the reference block. This point constitutes a major difference from the configuration of FIG. 11. More specifically, the reference block adoption determining means 3106 compares the number of code bits used in the target pixel encoding means 1107 with the number of code bits used in the entropy encoding means 1105, and performs switching in such a manner that if the number of code bits from the target pixel encoding means 1107 is smaller, the encoded data from that means is output, and if the number of code bits from the entropy encoding means 1105 is smaller, the encoded data from that means is output. Further, when the number of code bits from the target pixel encoding means 1107 is smaller, the reference block adoption determining signal is output. In this way, according to this embodiment, the reference block adoption determining means 3106 switches the output of the encoded data by reference to the number of code bits, thereby reducing the number of blocks inefficient in coding and thus achieving efficient encoding with fewer number of code bits. In FIG. 34, elements fundamentally the same as those in FIG. 11 are designated by the same reference numerals.

Figure 35:
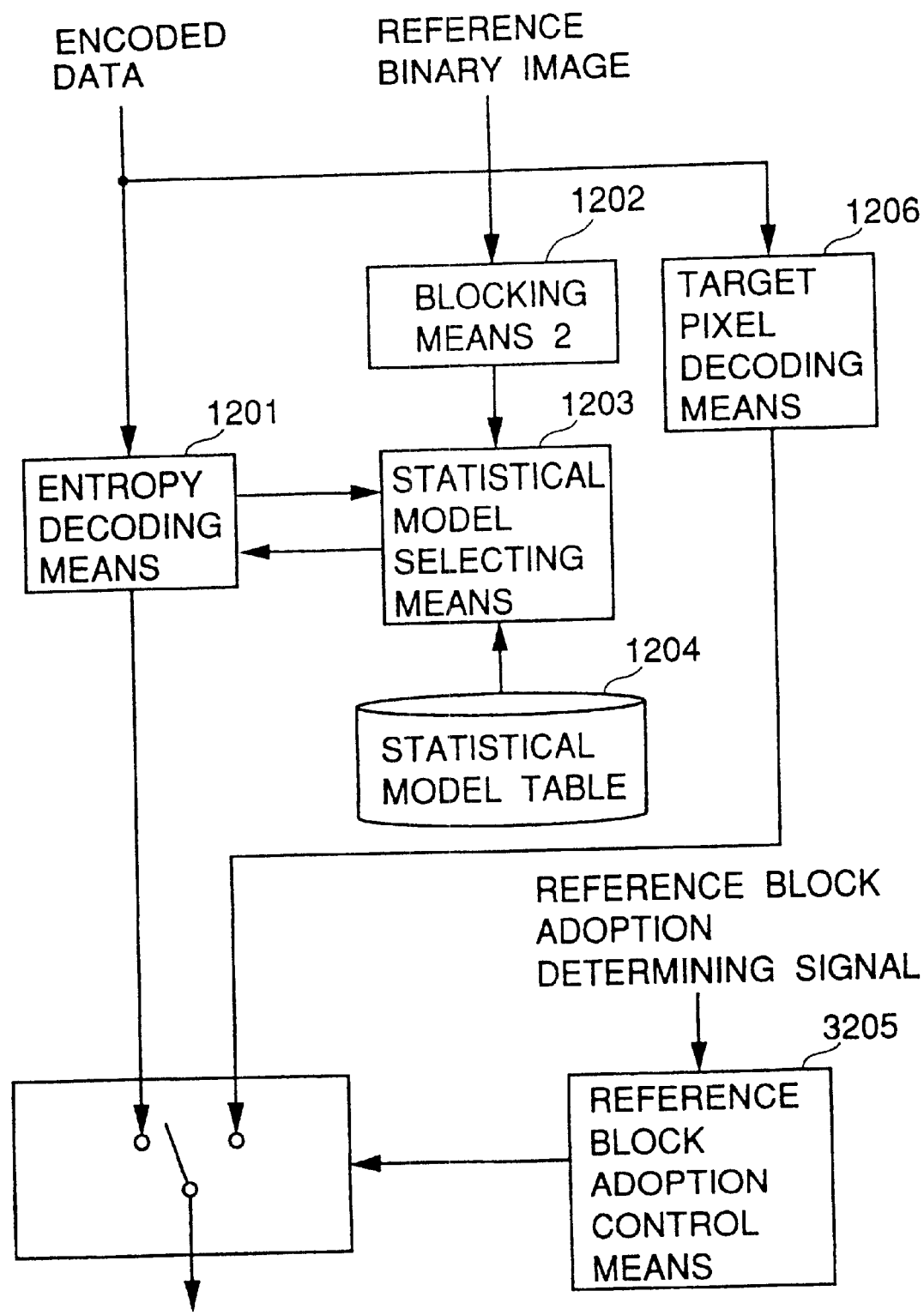
FIG. 35 is a block diagram of an image decoding apparatus according to the same embodiment.

The reference block adoption control means of the present invention has been described in the 12th embodiment as being applied to the configuration shown in FIG. 12, but the applicable configuration is not limited to the previously described one; for example, the configuration shown in FIG. 35 is also applicable. That is, the configuration of the image decoding apparatus shown in FIG. 35 includes: target pixel decoding means 1206 for recovering the target block by decoding the encoded data output from the image encoding apparatus shown in FIG. 11 or 34; and reference block adoption control means 3205 for selecting, based on the reference block adoption determining signal output from the image encoding apparatus, the output from the entropy decoding means 1201 or the output from the target pixel decoding means 1206 for output as the target block. This configuration achieves more efficient decoding compared with the prior art. In FIG. 35, elements fundamentally the same as those in FIG. 12 are designated by the same reference numerals.

Each of the above embodiments has been described for the case in which the (t+1)th frame of a moving image sequence is used as the target binary image and the t-th frame as the reference binary image, but the embodiments are not restricted to the illustrated case; for example, the same subject may be photographed by a stereocamera pair, and an image captured by one camera and an image captured by the other camera at the same time may be used as the target binary image and reference binary image, respectively. In this case also, the same effects as described in connection with the respective embodiments can be obtained.

As is apparent from the above description, the present invention offers the advantage of being able to achieve more efficient encoding and decoding than when using the prior art binary image coding techniques.

Further embodiments of the present invention will be described below with reference to drawings.

Embodiment B1

Figure 36:
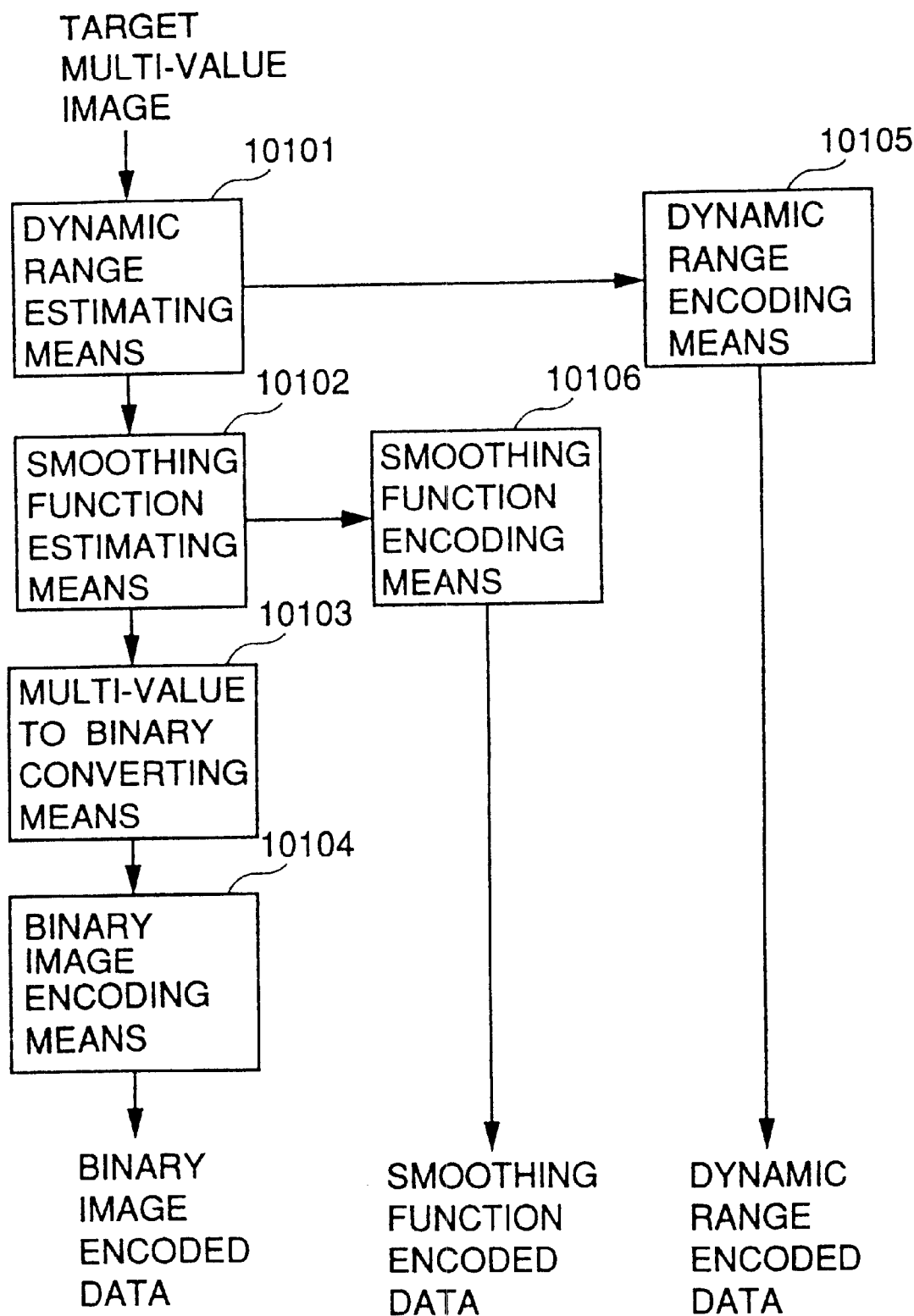
FIG. 36 is a block diagram of an image encoding apparatus according to a B1st embodiment of the present invention.

FIG. 36 is a block diagram showing the configuration of an image encoding apparatus according to a B1st embodiment of the present invention. The configuration of this embodiment will be described below with reference to same figure.

In the figure, dynamic range estimating means (10101) is a means which takes a target multi-value image as an input, extracts the pixel value of the largest area and the pixel value of the second largest area in the multi-value image, and outputs the pixel values as a dynamic range.

Smoothing function estimating means (10102) is a means which takes the multi-value image and dynamic range as inputs, and which estimates a smoothing function by analyzing luminance gradients in the multi-value image.

Multi-value to binary converting means (10103) is a means which performs luminance conversion using the dynamic range, and which generates a binary image from the multi-value image by using a threshold value as a multi-value to binary conversion criterion which is predetermined so that the original multi-value image could be well approximated if smoothing were done at the corresponding decoder side using the same smoothing function as mentioned above. Thresholding using this threshold value will be described in detail in the operational description hereinafter given. The smoothing function estimated by the smoothing function estimating means 10102 based on the multi-value image is a function so adjusted that the original multi-value image could, in effect or in approximation fashion, be reproduced if the smoothing function were applied to the corresponding binary image at the corresponding decoder side.

Dynamic range encoding means (10105) is a means which encodes the dynamic range and outputs the encoded data.

Binary image encoding means (10104) is a means which encodes the binary image and outputs the encoded data.

The operation of the thus configured image encoding apparatus of the present embodiment will be described below with reference to FIGS. 36 to 44, together with the operation of an image encoding method according to one embodiment of the present invention.

Figure 37:
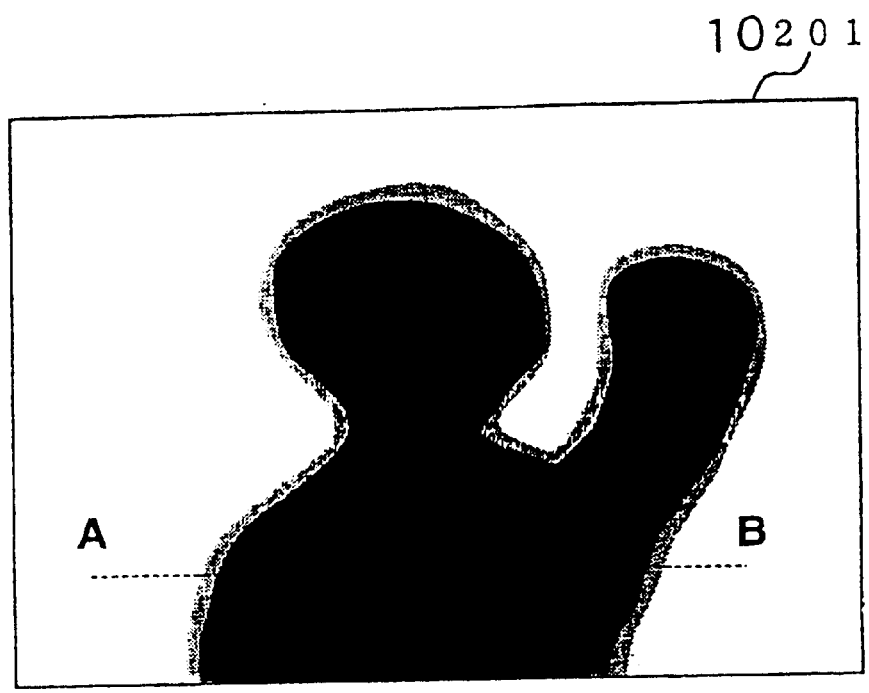
FIG. 37 is a diagram showing a multi-value image used in the same embodiment.
Figure 38:
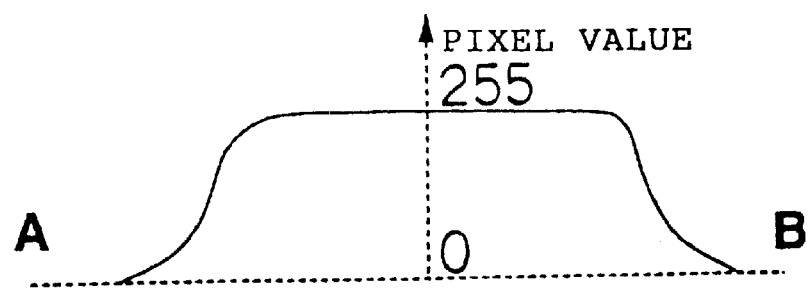
FIG. 38 is a distribution diagram of pixels values along line A–B in FIG. 37.

FIG. 37 is a diagram showing the target multi-value image. FIG. 38 is a distribution diagram of pixel values along line A–B in FIG. 37. As shown in FIG. 37, the pixel value of black is 255 and the pixel value of white is 0.

The dynamic range estimating means (10101) extracts the pixel value of the largest area and the pixel value of the second largest area in the multi-value image; in many multi-value images, these pixel values coincide with the largest pixel value and the smallest pixel value, respectively, so that in the present embodiment, the largest pixel value Dmax and the smallest pixel value Dmin are extracted by scanning the target multi-value image.

Figure 39:
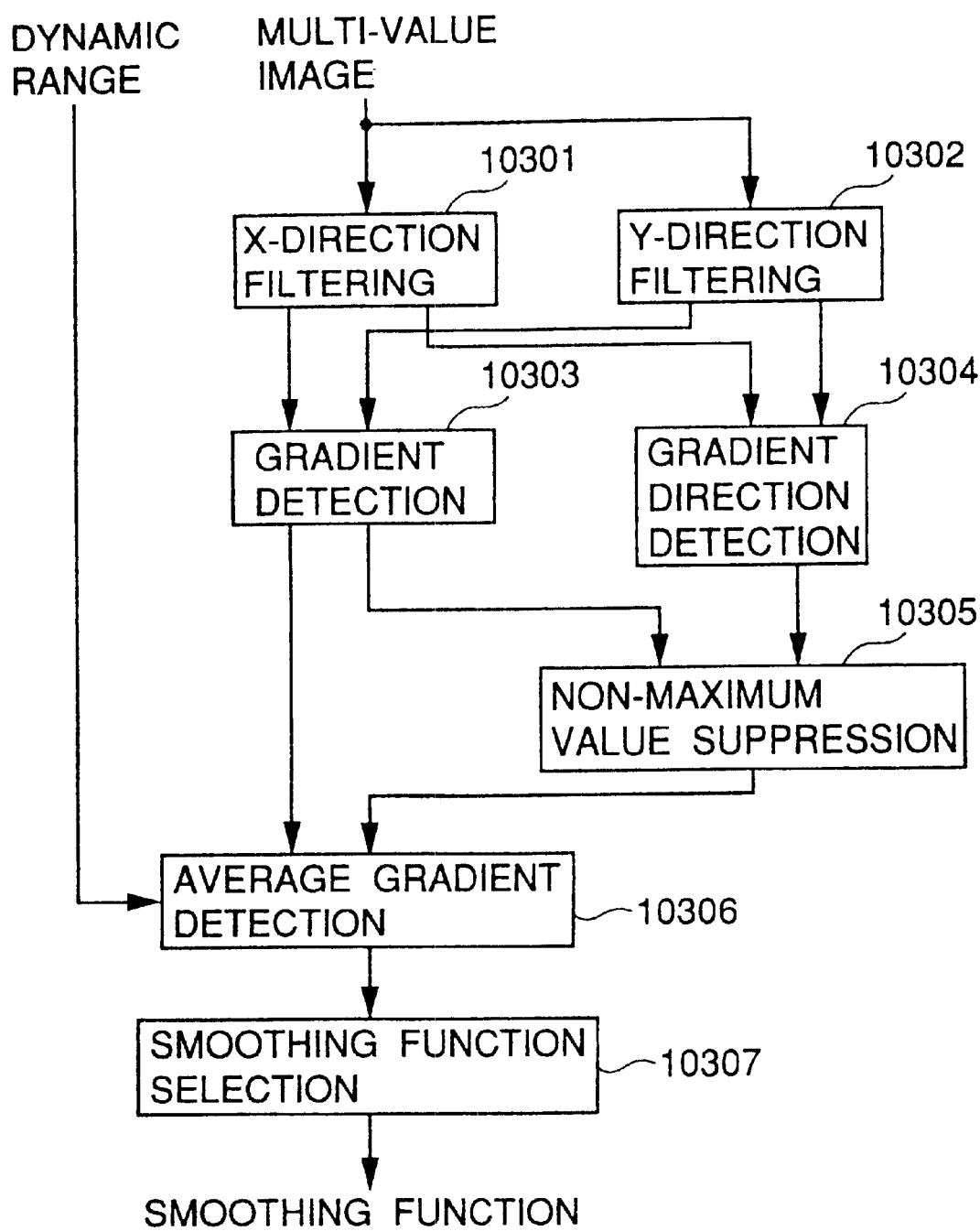
FIG. 39 is a block diagram of a smoothing function estimating means according to the B1st embodiment.

The smoothing function estimating means (10102) is shown in FIG. 39.

As shown in the figure, in x-direction filtering (10301), an x-direction filter (10401) is applied and scanned over the image to detect the gradient along the x-direction in the image.

In y-direction filtering (10302), a y-direction filter (10402) is applied and scanned over the image to detect the gradient along the y-direction in the image.

In gradient detection (10303), gradient d (i, j) is detected by calculating the following equation B1 using the x-direction gradient dx (i, j) obtained by the x-direction filtering (10301) and the y-direction gradient dy (i, j) obtained by the y-direction filtering (10302), where (i, j) are the coordinates on the image.

Equation B1

$$d(i,j) = \sqrt{dx(i,j)^2 + dy(i,j)^2} \quad (1)$$

In gradient direction detection (10304), gradient direction θ (i, j) is detected by calculating the following equation B2 using the x-direction gradient dx (i, j) obtained by the x-direction filtering (10301) and the y-direction gradient dy (i, j) obtained by the y-direction filtering (10302), where (i, j) are the coordinates on the image.

Equation B2

$$\theta = \tan^{-1}\frac{dy}{dx} \quad (2)$$

In non-maximum value suppression (10305), using a window that changes with θ, as shown in FIG. 40, an image is created in such a manner that if the value of the gradient at reference point within the window is a maximum value, the image portion at the coordinates of the reference point is assigned a value of 1; otherwise, the image portion at the coordinates of the reference point is assigned a value of 0.

In average gradient detection (10306), average gradient d'ave is obtained by calculating the average of the gradients detected in the gradient detection (10303) for the pixels of value 1 in the binary image obtained by the non-maximum value suppression (10305). Further, using the maximum pixel value Dmax and minimum pixel value Dmin detected by the dynamic range estimating means (10101), normalized average gradient is recalculated from equation B3 below to obtain dave.

Equation B3

$$d_{ave} = \frac{255}{D\max - D\min} d'_{ave} \quad (3)$$

Figure 42:
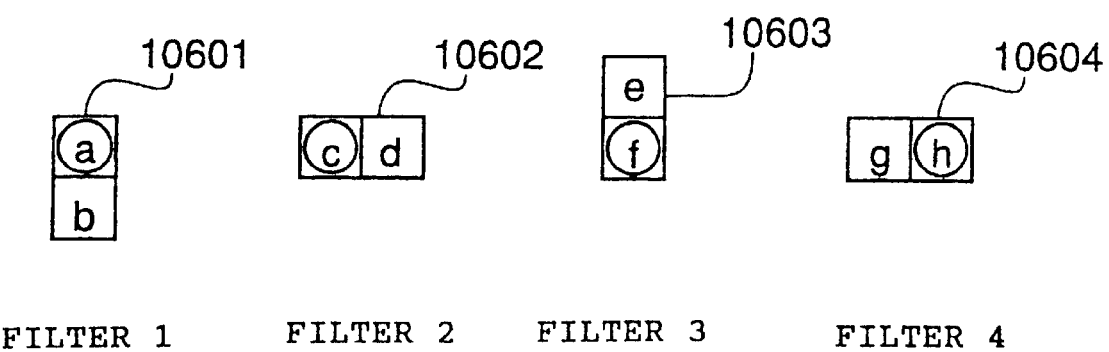
FIG. 42 is a diagram for explaining the smoothing filter according to the B1st embodiment.

Smoothing function selecting means (10307) selects a smoothing filter in accordance with the average gradient dave, as shown in FIG. 41. The detail of the smoothing filter 1 in FIG. 41 is shown in FIG. 42. In FIG. 42, the encircled position shows the location of the pixel to be subjected to smoothing. While scanning the image, the result of the convolution with the filter 1 (10601), the result of the convolution with the filter 2 (10602), the result of the convolution with the filter 3 (10603), and the result of the convolution with the filter 4 (10604) are respectively calculated, and the smallest value of the four filters is taken as the result of the smoothing filter 1. In FIG. 42, a, b, c, d, e, f, g, and h are each 0.5. The smoothing filter 2 is a filter that applies the smoothing filter 1 after applying the smoothing filter 1.

The smoothing filter 3 is a filter that applies the smoothing filter 1 after applying the smoothing filter 2. When dave is greater than 191, smoothing by the smoothing filter will not be applied, since the gradient of the image is considered to represent a step edge. On the other hand, when dave is smaller than 10, smoothing by the smoothing filter will not be applied, since it is considered that there is no image gradient.

Figure 43:
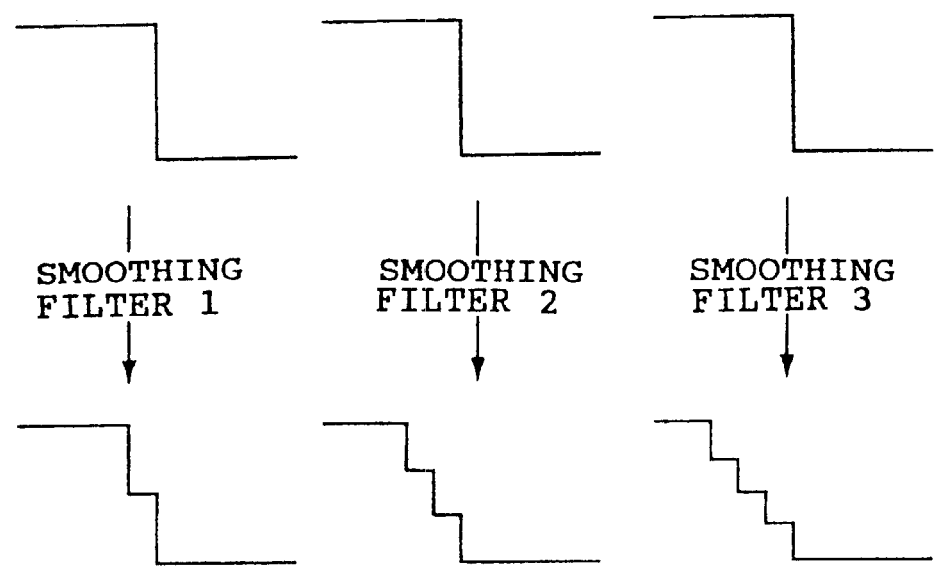
FIG. 43 is a diagram for explaining smoothing filter step responses according to the B1st embodiment.
Figure 44:
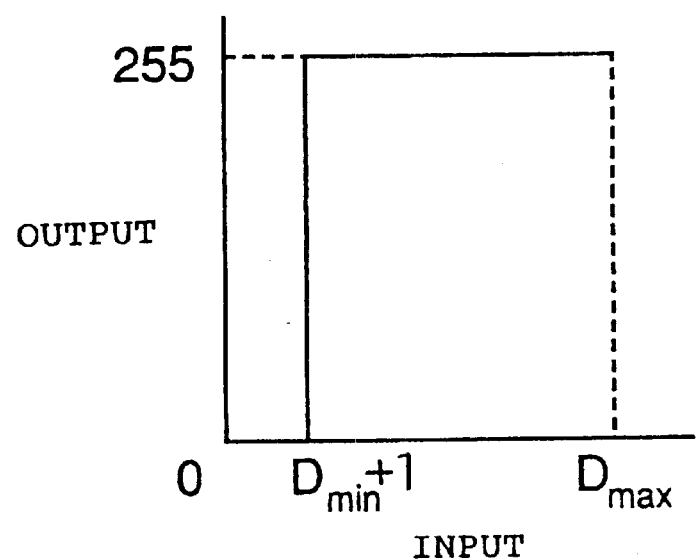
FIG. 44 is a diagram for explaining thresholding used in the embodiment.

The multi-value to binary converting means (10103) converts the multi-value image to a binary image having only two pixel values, 255 and 0, by considering the characteristic of the smoothing function estimated by the smoothing function estimating means (10102). The responses to one-dimensional steps of the smoothing filter 1, smoothing filter 2, and smoothing filter 3 are as shown in FIG. 43; accordingly, the multi-value to binary conversion corresponding to the smoothing filter 1, smoothing filter 2, and smoothing filter 3 is the thresholding such as shown in FIG. 44. Therefore, the multi-value to binary converting means (10103) applies the thresholding shown in FIG. 44 to the multi-value image.

The binary image encoding means (10104) encodes the binary image by using the binary image encoding scheme MMR, defined in CCITT's international standard traditionally used for facsimile systems, etc., and outputs the encoded data.

The smoothing function encoding means (10106) encodes the smoothing function estimated by the smoothing function estimating means (10102), and outputs the encoded data. In the present embodiment, since the smoothing function is selected from among the three smoothing functions, the identification number of the selected smoothing function is encoded which is output as the encoded data.

The dynamic range encoding means (10105) individually encodes the Dmax and Dmin obtained by the dynamic range estimating means (10101), and outputs the encoded data.

As described above, in the present embodiment, by utilizing the property of a multi-value image that almost all pixels in the image have a uniform minimum value or maximum value with intermediate values distributed along the boundary, the state of the distribution of the intermediate values is analyzed, the smoothing function that provides a good approximation of the intermediate value distribution is estimated, and a binary base image corresponding to the estimated smoothing function is estimated. By individually encoding the estimated maximum pixel value and minimum pixel value, the estimated smoothing function, and the estimated binary base image and outputting the results as encoded data, efficient encoding can be achieved.

Embodiment B2

Figure 45:
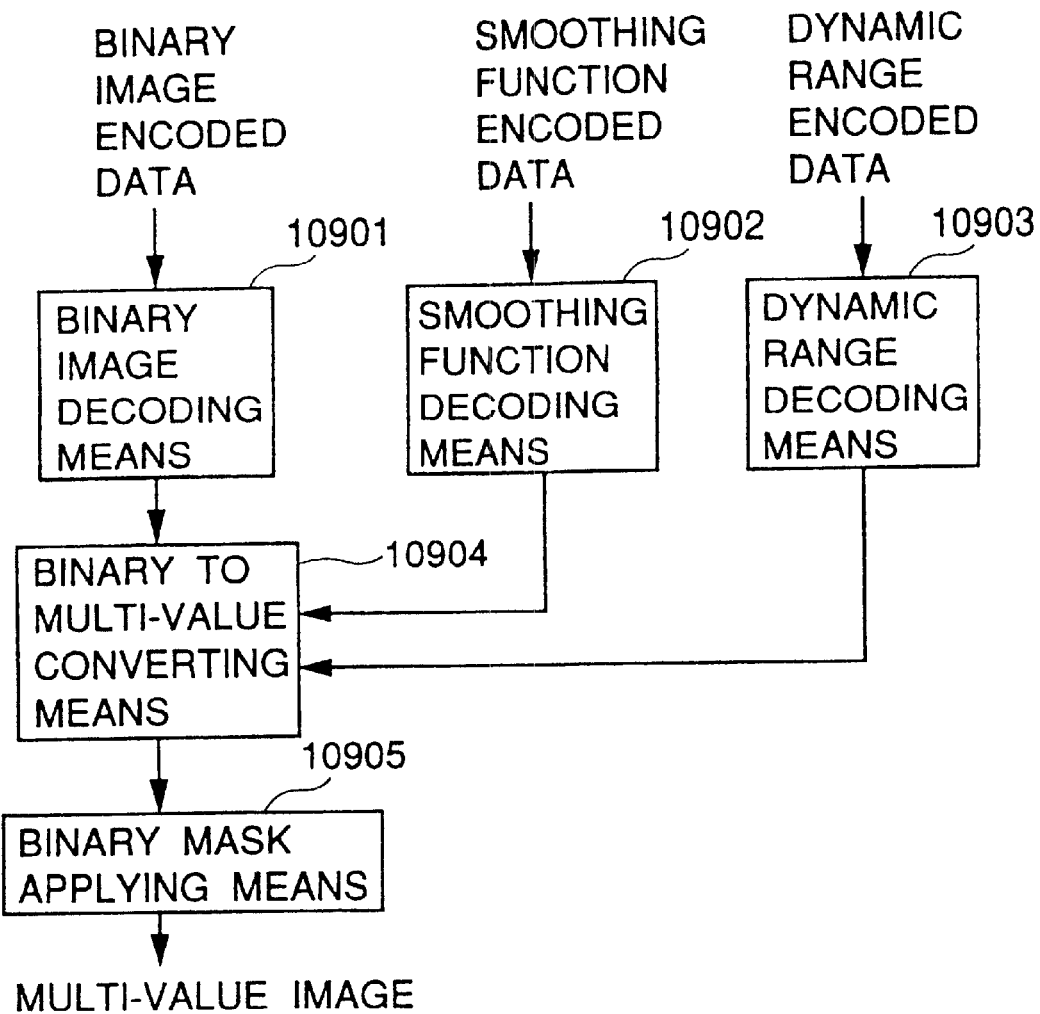
FIG. 45 is a block diagram of an image decoding apparatus according to a B2nd embodiment.

FIG. 45 is a block diagram showing the configuration of an image decoding apparatus according to a B2nd embodiment of the present invention. The configuration of this embodiment will be described below with reference to same figure.

In the figure, binary image decoding means (10901) is a means for recovering the binary image by decoding the binary image encoded data.

Smoothing function decoding means (10902) is a means for recovering the smoothing function by decoding the smoothing function encoded data.

Dynamic range decoding means (10903) is a means for recovering the dynamic range by decoding the dynamic range encoded data.

Binary to multi-value converting means (10904) is a means for recovering the multi-value image by smoothing the binary image using the smoothing function recovered by the smoothing function decoding means (10902), and by performing luminance conversion using the dynamic range as recovered by the dynamic range decoding means (10903).

Binary mask applying means (10905) is a means for obtaining a new multi-value image by applying masking to the multi-value image with the binary image recovered by the binary image decoding means (10901).

The operation of the thus configured image decoding apparatus of the present embodiment will be described below.

The binary image decoding means (10901) recovers the binary image having only two pixel values, 0 and 255, by decoding the binary image encoded data which was encoded using the binary image encoding scheme MMR defined in CCITT's international standard traditionally used for facsimile systems, etc.

The smoothing function decoding means (10902) recovers the smoothing function by decoding the smoothing function encoded data.

The dynamic range decoding means (10903) recovers the maximum pixel value Dmax and minimum pixel value Dmin by decoding the dynamic range encoded data.

Figure 46:
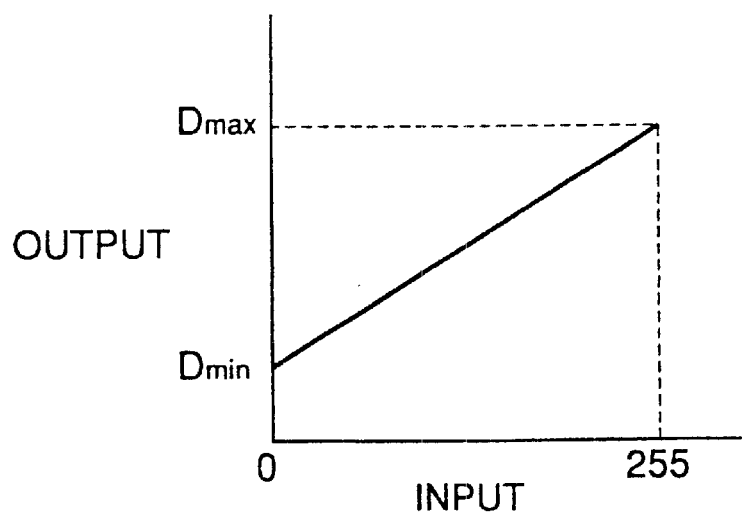
FIG. 46 is a diagram for explaining pixel value conversion used in the embodiment.

The binary to multi-value converting means (10904) actually applies the smoothing filter recovered by the smoothing function decoding means (10902). (For the method of applying the smoothing filter, refer to the description of the smoothing function selecting means (10307) and FIG. 42.) Further, using the maximum pixel value Dmax and minimum pixel value Dmin recovered by the dynamic range decoding means (10903), a linear conversion is performed as shown in FIG. 46, to recover the multi-value image. In the binary mask applying means (10905), using the binary image recovered by the binary image decoding means (10901), the values of the pixels in the multi-value image that correspond to the pixels of value 0 in the binary image are forcefully changed to Dmin so that the pixels in the encoded multi-value image that have a minimum pixel value do not take any other value than the minimum pixel value. The binary mask applying means (10905) is effective particularly when there is a need to restrict the position of Dmin to maintain matching with texture data, but can be omitted if there is no such need.

As described above, in the present embodiment, by utilizing the property of a multi-value image that almost all pixels in the image have a uniform minimum value or maximum value with intermediate values distributed along the boundary, the state of the distribution of the intermediate values is analyzed, the smoothing function that provides a good approximation of the intermediate value distribution is estimated, and a binary base image corresponding to the estimated smoothing function is estimated. By individually encoding and outputting the estimated maximum pixel value and minimum pixel value, the estimated smoothing function, and the estimated binary base image, and by decoding the encoded data thus output, efficient decoding with fewer code bits can be achieved.

Embodiment B3

Figure 47:
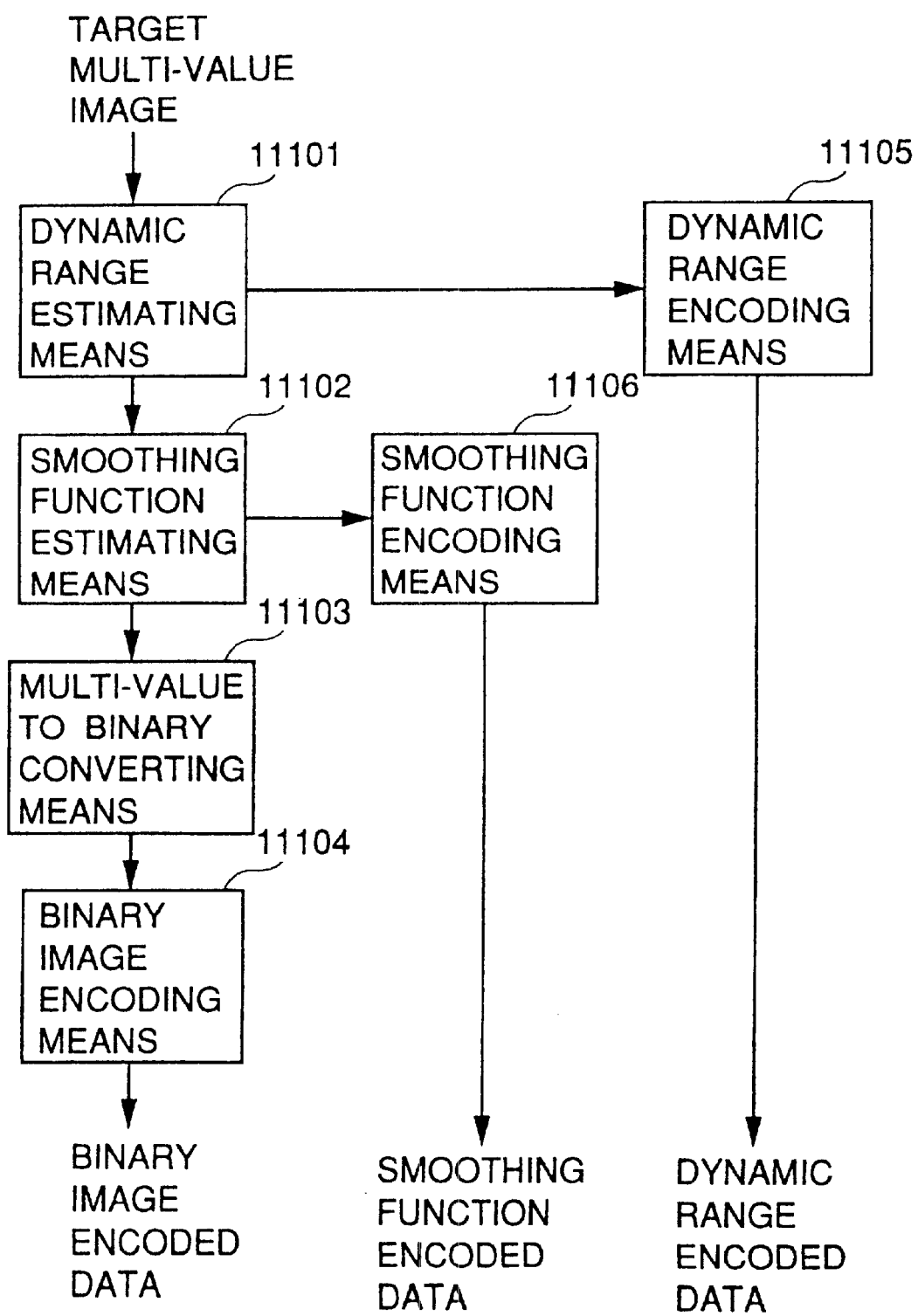
FIG. 47 is a block diagram of an image encoding apparatus according to a B3rd embodiment.

FIG. 47 is a block diagram showing the configuration of an image encoding apparatus according to a B3rd embodiment of the present invention. The configuration of this embodiment will be described below with reference to same figure.

In the figure, dynamic range estimating means (11101) is a means which takes a target multi-value image as an input, and which extracts the pixel value of the largest area and the pixel value of the second largest area in the multi-value image.

Smoothing function estimating means (11102) is a means which takes the multi-value image and dynamic range as inputs, and which estimates a smoothing function by analyzing luminance gradients in the multi-value image.

Multi-value to binary converting means (11103) is a means which generates a binary image by using the dynamic range, smoothing function, and multi-value image so that the multi-value image can be well approximated when luminance conversion is performed using the dynamic range and smoothing is done using the smoothing function.

Dynamic range encoding means (11105) is a means which encodes the dynamic range and outputs the encoded data.

Smoothing function encoding means (11106) is a means which encodes the smoothing function and outputs the encoded data.

Binary image encoding means (11104) is a means which encodes the binary image and outputs the encoded data.

The operation of the thus configured image encoding apparatus of the present embodiment will be described below.

The dynamic range estimating means (11101) extracts the pixel value of the largest area and the pixel value of the second largest area in the multi-value image; in many multi-value images, these pixel values coincide with the largest pixel value and the smallest pixel value, respectively, so that in the present embodiment, the largest pixel value Dmax and the smallest pixel value Dmin are extracted by scanning the target multi-value image.

Figure 48:
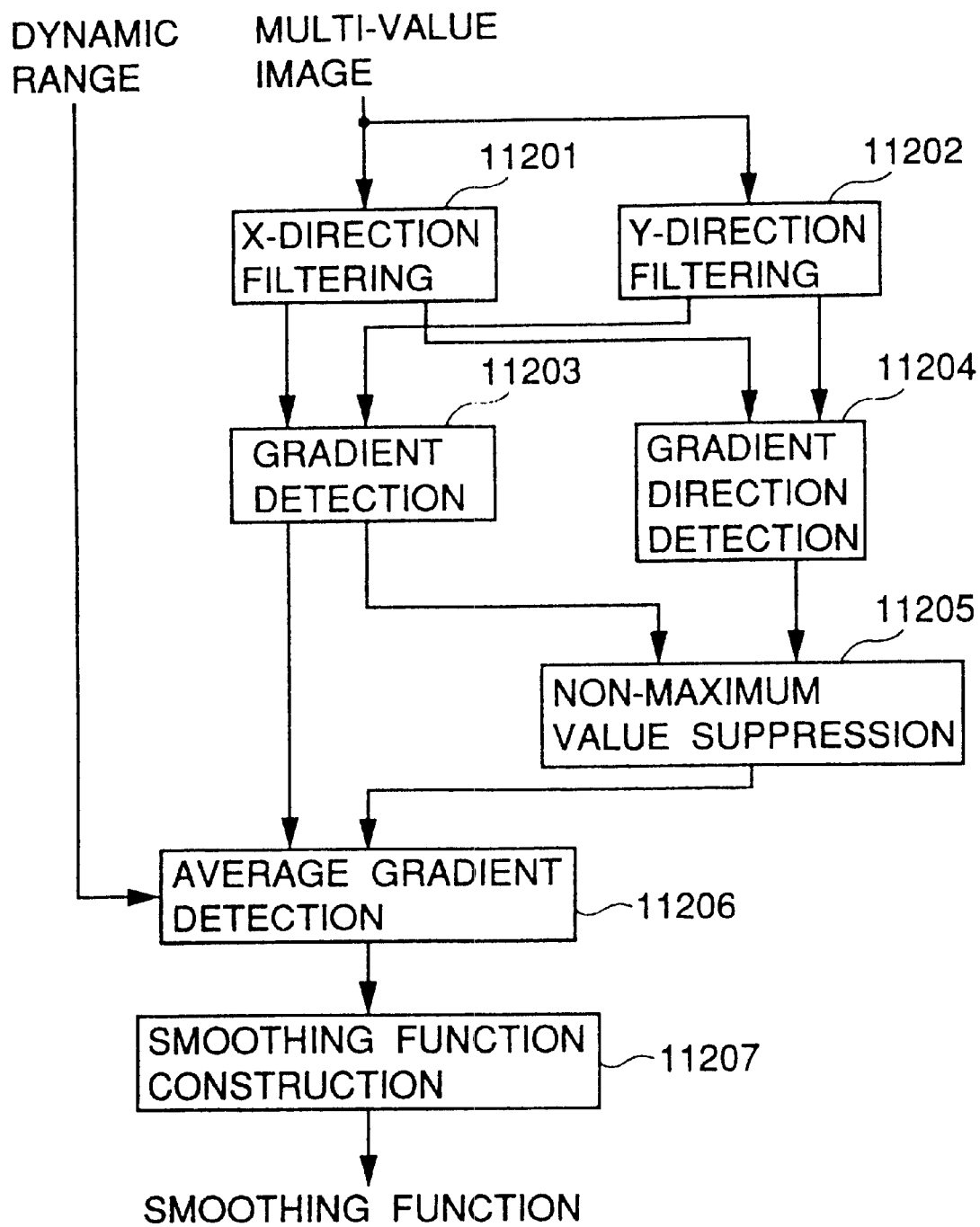
FIG. 48 is a block diagram of a smoothing function estimating means according to the B3rd embodiment.

The smoothing function estimating means (11102) is shown in FIG. 48.

In x-direction filtering (11201), an x-direction filter (10401) is applied and scanned over the image to detect the gradient along the x-direction in the image. In y-direction filtering (11202), a y-direction filter (10402) is applied and scanned over the image to detect the gradient along the y-direction in the image.

In gradient detection (11203), gradient d (i, j) is detected by calculating equation B1 using the x-direction gradient dx (i, j) obtained by the x-direction filtering (11201) and the y-direction gradient dy (i, j) obtained by the y-direction filtering (11202), where (i, j) are the coordinates on the image.

In gradient direction detection (11204), gradient direction θ (i, j) is detected by calculating equation B2 using the x-direction gradient dx (i, j) obtained by the x-direction filtering (11201) and the y-direction gradient dy (i, j) obtained by the y-direction filtering (11202), where (i, j) are the coordinates on the image.

In non-maximum value suppression (11205), using a window that changes with θ, as shown in FIG. 40, an image is created in such a manner that if the value of the gradient at reference point within the window is a maximum value, the image portion at the coordinates of the reference point is assigned a value of 1; otherwise, the image portion at the coordinates of the reference point is assigned a value of 0.

In average gradient detection (11206), average gradient d'ave is obtained by calculating the average of the gradients detected in the gradient detection (11203) for the pixels of value 1 in the binary image obtained by the non-maximum value suppression (11205). Further, using the maximum pixel value Dmax and minimum pixel value Dmin detected by the dynamic range estimating means (11101), normalized average gradient is recalculated from equation B3 to obtain dave.

Figure 50:
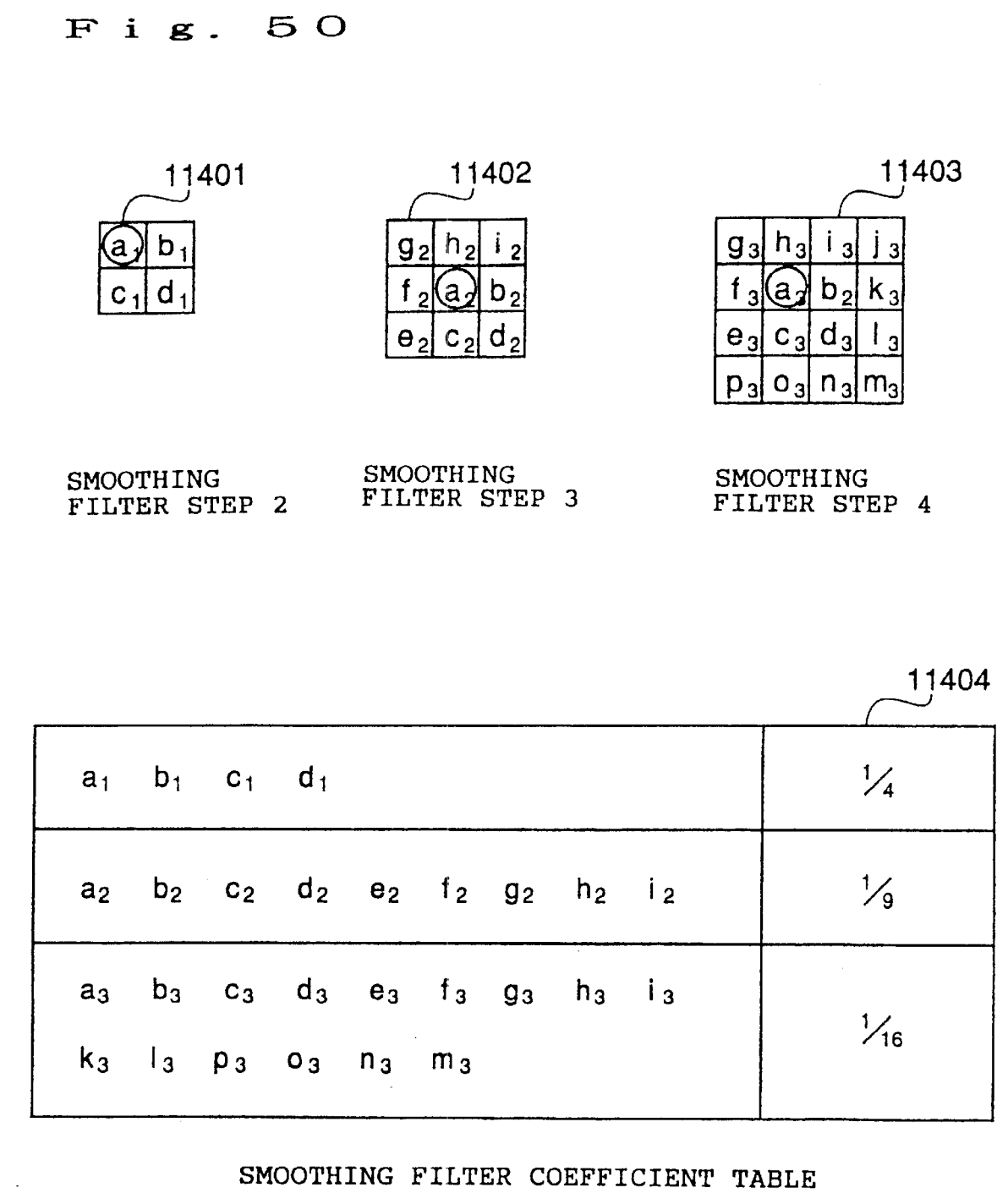

In smoothing function construction (11207), a smoothing filter is constructed in accordance with the normalized average gradient dave, as shown in FIG. 49. The number of steps of the constructed smoothing filter is varied according to the gradient, as shown in FIG. 49. The detail of the smoothing filter of FIG. 49 is shown in FIG. 50. In the figure, the smoothing filter step 2, smoothing filter step 3, and smoothing filter step 4 are designated by 11401, 11402, and 11403, respectively. Smoothing filter coefficient table 11404 is also shown in the figure. When dave is greater than 191, smoothing by the smoothing filter will not be applied, since the gradient of the image is considered to represent a step edge. On the other hand, when dave is smaller than 10, smoothing by the smoothing filter will not be applied, since it is considered that there is no image gradient.

Figure 51:
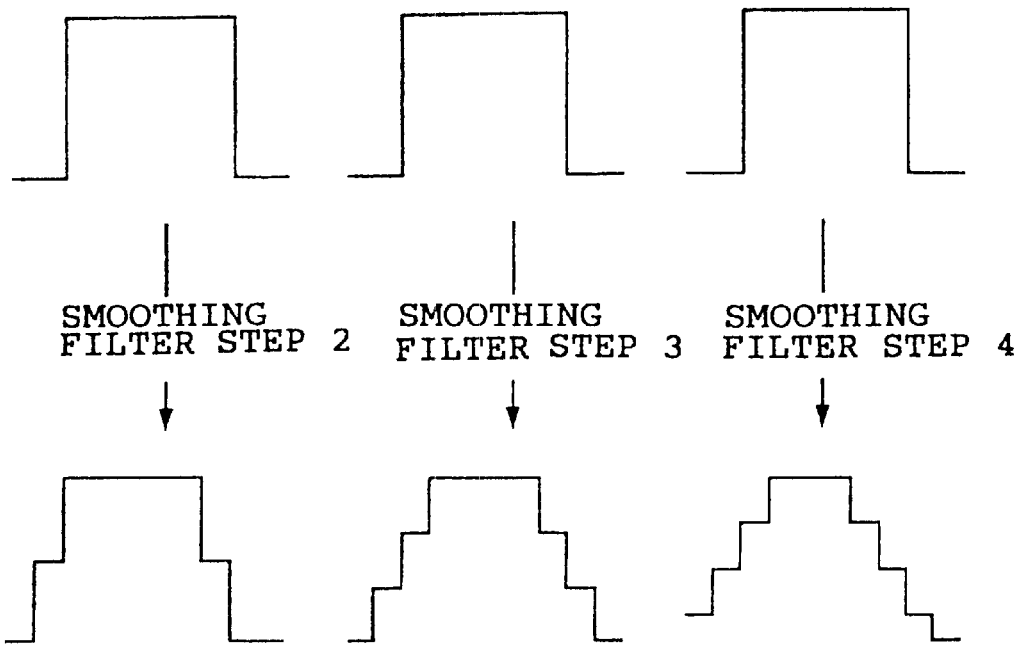
FIG. 51 is a diagram for explaining smoothing filter step responses according to the B1st embodiment.
Figure 52:
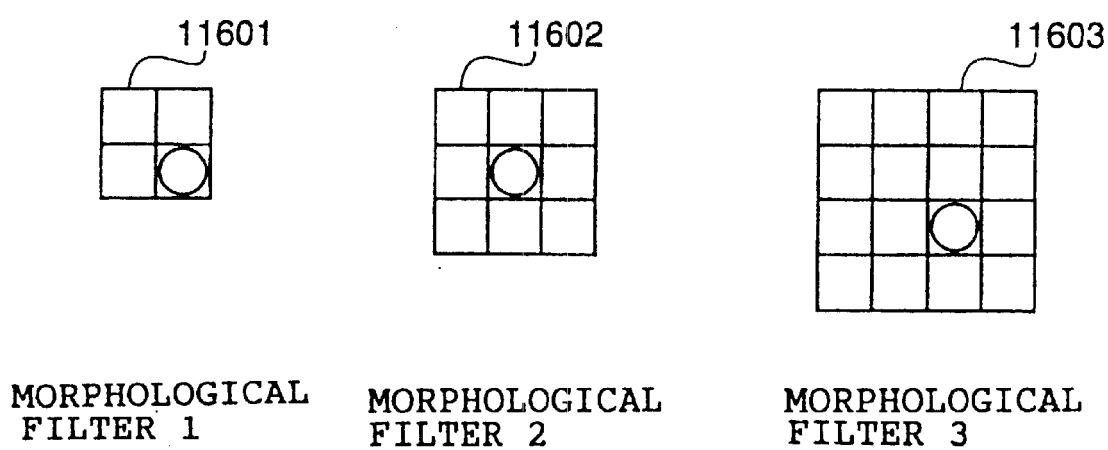
FIG. 52 is a diagram for explaining a morphological filter in the embodiment.

The multi-value to binary converting means (11103) converts the multi-value image to a binary image having only two pixel values, 255 and 0, by considering the characteristic of the smoothing function estimated by the smoothing function estimating means (11102). The responses to one-dimensional steps of the smoothing filter step 2, smoothing filter step 3, and smoothing filter step 4 are as shown in FIG. 51; accordingly, the multi-value to binary conversion corresponding to the smoothing filter step 2 (11401), smoothing filter step 3 (11402), and smoothing filter step 4 (11403) involves the thresholding shown in FIG. 44 followed by morphological processing with a morphological filter such as shown in FIG. 52. That is, the processing is such that when the smoothing filter step 2 is constructed, the reference point is replaced by the smallest value within the filter window by using the morphological filter 1 (11601); when the smoothing filter step 3 (11603) is constructed, the reference point is replaced by the smallest value within the filter window by using the morphological filter 2 (11602); and when the smoothing filter step 4 is constructed, the reference point is replaced by the smallest value within the filter window by using the morphological filter 3.

Therefore, the multi-value to binary converting means (11103) applies the morphological processing to the multi-value image by using the smoothing filter constructed as shown in FIG. 52, after performing the thresholding shown in FIG. 44.

The binary image encoding means (11104) encodes the binary image by using the binary image encoding scheme MMR defined in CCITT's international standard traditionally used for facsimile systems, etc., and outputs the encoded data.

The smoothing function encoding means (11106) encodes the smoothing function estimated by the smoothing function estimating means (11102), and outputs the encoded data.

The dynamic range encoding means (11105) encodes the Dmax and Dmin obtained by the dynamic range estimating means (11101), and outputs the encoded data.

As described above, in the present embodiment, by utilizing the property of a multi-value image that almost all pixels in the image have a uniform minimum value or maximum value with intermediate values distributed along the boundary, the state of the distribution of the intermediate values is analyzed, the smoothing function that provides a good approximation of the intermediate value distribution is estimated, and a binary base image corresponding to the estimated smoothing function is estimated. By individually encoding the estimated maximum pixel value and minimum pixel value, the estimated smoothing function, and the estimated binary base image and outputting the results as encoded data, efficient encoding can be achieved.

Embodiment B4

Figure 53:
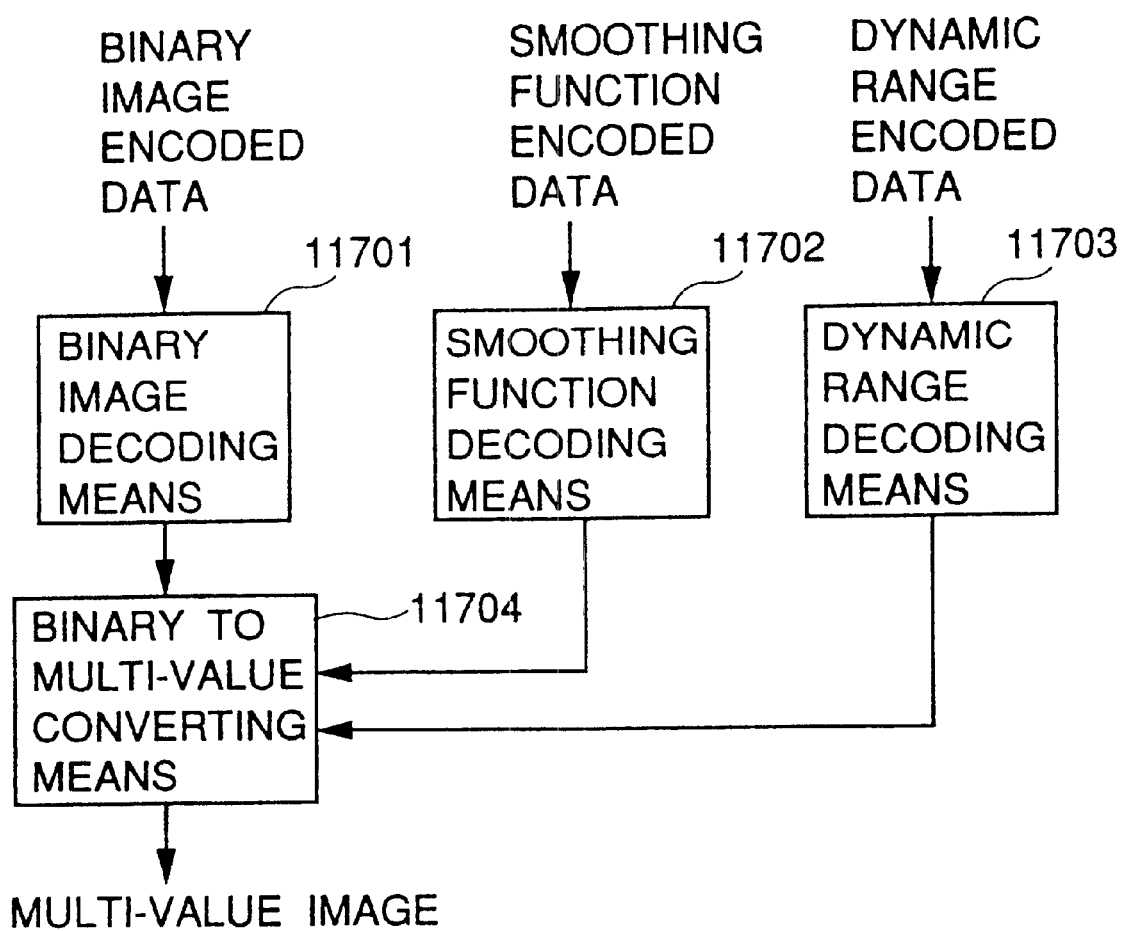
FIG. 53 is a block diagram of an image decoding apparatus according to a B4th embodiment.

FIG. 53 is a block diagram showing the configuration of an image decoding apparatus according to a B4th embodiment of the present invention. The configuration of this embodiment will be described below with reference to same figure.

In the figure, binary image decoding means (11701) is a means for recovering the binary image by decoding the binary image encoded data.

Smoothing function decoding means (11702) is a means for recovering the smoothing function by decoding the smoothing function encoded data.

Dynamic range decoding means (11703) is a means for recovering the dynamic range by decoding the dynamic range encoded data.

Binary to multi-value converting means (11704) is a means for recovering the multi-value image by smoothing the binary image using the smoothing function recovered by the smoothing function decoding means (11702), and by performing luminance conversion using the dynamic range recovered by the dynamic range decoding means (11703).

The operation of the thus configured image decoding apparatus of the present embodiment will be described below.

The binary image decoding means (11701) recovers the binary image having only two pixel values, 0 and 255, by decoding the binary image encoded data which was encoded using the binary image encoding scheme MMR defined in CCITT's international standard traditionally used for facsimile systems, etc.

The smoothing function decoding means (11702) recovers the smoothing function by decoding the smoothing function encoded data.

The dynamic range decoding means (11703) recovers the maximum pixel value Dmax and minimum pixel value Dmin by decoding the dynamic range encoded data. The binary to multi-value converting means (11704) actually applies the smoothing filter recovered by the smoothing function decoding means (11702). (For the method of applying the smoothing filter, refer to the description of the smoothing function constructing means (11207) and FIG. 50.) Further, using the maximum pixel value Dmax and minimum pixel value Dmin recovered by the dynamic range decoding means (10903), a linear conversion is performed as shown in FIG. 46, to recover the multi-value image.

As described above, in the present embodiment, by utilizing the property of a multi-value image that almost all pixels in the image have a uniform maximum value or minimum value with intermediate values distributed along the boundary, the state of the distribution of the intermediate values is analyzed, the smoothing function that provides a good approximation of the intermediate value distribution is estimated, and a binary base image corresponding to the estimated smoothing function is estimated. By individually encoding and outputting the estimated maximum pixel value and minimum pixel value, the estimated smoothing function, and the estimated binary base image, and by decoding the encoded data thus output, efficient decoding with fewer code bits can be achieved.

Embodiment B5

Figure 54:
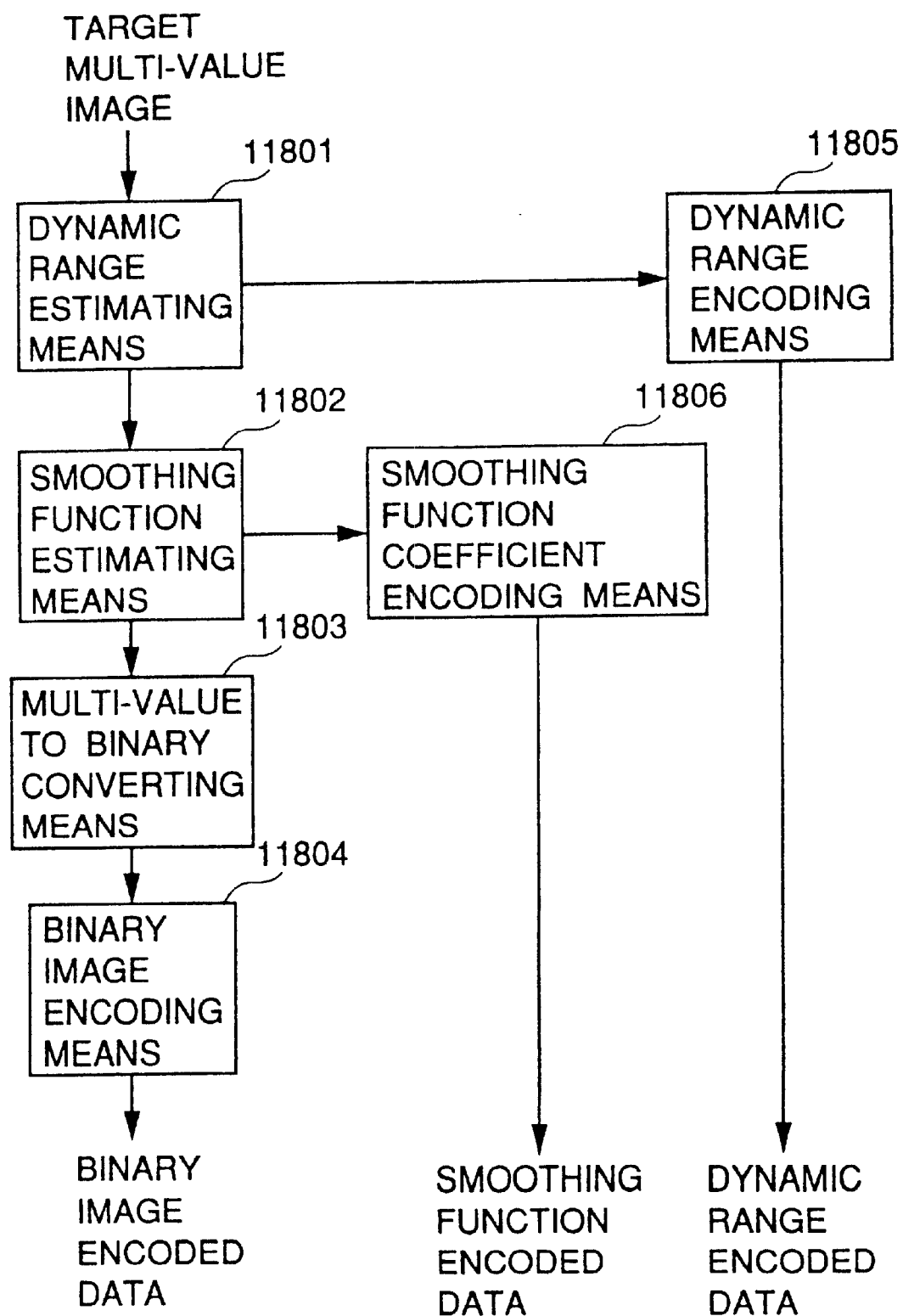
FIG. 54 is a block diagram of an image encoding apparatus according to a B5th embodiment.

FIG. 54 is a block diagram showing the configuration of an image encoding apparatus according to a B5th embodiment of the present invention. The configuration of this embodiment will be described below with reference to same figure.

In the figure, dynamic range estimating means (11801) is a means which takes a target multi-value image as an input, and which extracts the pixel value of the largest area and the pixel value of the second largest area in the multi-value image.

Smoothing function estimating means (11802) is a means which takes the multi-value image and dynamic range as inputs, and which estimates a smoothing function by analyzing luminance gradients in the multi-value image. Multi-value to binary converting means (11803) is a means which generates a binary image by using the dynamic range, smoothing function, and multi-value image so that the multi-value image can be well approximated when luminance conversion is performed using the dynamic range and smoothing is done using the smoothing function.

Dynamic range encoding means (11805) is a means which encodes the dynamic range and outputs the encoded data.

Smoothing function coefficient encoding means (11806) is a means which encodes the smoothing function and outputs the encoded data. Binary image encoding means (11804) is a means which encodes the binary image and outputs the encoded data.

The operation of the thus configured image encoding apparatus of the present embodiment will be described below.

The dynamic range estimating means (11801) extracts the pixel value of the largest area and the pixel value of the second largest area in the multi-value image; in many multi-value images, these pixel values coincide with the largest pixel value and the smallest pixel value, respectively, so that in the present embodiment, the largest pixel value Dmax and the smallest pixel value Dmin are extracted by scanning the target multi-value image.

Figure 55:
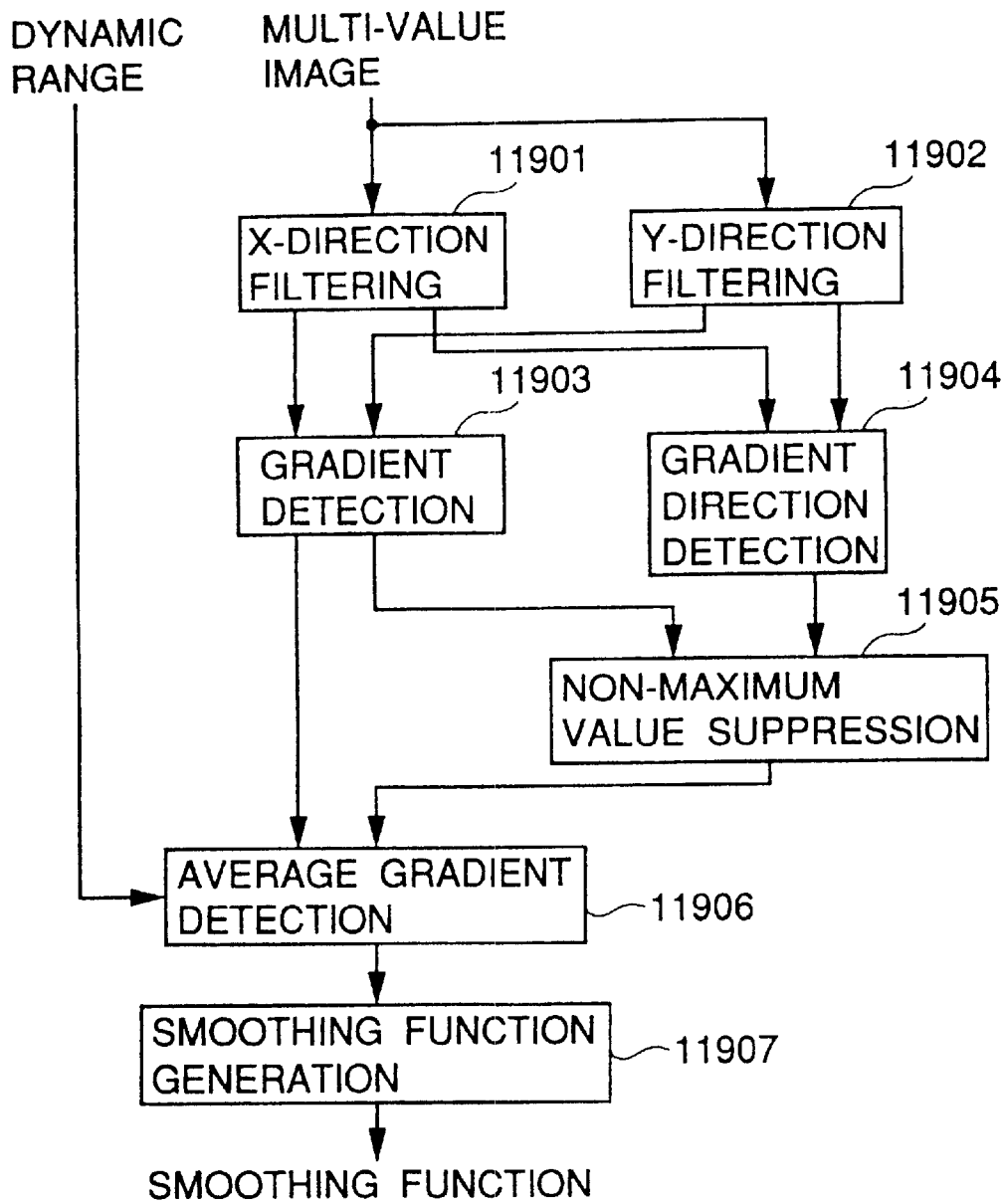
FIG. 55 is a block diagram of a smoothing function estimating means according to the B5th embodiment.

The smoothing function estimating means (11802) is shown in FIG. 55. In x-direction filtering (11901), an x-direction filter (10401) is applied and scanned over the image to detect the gradient along the x-direction in the image.

In y-direction filtering (11902), a y-direction filter (10402) is applied and scanned over the image to detect the gradient along the y-direction in the image. In gradient detection (11903), gradient d (i, j) is detected by calculating equation B1 using the x-direction gradient dx (i, j) obtained by the x-direction filtering (11901) and the y-direction gradient dy (i, j) obtained by the y-direction filtering (11902), where (i, j) are the coordinates on the image.

In gradient direction detection (11904), gradient direction θ (i, j) is detected by calculating equation B2 using the x-direction gradient dx (i, j) obtained by the x-direction filtering (11901) and the y-direction gradient dy (i, j) obtained by the y-direction filtering (11902), where (i, j) are the coordinates on the image. In non-maximum value suppression (11905), using a window that changes with θ, as shown in FIG. 40, an image is created in such a manner that if the value of the gradient at reference point within the window is a maximum value, the image portion at the coordinates of the reference point is assigned a value of 1; otherwise, the image portion at the coordinates of the reference point is assigned a value of 0.

In direction-by-direction average gradient detection (11906), average gradient is obtained for each of two directions, i.e., the horizontal and vertical directions, based on the gradient direction detected in the gradient detection (11904), by calculating the average of the gradients detected in the gradient detection (11903) for the pixels of value 1 in the binary image obtained by the non-maximum value suppression (11905). Further, using the maximum pixel value Dmax and minimum pixel value Dmin detected by the dynamic range estimating means (11901), normalized average gradient is recalculated from equation B3 to obtain the average gradient, dave_1, in the vertical direction and the average gradient, dave_2, in the horizontal direction.

Figure 56:
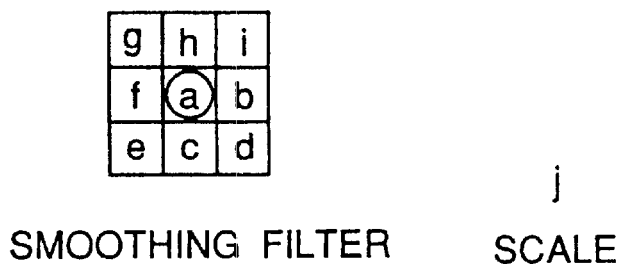
FIG. 56 is a diagram for explaining a smoothing filter according to the B5th embodiment.

In smoothing function generation (11907), a smoothing filter is generated by estimating smoothing filter coefficients based on the average gradients dave_1 and dave_2. In the present embodiment, the coefficients of the smoothing filter of step number 3 shown in FIG. 56 are estimated. Here, constraints are applied by equation B4, but depending on the image, each coefficient may be weighted.

Equation B4

$$a=1 \quad (4)$$

$$b=f, c=h \quad (5)$$

$$g = i = e = d = \frac{h+f}{2} \quad (6)$$

$$j=a+b+c+d+e+f+g+h+i \quad (7)$$

Using dave_1, c is estimated by equation B5. However, when dave_1 is greater than 200, the gradient of the image is considered to represent a step edge, so that c is set to 0. On the other hand, when dave_1 is smaller than 50, it is considered that there is no image gradient, so that c is set to 0.

Equation B5

$$c = \frac{255 - d_{ave1}}{2d_{ave1}} \quad (8)$$

Using dave_2, b is estimated by equation B6. However, when dave_2 is greater than 200, the gradient of the image is considered to represent a step edge, so that b is set to 0. On the other hand, when dave_2 is smaller than 50, it is considered that there is no image gradient, so that b is set to 0.

Equation B6

$$b = \frac{255 - d_{ave2}}{2d_{ave2}} \quad (9)$$

Filter coefficients and scales are estimated using equations B4, B5, and B6, as described above. The multi-value to binary converting means (11903) converts the multi-value image to a binary image having only two pixel values, 255 and 0, by considering the characteristic of the smoothing function estimated by the smoothing function estimating means (11902). In this embodiment, the threshold value is estimated based on the filter coefficients, and the binary image is obtained by thresholding the multi-value image using the estimated threshold value. The threshold value y is estimated by equation B7.

Equation B7

$$\gamma = 255\left(\frac{a+2b}{4j} + \frac{a+2h}{4j}\right) \quad (10)$$

The binary image encoding means (11804) encodes the binary image by using the binary image encoding scheme MMR defined in CCITT's international standard traditionally used for facsimile systems, etc., and outputs the encoded data.

The smoothing function coefficient encoding means (11806) encodes each coefficient and scale of the smoothing function estimated by the smoothing function estimating means (11802), and outputs the encoded data. The dynamic range encoding means (11805) individually encodes the Dmax and Dmin obtained by the dynamic range estimating means (11801), and outputs the encoded data.

As described above, in the present embodiment, by utilizing the property of a multi-value image that almost all pixels in the image have a uniform maximum value or minimum value with intermediate values distributed along the boundary, the state of the distribution of the intermediate values is analyzed, the smoothing function that provides a good approximation of the intermediate value distribution is estimated, and a binary base image corresponding to the estimated smoothing function is estimated. By individually encoding the estimated maximum pixel value and minimum pixel value, the estimated smoothing function, and the estimated binary base image and outputting the results as encoded data, efficient encoding can be achieved.

Embodiment B6

Figure 57:
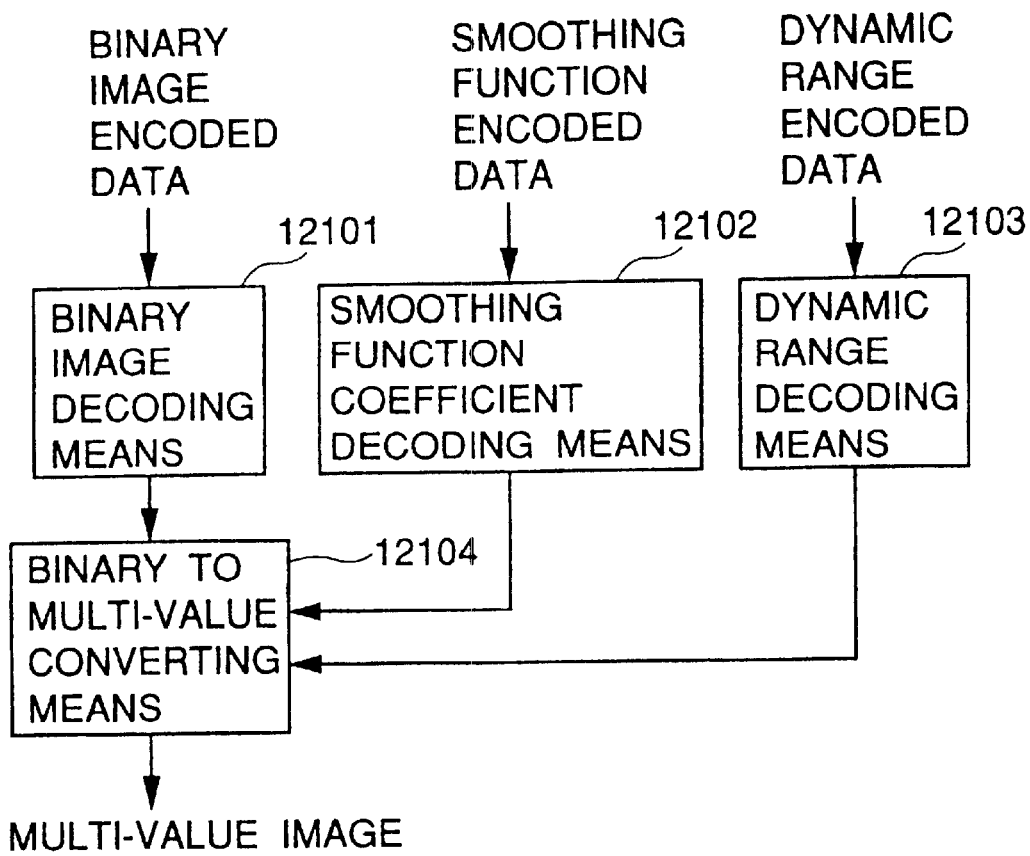
FIG. 57 is a block diagram of an image decoding apparatus according to a B6th embodiment.

FIG. 57 is a block diagram showing the configuration of an image decoding apparatus according to a B6th embodiment of the present invention. The configuration of this embodiment will be described below with reference to same figure.

In the figure, binary image decoding means (12101) is a means for recovering the binary image by decoding the binary image encoded data.

Smoothing function coefficient decoding means (12102) is a means for recovering the smoothing function by decoding the smoothing function encoded data.

Dynamic range decoding means (12103) is a means for recovering the dynamic range by decoding the dynamic range encoded data.

Binary to multi-value converting means (12104) is a means for recovering the multi-value image by smoothing the binary image using the smoothing function recovered by the smoothing function decoding means (12102), and by performing luminance conversion using the dynamic range recovered by the dynamic range decoding means (12103).

The operation of the thus configured image decoding apparatus of the present embodiment will be described below.

The binary image decoding means (12101) recovers the binary image having only two pixel values, 0 and 255, by decoding the binary image encoded data which was encoded using the binary image encoding scheme MMR defined in CCITT's international standard traditionally used for facsimile systems, etc.

The smoothing function coefficient decoding means (12102) recovers the smoothing filter coefficients and scales and thus the smoothing function by decoding the smoothing function encoded data. The dynamic range decoding means (12103) recovers the maximum pixel value Dmax and minimum pixel value Dmin by decoding the dynamic range encoded data.

The binary to multi-value converting means (12104) applies convolution with the smoothing filter recovered by the smoothing function coefficient decoding means (12102). Further, using the maximum pixel value Dmax and minimum pixel value Dmin recovered by the dynamic range decoding means (12103), a linear conversion is performed as shown in FIG. 46, to recover the multi-value image.

As described above, in the present embodiment, by utilizing the property of a multi-value image that almost all pixels in the image have a uniform maximum value or minimum value with intermediate values distributed along the boundary, the state of the distribution of the intermediate values is analyzed, the smoothing function that provides a good approximation of the intermediate value distribution is estimated, and a binary base image corresponding to the estimated smoothing function is estimated. By individually encoding and outputting the estimated maximum pixel value and minimum pixel value, the estimated smoothing function, and the estimated binary base image, and by decoding the encoded data thus output, efficient decoding with fewer code bits can be achieved.

Embodiment B7

Figure 58:
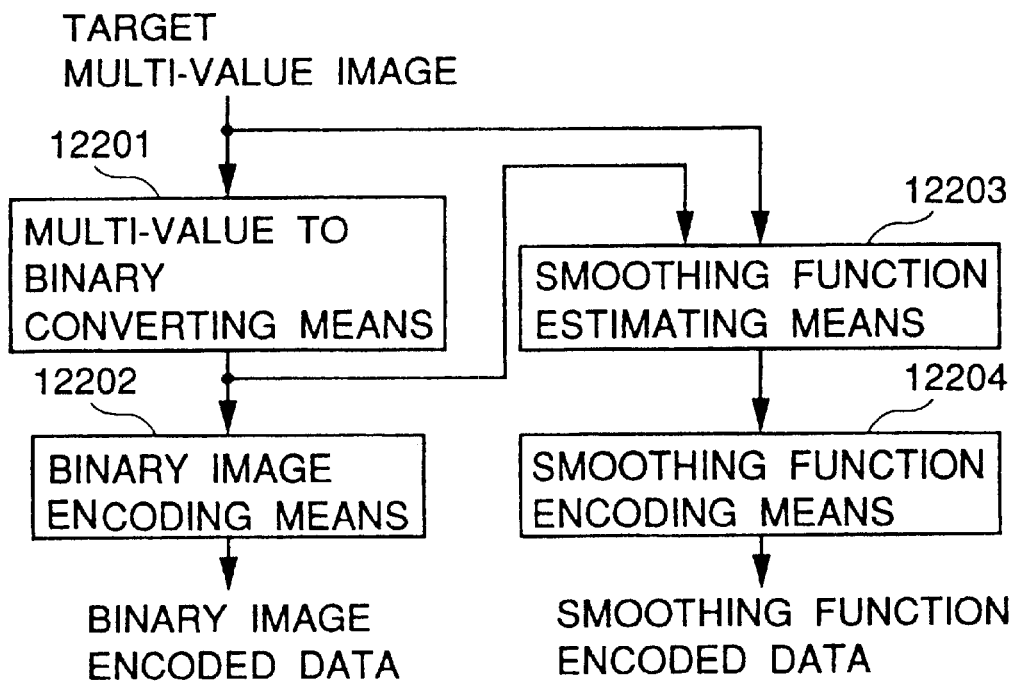
FIG. 58 is a block diagram of an image encoding apparatus according to a B7th embodiment.

FIG. 58 is a block diagram showing the configuration of an image encoding apparatus according to a B7th embodiment of the present invention. The configuration of this embodiment will be described below with reference to same figure.

In the figure, multi-value to binary converting means (12201) is a means which takes a target image (with a range of values from 0 to 255, each being an integer) as an input, and which binarizes the input target image by assigning a value of 0 to pixels of value 0 and a value of 255 to pixels of other values.

Binary image encoding means (12202) is a means which encodes the binary image having values of {0, 255} and outputs the encoded data. Smoothing function estimating means (12203) is means for determining a smoothing function. Smoothing function encoding means (12204) is a means for encoding the thus determined function. Here, the smoothing function estimating means (12203) corresponds to the smoothing function generating means of the present invention.

The operation of the thus configured image encoding apparatus of the present embodiment will be described below.

The binary image binarized by the multi-value to binary converting means (12201) is encoded by the binary image encoding means (12202). For the encoding, the binary image encoding scheme MMR defined in CCITT's international standard is used, with value 0 as white and 255 as black.

Figure 60:
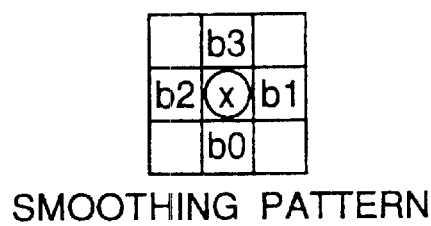
FIG. 60 is a diagram for explaining a smoothing pattern in the B7th, B8th, B9th, and B10st embodiments.

On the other hand, the binarized image is compared by the smoothing function estimating means (12203) with the input multi-value image to determine the smoothing function. This will be explained below with reference to FIGS. 60 and 61.

As noted in the description of the background art, many alpha planes have the property that most portions are uniform and intermediate values are distributed along the boundary. To reproduce the intermediate values distributed along the boundary, consider the smoothing operation wherein substitution is made for the center pixel value x, depending on whether the values of the vertically (b3, b0) and horizontally (b2, b1) neighboring pixels are 255 or not.

Since the target multi-value image is binarized by assigning 0 to pixels of value 0 and 255 to pixels of other values, the substitution is performed only when the value of the target pixel is 255. Therefore, the binarization pattern of the four neighbors of a pixel taking the value of 255 is expressed by four bits (16 patterns).

The smoothing function estimating means (12203) scan the image and obtains the value to substitute by finding the average value for each of the 16 patterns of the four neighboring pixels of a pixel taking the value of 255. An example is shown in Table 1.

TABLE 1

| b3 | b2 | b1 | b0 | x |
|---|---|---|---|---|
| ≠255 | ≠255 | ≠255 | ≠255 | 32 |
| ≠255 | ≠255 | ≠255 | =255 | 64 |

TABLE 1-continued

| b3 | b2 | b1 | b0 | x |
|---|---|---|---|---|
| ≠255 | ≠255 | =255 | ≠255 | 64 |
| ≠255 | ≠255 | =255 | =255 | 128 |
| ≠255 | =255 | ≠255 | ≠255 | 64 |
| ≠255 | =255 | ≠255 | =255 | 128 |
| ≠255 | =255 | =255 | ≠255 | 128 |
| ≠255 | =255 | =255 | =255 | 192 |
| =255 | ≠255 | ≠255 | ≠255 | 64 |
| =255 | ≠255 | ≠255 | =255 | 128 |
| =255 | ≠255 | =255 | ≠255 | 128 |
| =255 | ≠255 | =255 | =255 | 192 |
| =255 | =255 | ≠255 | ≠255 | 128 |
| =255 | =255 | ≠255 | =255 | 192 |
| =255 | =255 | =255 | ≠255 | 192 |
| =255 | =255 | =255 | =255 | 255 |

Figure 61:
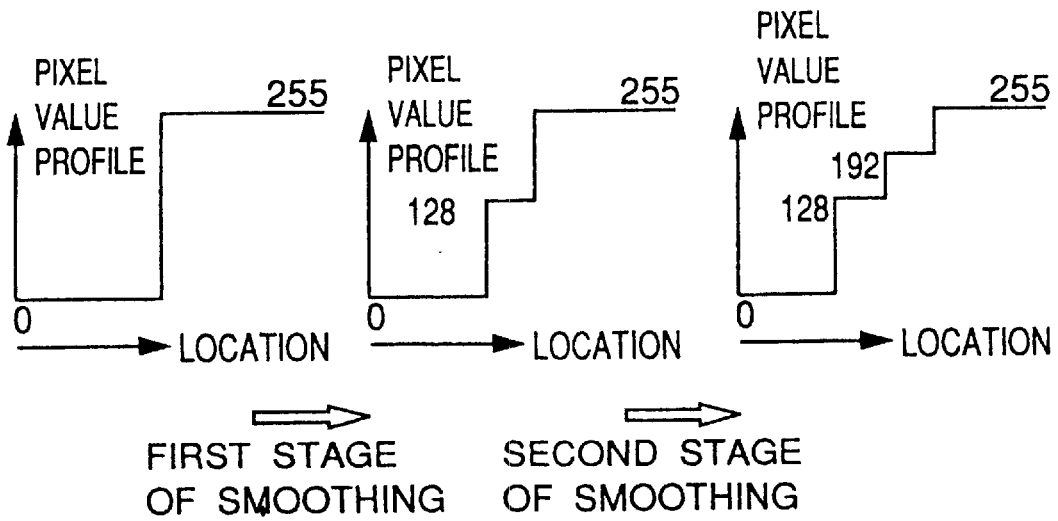
FIG. 61 is a diagram for explaining multi-stage smoothing in the B7th, B8th, B9th, and B10st embodiments.

Accordingly, in the case of a pixel at the boundary where the value changes from 0 to 255, as shown in the first stage of smoothing in FIG. 61, for example, 128 is substituted for the pixel value. If there are two or more pixels with intermediate values at or near the contour, the operation for finding the average value for each of the 16 patterns of the four neighboring pixels is repeated in a recursive manner for the pixels having the value of 255. Table 2 shows the results of this second operation. In this way, a boundary having an intermediate value corresponding to the second stage of smoothing in FIG. 61 can be expressed.

TABLE 2

| b3 | b2 | b1 | b0 | x |
|---|---|---|---|---|
| ≠255 | ≠255 | ≠255 | ≠255 | 128 |
| ≠255 | ≠255 | ≠255 | =255 | 128 |
| ≠255 | ≠255 | =255 | ≠255 | 128 |
| ≠255 | ≠255 | =255 | =255 | 192 |
| ≠255 | =255 | ≠255 | ≠255 | 128 |
| ≠255 | =255 | ≠255 | =255 | 192 |
| ≠255 | =255 | =255 | ≠255 | 192 |
| ≠255 | =255 | =255 | =255 | 192 |
| =255 | ≠255 | ≠255 | ≠255 | 128 |
| =255 | ≠255 | ≠255 | =255 | 192 |
| =255 | ≠255 | =255 | ≠255 | 192 |
| =255 | ≠255 | =255 | =255 | 192 |
| =255 | =255 | ≠255 | ≠255 | 192 |
| =255 | =255 | ≠255 | =255 | 192 |
| =255 | =255 | =255 | ≠255 | 192 |
| =255 | =255 | =255 | =255 | 255 |

The output of the smoothing function estimating means (12203) is obtained as the number of stages of smoothing (in the illustrated example, 2 stages, the maximum possible number being 8 stages) and pixel value tables for the patterns of (b3, b2, b1, b0) corresponding to the number of stages. Here, the number of stages refers to the number of repetitions of the smoothing operation which is repeated in a recursive manner. The smoothing function encoding means (12204) encodes the number of stages of smoothing as three bits and the pixel value tables for the patterns of (b3, b2, b1, b0) as 8 bits×15 (the number of patterns excluding the pattern in which all pixel values are 255)×number of stages.

Embodiment B8

Figure 59:
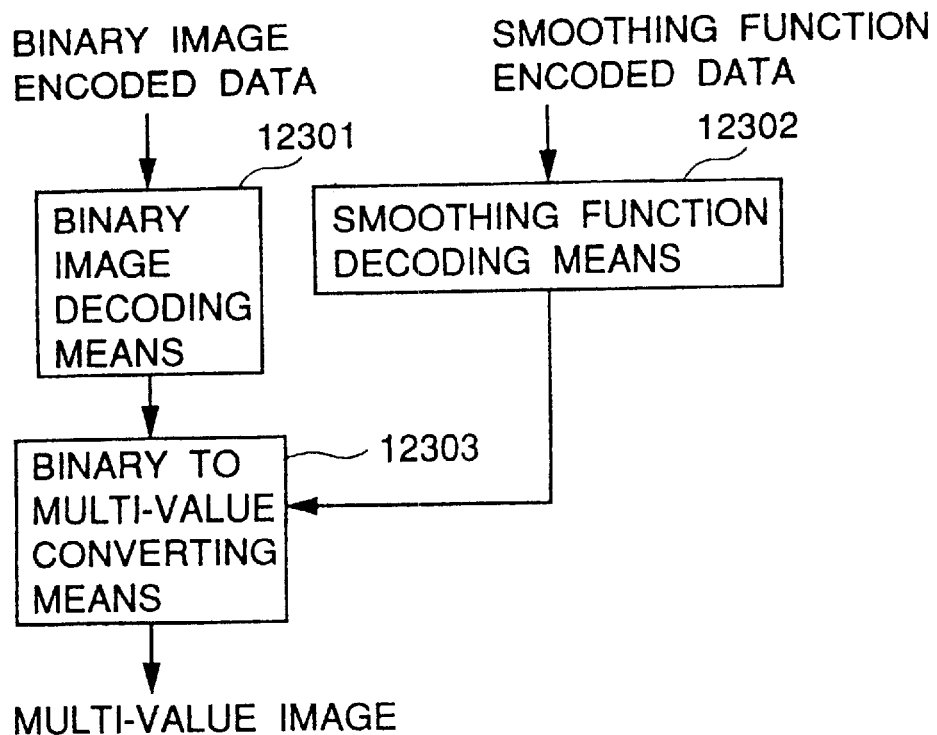
FIG. 59 is a block diagram of an image decoding apparatus according to a B8th embodiment.

FIG. 59 is a block diagram showing the configuration of an image decoding apparatus according to a B8th embodiment of the present invention. The configuration of this embodiment will be described below with reference to same figure. Outputs from the image encoding apparatus of the seventh embodiment are supplied as inputs to the decoding apparatus of the present embodiment. Binary image decoding means (12301) is a means which takes the output of the binary image encoding means (12202) as an input and recovers the binary image of {0, 255} from the binary image encoded data. Smoothing function decoding means (12302) is a decoding means for decoding the output of the smoothing function encoding means (12204). Binary to multi-value converting means (12303) is a means which takes the smoothing function and binary image as inputs and reconstructs the multi-value image.

The operation of the thus configured image decoding apparatus of the present embodiment will be described below.

The binary image decoding means (12301) uses the MMR decoding scheme. The smoothing function decoding means decodes the number of stages of smoothing and the substitution pixel value tables for the patterns corresponding to the number of stages. The decoded tables are assumed to be the two tables, Table 1 and Table 2, used in the example of the image encoding apparatus. The binary to multi-value converting means (12303) performs conversion on each pixel of value 255 to converts its value in two stages using Tables 1 and 2 by reference to its four neighboring pixels, as shown in FIG. 61.

As described above, in the seventh and eighth embodiments, by utilizing the property of a multi-value image that almost all pixels in the image have uniform binary values with intermediate values distributed along the boundary, the state of the distribution of the intermediate values is analyzed, and the smoothing function that provides a good approximation of the intermediate value distribution is estimated. Since this smoothing function is expressed by multiple stages, even if the intermediate value has a width greater than or equal to two pixels, any smoothing pattern can be expressed for up to eight pixels. Any smoothing pattern here means the rising/falling characteristic at the boundary.

Embodiment B9

Figure 62:
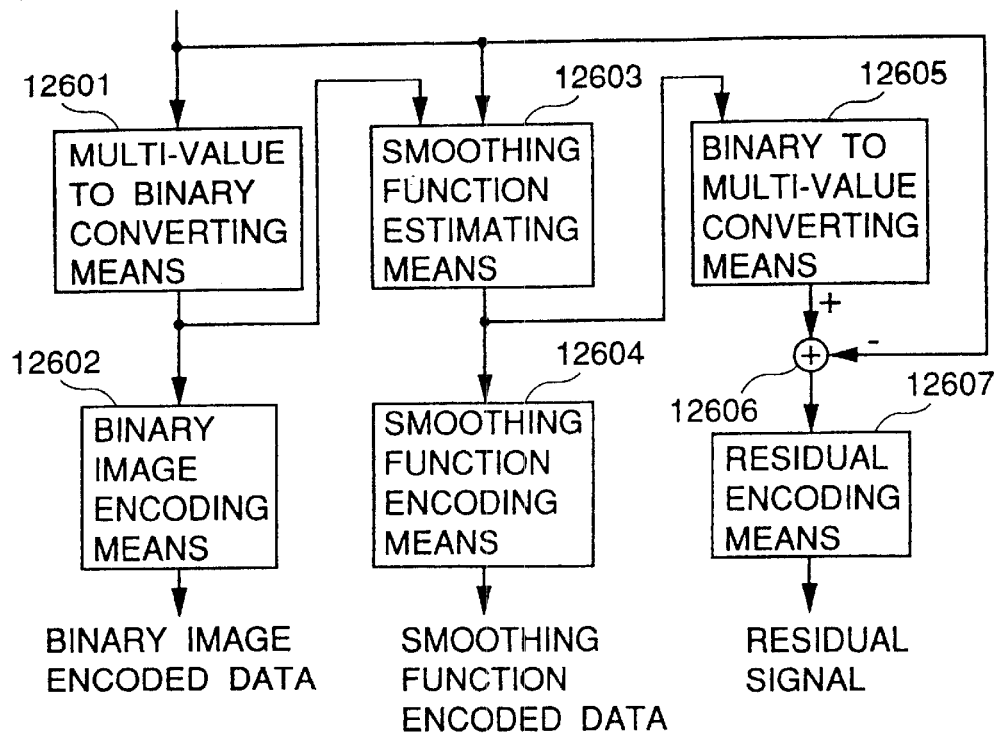
FIG. 62 is a block diagram of an image encoding apparatus according to the B9th embodiment.

FIG. 62 is a block diagram showing the configuration of an image encoding apparatus according to a B9th embodiment of the present invention. The configuration of this embodiment will be described below with reference to same figure. In the figure, multi-value to binary converting means (12601) is a means which takes a target image (with a range of values from 0 to 255, each being an integer) as an input, and which binarizes the input target image by assigning a value of 0 to pixels of value 0 and a value of 255 to pixels of other values. Binary image encoding means (12602) is a means which encodes the binary image having values of {0, 255} and outputs the encoded data. Smoothing function estimating means (12603) is means for determining a smoothing function.

Smoothing function encoding means (12604) is a means for encoding the thus determined function. Binary to multi-value converting means (12605) is a means which takes the smoothing function and binary image as inputs and reconstructs the multi-value image. Difference calculator (12606) is a means which obtains the difference between the output of the binary to multi-value converting means (12605) and the target multi-value image. Residual encoding means (12607) is a means for encoding the difference.

The operation of the thus configured image encoding apparatus of the present embodiment will be described below.

The blocks with numerals 2601 to 2605 are identical in configuration and operation to the blocks of the same names previously described with reference to FIGS. 58 and 59. In the present embodiment, the image encoding apparatus shown in the seventh embodiment is used as a predictor. That is, the output of the binary to multi-value converting means (12605) is taken as a predicted image, and the difference of the predicted image is obtained by the difference calculator (12606), the difference then being encoded by the residual encoding means (12607).

For the encoding of the difference, the interframe coding mode (discrete cosine transform coding) defined in CCITT's international standard for moving picture coding H.261 is used.

Embodiment B10

Figure 63:
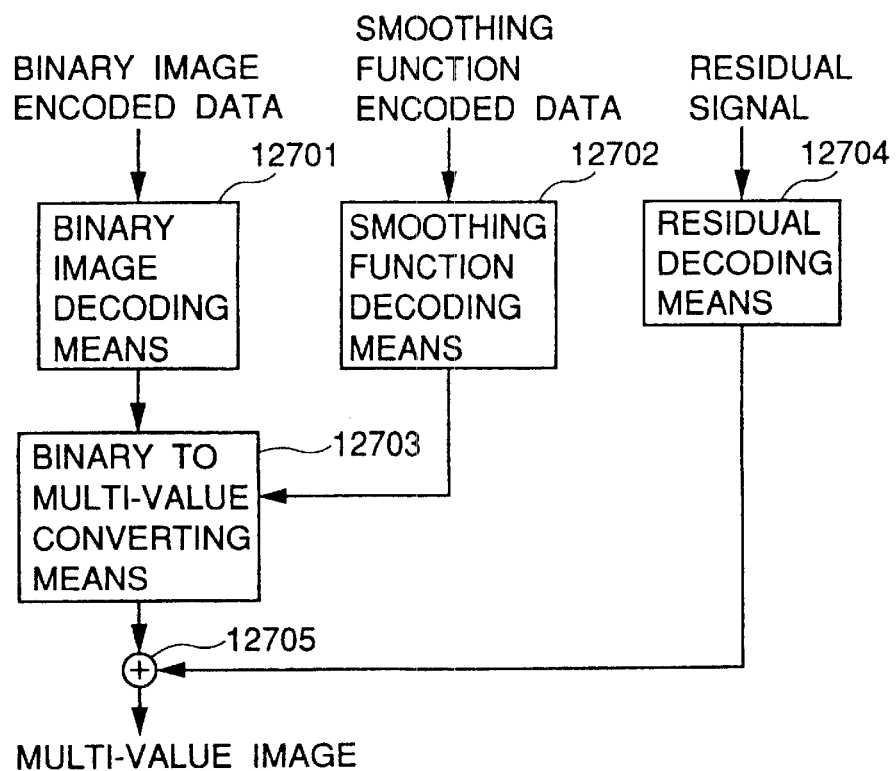
FIG. 63 is a block diagram of an image decoding apparatus according to the B10st embodiment.

FIG. 63 is a block diagram showing the configuration of an image decoding apparatus according to a 10th embodiment of the present invention. The configuration of this embodiment will be described below with reference to same figure. Outputs from the image encoding apparatus of the ninth embodiment are supplied as inputs to the decoding apparatus of the present embodiment.

In the figure, binary image decoding means (12701) is a means which takes the output of the binary image encoding means (12602) as an input and recovers the binary image of {0, 255} from the binary image encoded data. Smoothing function decoding means (12702) is a decoding means for decoding the output of the smoothing function encoding means (12604). Binary to multi-value converting means (12703) is a means which takes the smoothing function and binary image as inputs and reconstructs the multi-value image. Residual decoding means (12704) is a means which takes the output of the residual encoding means (12607) as an input and obtains the residual. Adder (12705) adds the outputs of the binary to multi-value converting means (12703) and residual decoding means (12704).

The operation of the thus configured image decoding apparatus of the present embodiment will be described below.

The blocks with numerals 2701 to 2703 are identical in configuration and operation to the blocks of the same names previously described with reference to FIGS. 58 and 59. The residual decoding means (12704) uses the interframe decoding mode as defined in the moving image coding H.261 to correspond with the output of the residual encoding means (12607). The difference signal representing the difference between the target multi-value image in FIG. 41 and the image obtained by smoothing the binary image is thus reconstructed, and the difference signal is added in the adder (12705) to reconstruct the multi-value image. In the 9th and 10th embodiments, the image encoding method shown in the seventh and eighth embodiment is used for prediction, and the prediction residual component is separately encoded, transmitted and stored, thereby achieving more accurate reproduction of the target multi-value image. In particular, by predicting an abrupt change in value at the boundary, high-frequency components can be removed from the residual signal, and the efficiency of discrete cosine transform coding can thus be improved.

Embodiment B11

Figure 64:
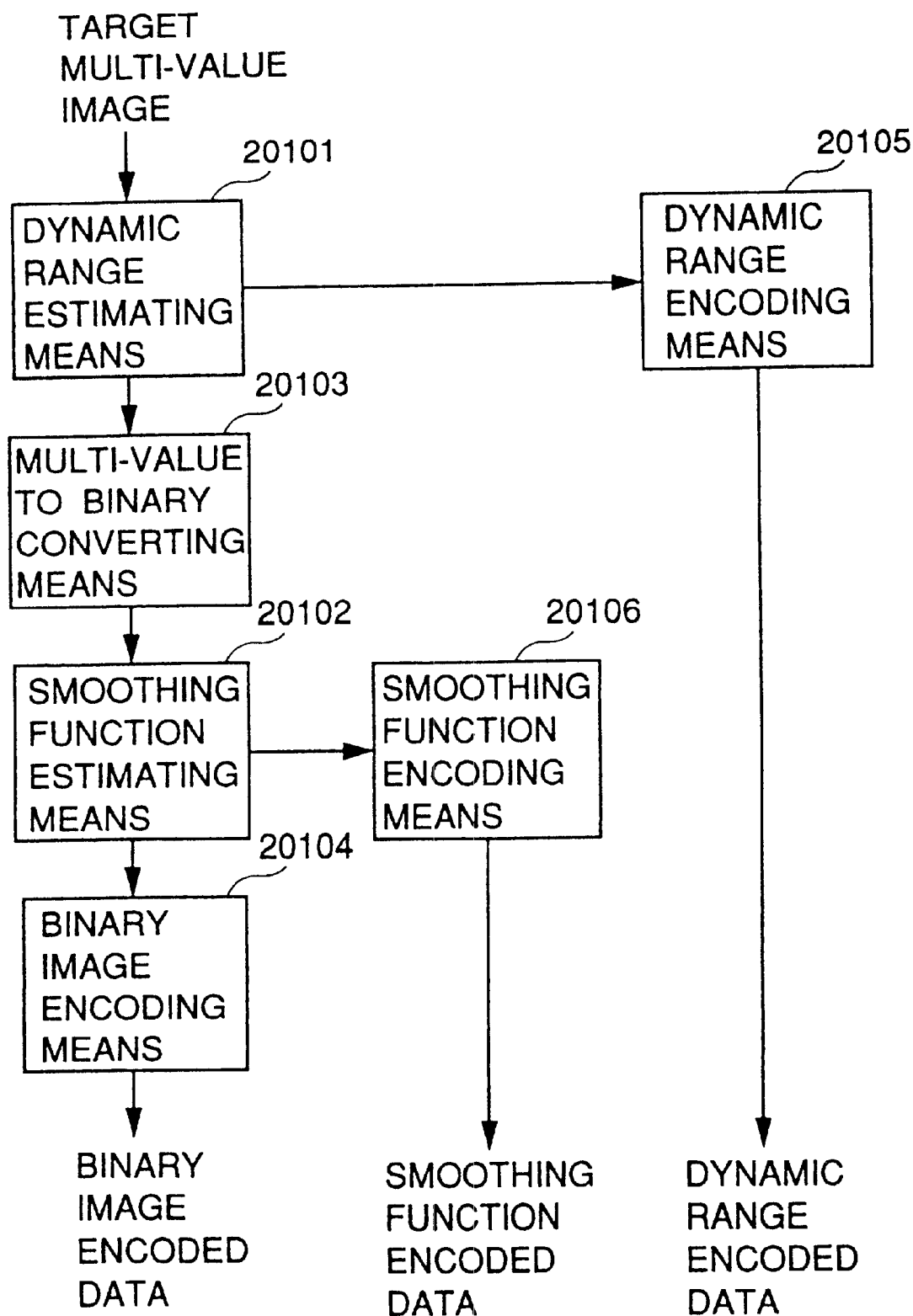
FIG. 64 is a block diagram of an image encoding apparatus according to a B11th embodiment.

FIG. 64 is a block diagram showing the configuration of an image encoding apparatus according to an 11th embodiment of the present invention. The configuration of this embodiment will be described below with reference to same figure.

In the figure, dynamic range estimating means (20101) is a means which takes a target multi-value image as an input, extracts the pixel value of the largest area and the pixel value of the second largest area in the multi-value image, and outputs them as a dynamic range.

Multi-value to binary converting means (20103) is a means which performs luminance conversion using the dynamic range, and applies thresholding using a predetermined threshold value to generate a binary image.

Smoothing function estimating means (20102) is a means which, by considering the thresholding performed in the multi-value to binary converting means (20103), analyzes luminance gradients in the multi-value image and estimates a smoothing function.

Dynamic range encoding means (20105) is a means which encodes the dynamic range and outputs the encoded data.

Smoothing function encoding means (20106) is a means which encodes the smoothing function and outputs the encoded data.

Binary image encoding means (20104) is a means which encodes the binary image and outputs the encoded data.

The operation of the thus configured image encoding apparatus of the present embodiment will be described below with reference to FIGS. 40, 49, etc., together with the operation of an image encoding method according to one embodiment of the present invention.

The dynamic range estimating means (20101) extracts the pixel value of the largest area and the pixel value of the second largest area in the multi-value image; in many multi-value images, these pixel values coincide with the largest pixel value and the smallest pixel value, respectively, so that in the present embodiment, the largest pixel value Dmax and the smallest pixel value Dmin are extracted by scanning the target multi-value image.

The multi-value to binary converting means (20103) performs linear conversion, as shown in FIG. 40, and applies thresholding to each pixel value using a threshold value of 128 so that the maximum value Dmax is set to 255 and the minimum value Dmin is set to 0.

The smoothing function estimating means (20102) estimates the smoothing function by considering the thresholding performed by the multi-value to binary converting means (20103) and the average of the gradients of the pixel values in the image. In the present embodiment, an average filter with a reference point at its center is employed since the thresholding is done using a threshold value of 128 in the multi-value to binary converting means (20103).

The size of the average filter is determined by the average of the gradients of the pixel values in the image.

The average, dave, of the gradients of the pixel values in the image is calculated in the following manner.

In x-direction filtering (10301), the x-direction filter (10401) is applied and scanned over the image to detect the gradient along the x-direction in the image.

In y-direction filtering (10302), the y-direction filter (10402) is applied and scanned over the image to detect the gradient along the y-direction in the image.

In gradient detection (10303), gradient d (i, j) is detected by calculating the equation B1 given in the first embodiment using the x-direction gradient dx (i, j) obtained by the x-direction filtering (10301) and the y-direction gradient dy (i, j) obtained by the y-direction filtering (10302), where (i, j) are the coordinates on the image.

In gradient direction detection (10304), gradient direction θ (i, j) is detected by calculating the equation B2 given in the first embodiment using the x-direction gradient dx (i, j) obtained by the x-direction filtering (10301) and the y-direction gradient dy (i, j) obtained by the y-direction filtering (10302), where (i, j) are the coordinates on the image.

In non-maximum value suppression (10305), using a window that changes with θ, as shown in FIG. 40, an image is created in such a manner that if the value of the gradient at the reference point within the window is a maximum value, the image portion at the coordinates of the reference point is assigned a value of 1; otherwise, the image portion at the coordinates of the reference point is assigned a value of 0.

In average gradient detection (10306), average gradient d'ave is obtained by calculating the average of the gradients detected in the gradient detection (10303) for the pixels of value 1 in the binary image obtained by the non-maximum value suppression (10305). Further, using the maximum pixel value Dmax and minimum pixel value Dmin detected by the dynamic range estimating means (20101), normalized average gradient is recalculated from the equation B3 given in the first embodiment to obtain dave.

The size of the average filter is determined based on the normalized average gradient dave and by referring to FIG. 49.

The binary image encoding means (20104) encodes the binary image by using the binary image encoding scheme MMR defined in CCITT's international standard traditionally used for facsimile systems, etc., and outputs the encoded data.

The smoothing function encoding means (20106) encodes the smoothing function estimated by the smoothing function estimating means (20102), and outputs the encoded data. In the case of the present embodiment, the size of the average filter is encoded for output as the encoded data.

The dynamic range encoding means (20105) individually encodes the Dmax and Dmin obtained by the dynamic range estimating means (20101), and outputs the encoded data.

As described above, in the present embodiment, by utilizing the property of a multi-value image that almost all pixels in the image have a uniform minimum value or maximum value with intermediate values distributed along the boundary, the multi-value image is converted into a binary image, the state of the distribution of the intermediate values is analyzed, and a smoothing function that provides a good approximation of the intermediate value distribution is estimated. By individually encoding the estimated maximum pixel value and minimum pixel value, the estimated smoothing function, and the estimated binary image and outputting the results as encoded data, efficient encoding can be achieved.

In any one of the above-described embodiments, a magnetic recording medium or an optical recording medium may be created that holds a program for having a computer implement the functions of all or part of the means so far described so that the program can be run on the computer to carry out the above-described operations.

Figure 65:
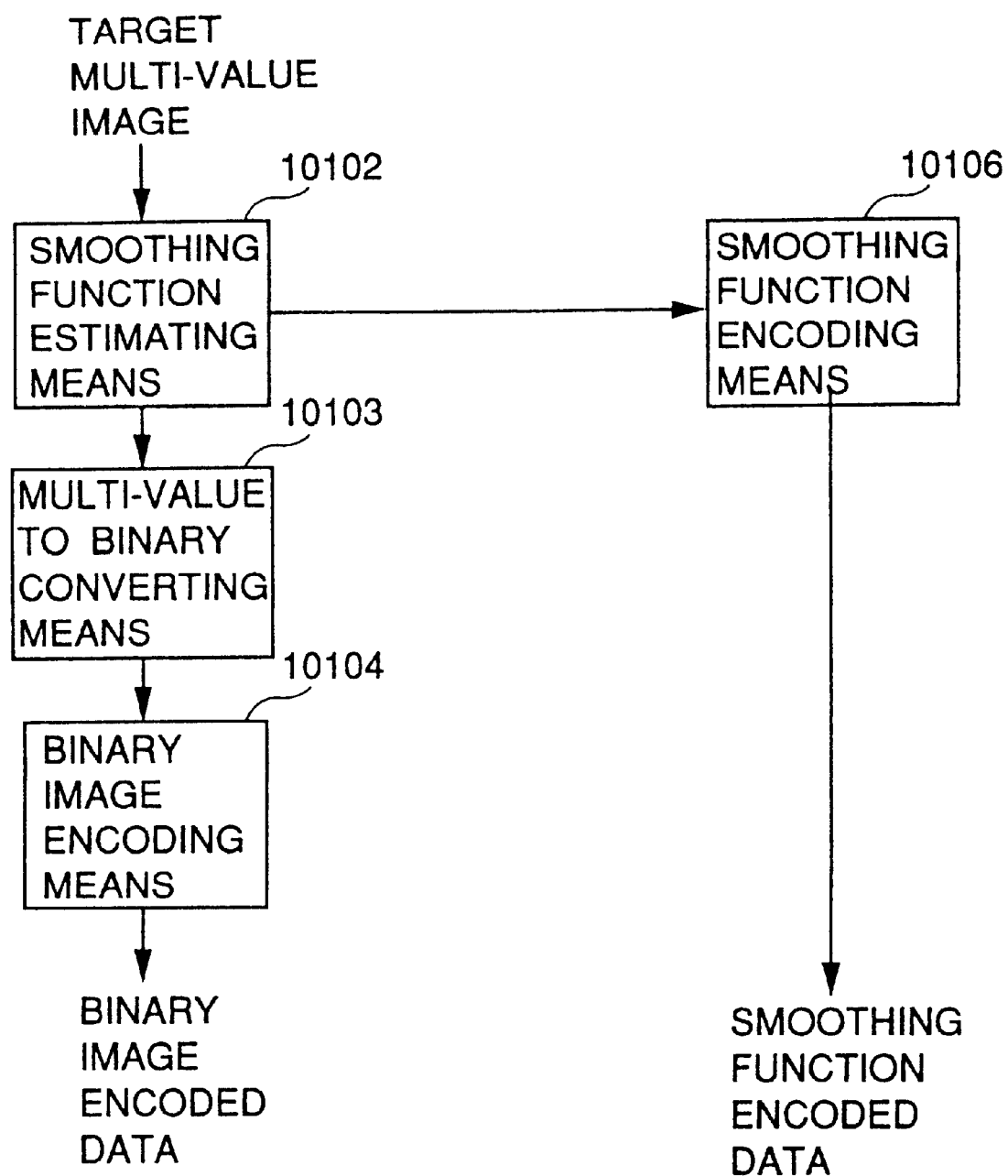
FIG. 65 is a block diagram of an image encoding apparatus in a modified example of the B1st embodiment.

The image encoding apparatus of the present invention has been described in the above embodiments as including the dynamic range estimating means and its encoding means, but this is not an essential condition; for example, since, in many cases, Dmax is 255 and Dmin is 0, both of the above means may be omitted. In that case, the image encoding apparatus comprises, as shown in FIG. 65, smoothing function estimating means (10102) for estimating a smoothing function from a target multi-value image which is the image to be encoded; multi-value to binary converting means (10103) for converting the multi-value image to a binary image in accordance with a multi-value to binary conversion criterion determined to match the estimated smoothing function; binary image encoding means (10104) for encoding the binary image and outputting the same as binary image encoded data; and smoothing function encoding means (10106) for encoding the estimated smoothing function and outputting the same as smoothing function encoded data. According to this configuration, the smoothing function is estimated from the target multi-value image to be encoded; the multi-value image is converted to the binary image in accordance with the multi-value to binary conversion criterion determined to match the estimated smoothing function; the binary image is encoded and output as the binary image encoded data; and the estimated smoothing function is encoded and output as the smoothing function encoded data. In this case also, approximately the same effects as those achieved in the first described configuration can be obtained.

Figure 66:
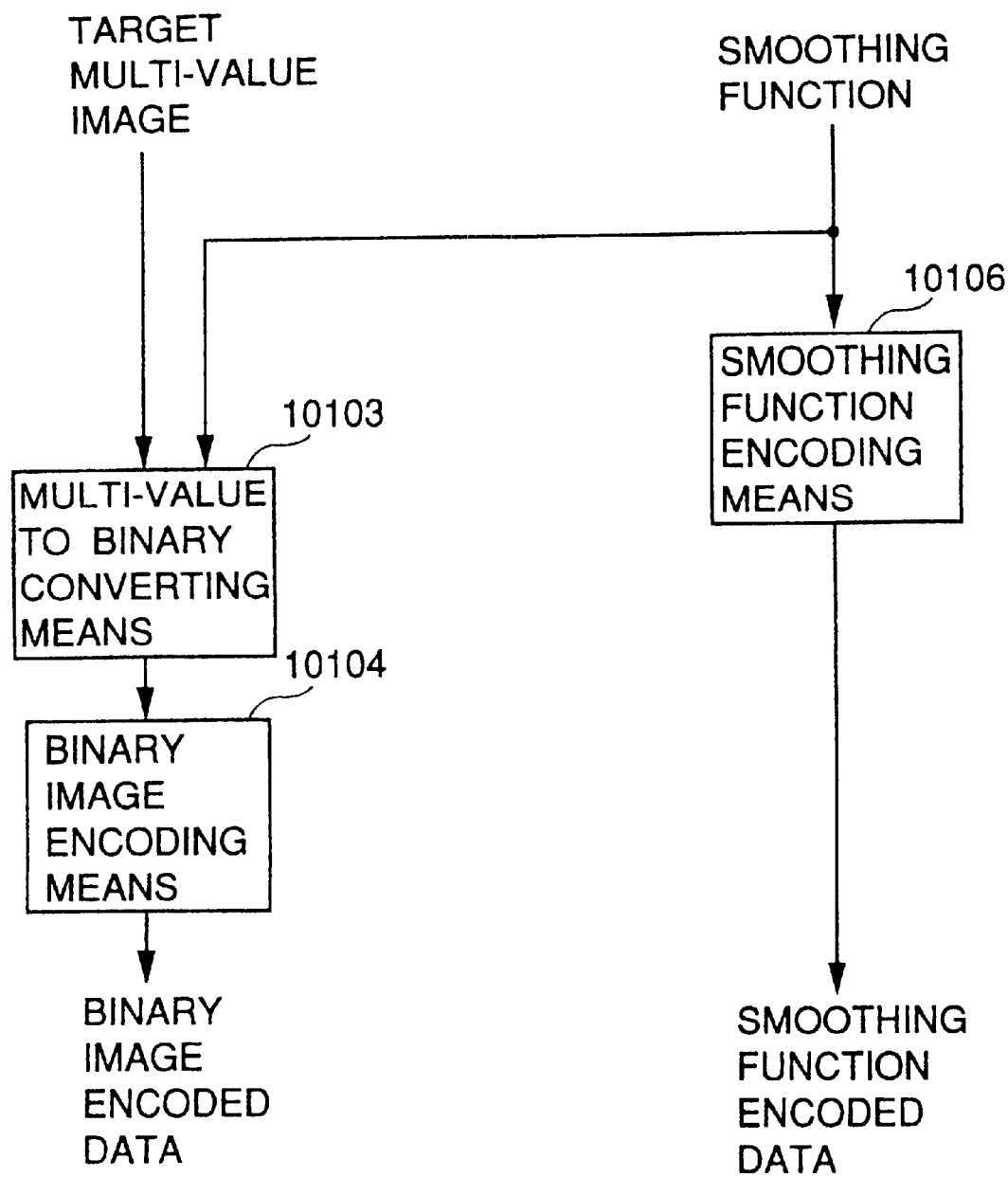
FIG. 66 is a block diagram of an image encoding apparatus according to another embodiment of the present invention.

Furthermore, the image encoding apparatus of the present invention has been described in the above embodiments as including the smoothing function estimating means, but this is not an essential condition; for example; a configuration that does not include the smoothing function estimating means is also possible. In that case, the image encoding apparatus comprises, as shown in FIG. 66, multi-value to binary converting means for taking a target multi-value image to be encoded and a smoothing function as inputs, and for generating a binary image from the multi-value image on the basis of the smoothing function; binary image encoding means for encoding the binary image and outputting the same as binary image encoded data; and smoothing function encoding means for encoding the smoothing function and outputting the same as smoothing function encoded data. The smoothing function is a predetermined function so adjusted that the original multi-value image could, in effect or in approximation fashion, be reproduced if the smoothing function were applied to the binary image. According to this configuration, the target multi-value image to be encoded and the smoothing function are input; the binary image is generated from the multi-value image on the basis of the smoothing function; the binary image is encoded and output as the binary image encoded data; and the smoothing function is encoded and output as the smoothing function encoded data. In this case also, approximately the same effects as those achieved in the first described configuration can be obtained.

Figure 67:
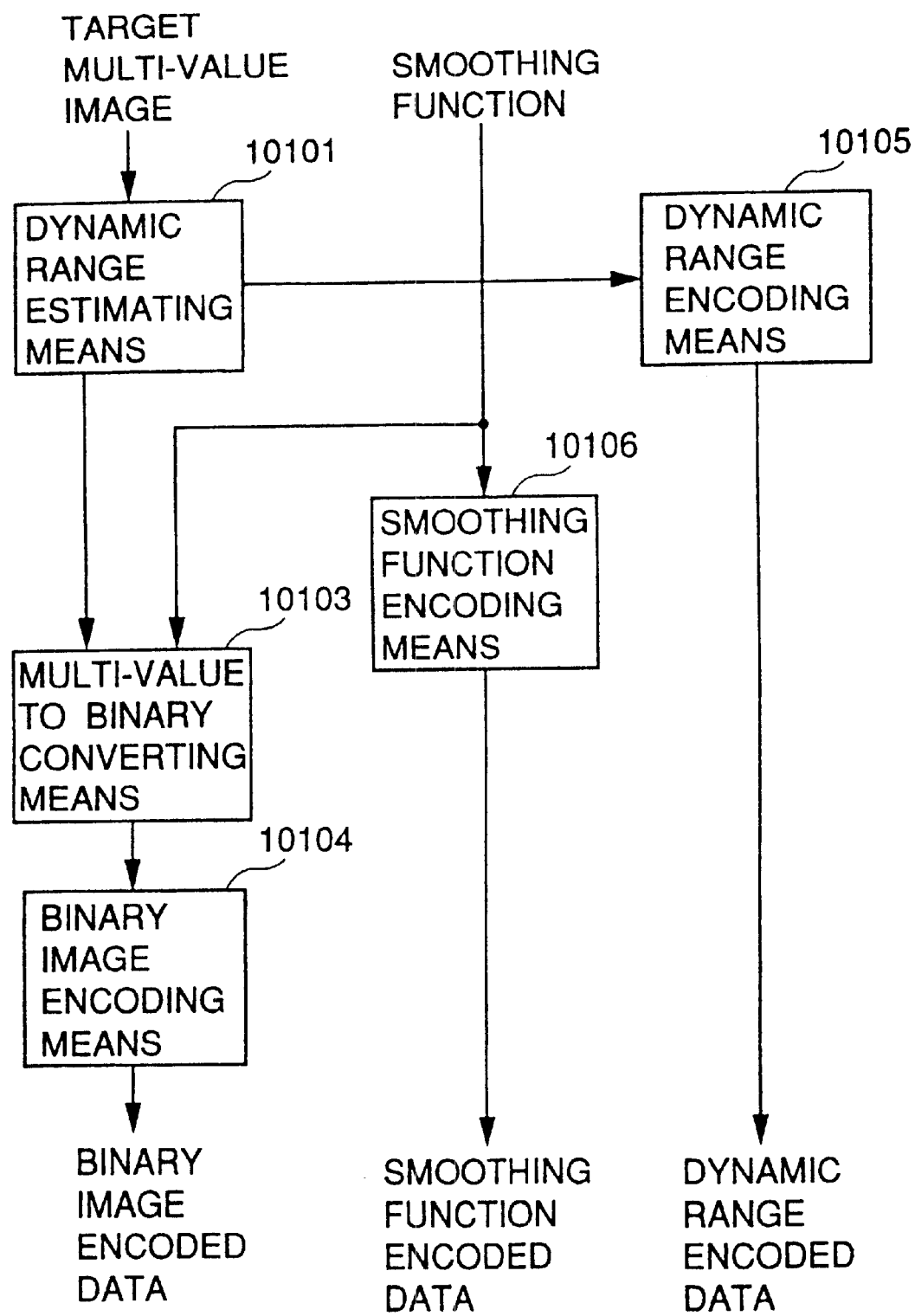
FIG. 67 is a block diagram of an image encoding apparatus in a modified example of the embodiment shown in FIG. 66.

The image encoding apparatus of the present invention has been described in the embodiment illustrated in FIG. 66 as not including the dynamic range estimating means, etc. but this is not an essential condition; for example, a configuration including the dynamic range estimating means, etc. is also possible. In that case, the image encoding apparatus comprises, in addition to the elements shown in FIG. 66, the dynamic range estimating means for obtaining the dynamic range from the target multi-value image and the dynamic range encoding means for encoding the dynamic range and outputting the same as dynamic range encoded data, as shown in FIG. 67. In this configuration, the multi-value to binary converting means generates the binary image by also considering the dynamic range. In operation, this configuration involves, in addition to the operation described in connection with the configuration of FIG. 66, obtaining the dynamic range from the target multi-value image, encoding the dynamic range, and outputting the same as the dynamic range encoded data.

Figure 68:
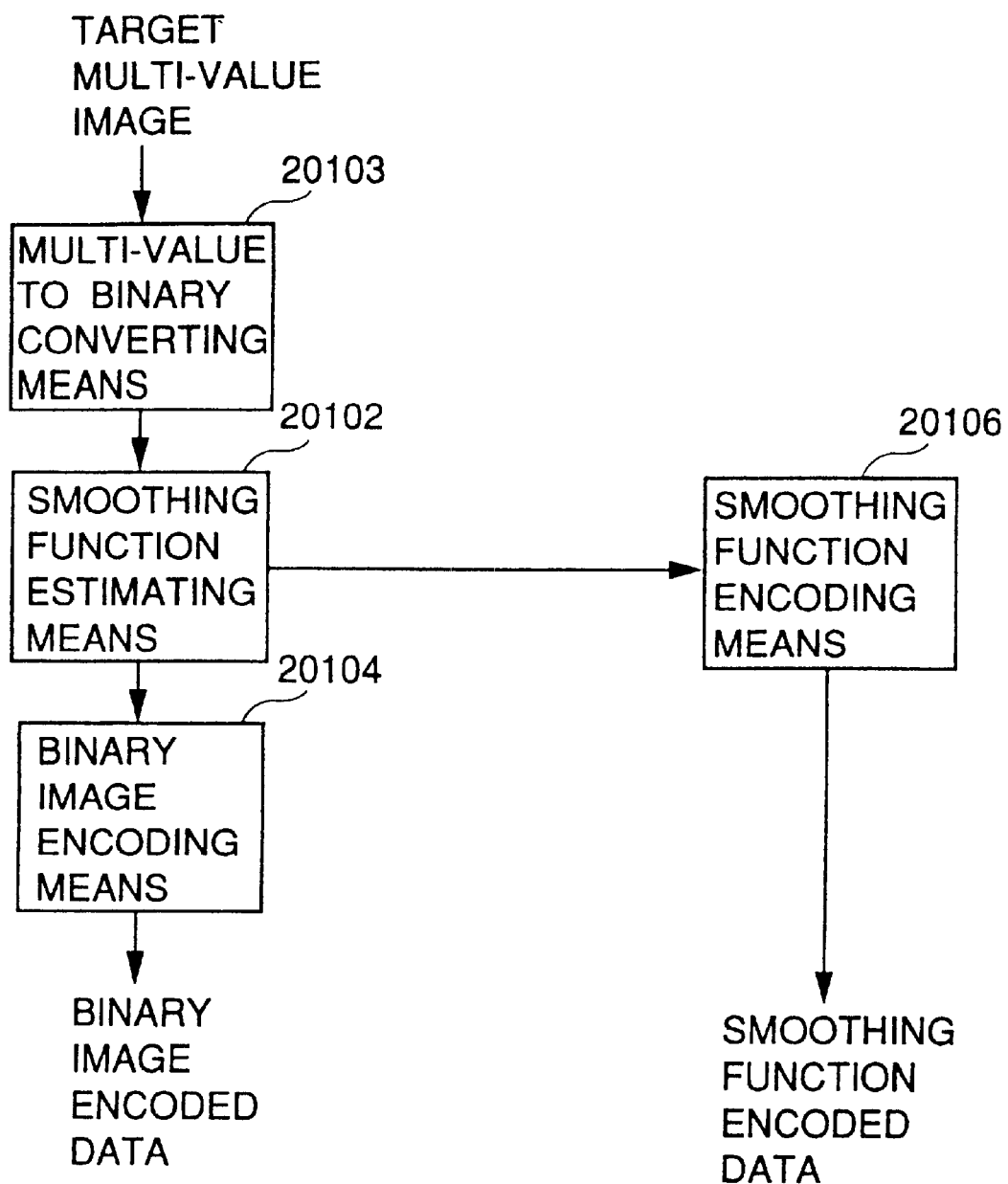
FIG. 68 is a block diagram of an image encoding apparatus in a modified example of the B11st embodiment.

Furthermore, the image encoding apparatus of the present invention has been described in the embodiment illustrated in FIG. 64 as including the dynamic range estimating means, etc. but this is not an essential condition; for example, a configuration that does not include the dynamic range estimating means, etc. is also possible. In that case, the image encoding apparatus comprises, as shown in FIG. 68, multi-value to binary converting means (20103) for converting a target multi-value image, the image to be encoded, to a binary image in accordance with a multi-value to binary conversion criterion determined to match the multi-value image; smoothing function estimating means (20102) for estimating a smoothing function such that the original multi-value image could, in effect or in approximation fashion, be reproduced if the same smoothing function is applied to the binary image; binary image encoding means (20104) for encoding the binary image and outputting the same as binary image encoded data; and smoothing function encoding means (20106) for encoding the estimated smoothing function and outputting the same as smoothing function encoded data. According to this configuration, the multi-value image is converted to the binary image in accordance with the multi-value to binary conversion criterion determined to match the target multi-value image to be encoded; the smoothing function that could, in effect or in approximation fashion, reproduce the original multi-value image if applied to the binary image is estimated; the binary image is encoded and output as the binary image encoded data; and the estimated smoothing function is encoded and output as the smoothing function encoded data. In this case also, approximately the same effects as those achieved in the first described configuration can be obtained.

Figure 69:
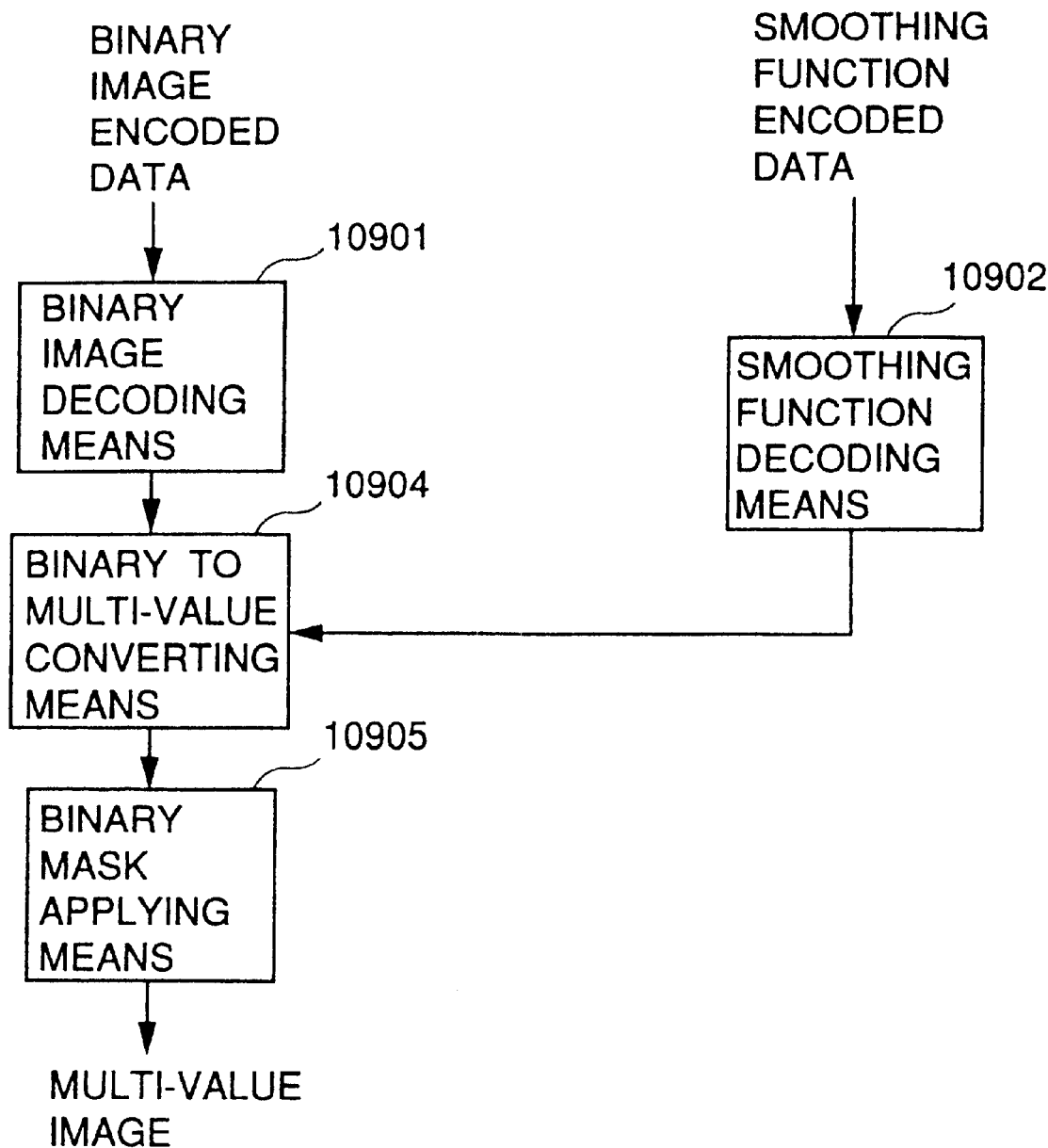
FIG. 69 is a block diagram of an image decoding apparatus according to another embodiment of the present invention.

The image decoding apparatus of the present invention has been described in the above embodiments as including the dynamic range decoding means, but this is not an essential condition; for example, a configuration that does not include the dynamic range decoding means is also possible. In that case, the image decoding apparatus has the configuration that accepts the various kinds of encoded data output from the image encoding apparatus shown in FIG. 58, 65, 66, or 68, and comprises, as shown in FIG. 69, binary image decoding means for recovering the binary image by decoding the binary image encoded data out of the encoded data; smoothing function decoding means for recovering the smoothing function by decoding the smoothing function encoded data out of the encoded data; and binary to multi-value converting means for recovering the multi-value image by smoothing the decoded binary image using the decoded smoothing function. According to this configuration, the various kinds of encoded data output from any one of the image encoding apparatuses are input; of the encoded data, the binary image encoded data is decoded to recover the binary image; of the encoded data, the smoothing function encoded data is decoded to recover the smoothing function; and the multi-value image is recovered by smoothing the decoded binary image using the decoded smoothing function. In this case also, approximately the same effects as those achieved in the first described configuration can be obtained.

As described above, using the image encoding apparatus, image decoding apparatus, image encoding method, and image decoding method of the present invention, more efficient encoding and decoding can be achieved than when using the prior art multi-value image coding techniques, for the reasons given below.

1. In a multi-value image, the distribution of intermediate values along the boundary between the maximum value region occupying a major portion of the image and the minimum value region also occupying a major portion is analyzed, and the smoothing function that provides a good approximation of the distribution is determined.

2. Based on the smoothing function determined in 1, a binary image is generated that has only two values, the maximum value and the minimum value.

3. The multi-value image is expressed by the smoothing function determined in 1 and the binary image generated in 2 and encoded accordingly.

4. At the decoder, the encoded smoothing function and binary image are decoded to reconstruct the multi-value image.

As is apparent from the above description, the present invention has the advantage of being able to achieve more efficient encoding and decoding than can be achieved with the prior art.

Industrial Applicability

As described above, according to the present invention, by predicting a pixel to be encoded, for example, from a previously obtained binary image having high correlation, and by encoding its difference, more efficient encoding and decoding can be achieved than when using prior art binary image encoding and decoding techniques. Furthermore, according to the present invention, the distribution of intermediate values, for example, is analyzed, and a smoothing function that approximates the distribution and a binary base image that has only two values, the maximum value and the minimum value, are respectively encoded and then decoded, thereby achieving more efficient encoding and decoding than can be achieved with the prior art.

What is claimed is:

1. An image encoding method for encoding a target binary image using a reference binary image, comprising the steps of:

dividing the target binary image into target blocks, each block containing a plurality of pixels;

dividing the reference binary image into reference blocks, each block containing a plurality of pixels;

selecting a statistical model from a plurality of statistical models, based on the states of pixels surrounding a reference pixel in each reference block, said reference pixel corresponding to a target pixel in each target block; and providing encoded data for said each target block by arithmetic encoding said target pixel based on said selected statistical model.

2. An image encoding method according to claim 1, wherein said pixels surrounding said reference pixel in said reference block are pixels positioned within one pixel distance from said reference pixel.

3. An image encoding method according to claim 1, wherein said pixels surrounding said reference pixel in said reference block are four pixels positioned immediately above, immediately beneath, immediately left and immediately right for said reference pixel.

4. An image encoding method according to claim 1, 2, or 3, wherein said selected statistical model is based on the states of pixels surrounding said target pixel.

5. An image encoding method according to claim 4, wherein said pixels surrounding said target pixel are positioned immediately above, immediately left, immediately left-above and immediately right above from said target pixel.

6. An image encoding apparatus for encoding a target binary image by using a reference binary image, said image encoding apparatus comprising:

a first blocking device which provides a target block containing a plurality of pixels from said target binary image;

a second blocking device which provides a reference block containing a plurality of pixels from said reference binary image;

a statistical model selecting device which selects a statistical model from a plurality of statistical models, based on the states of pixels surrounding a reference pixel in said reference block, said reference pixel corresponding to a target pixel in said target block; and an arithmetic encoding device which provides encoded data for said target block by arithmetic encoding said target pixel based on said selected statistical model.

7. An image encoding apparatus according to claim 6, wherein said pixels surrounding said reference pixel in said reference block are pixels positioned within one pixel distance from said reference pixel.

8. An image encoding apparatus according to claim 6, wherein said pixels surrounding said reference pixel in said reference block are four pixels positioned immediately above, immediately beneath, immediately left and immediately right for said reference pixel.

9. An image encoding apparatus according to claim 6, 7, or 8, wherein said selected statistical model is based on the states of pixels surrounding said target pixel.

10. An image encoding apparatus for encoding a target binary image by using a reference binary image, said image encoding apparatus comprising:

first blocking means of providing a target block containing a plurality of pixels from said target binary image;

second blocking means of providing a reference block containing a plurality of pixels from said reference binary image;

statistical model selecting means of selecting a statistical model from a plurality of statistical models, based on the states of pixels surrounding a reference pixel in said reference block, said reference pixel corresponding to a target pixel in said target pixel in said target block; and arithmetic encoding means of providing encoded data for said target block by arithmetic encoding said target pixel based on said selected statistical model.

11. An image encoding apparatus according to claim 10, wherein said pixels surrounding said reference pixel in said reference block are pixels positioned within one pixel distance from said reference pixel.

12. An image encoding apparatus according to claim 10, wherein said pixels surrounding said reference pixel in said reference block are four pixels positioned immediately above, immediately beneath, immediately left and immediately right for said reference pixel.

13. An image encoding apparatus according to claim 10, 11, or 12, wherein said selected statistical model is based on the states of pixels surrounding said target pixel.

14. An image encoding apparatus according to claim 13, wherein said pixels surrounding said target pixel are positioned immediately above, immediately left, immediately left-above and immediately right-above from said target pixel.

15. An image encoding method for encoding a target binary image using a reference binary image on a block basis, comprising the steps of:

dividing the target binary image into target blocks, each block containing a plurality of pixels;

providing a motion compensated block for said target block from said reference binary image using a motion compensation, said motion compensated block containing a plurality of pixels;

selecting a statistical model from a plurality of statistical models, based on the states of pixels surrounding a reference pixel in said motion compensated block, said reference pixel corresponding to a target pixel in said target block; and providing encoded data for said target block by arithmetic encoding said target pixel based on said selected statistical model.

* * * * *

UNITED STATES PATENT AND TRADEMARK OFFICE
CERTIFICATE OF CORRECTION

PATENT NO.   : 6,760,480 B2
DATED        : July 6, 2004
INVENTOR(S)  : Koichi Hata et al.

It is certified that error appears in the above-identified patent and that said Letters Patent is hereby corrected as shown below:

Title page,
Item [62], Related U.S. Application Data, after "Pat. No. 6,404,932" insert -- filed as application No. PCT/JP97/02591 on July 25, 1997 --.

Signed and Sealed this

Twelfth Day of April, 2005

JON W. DUDAS
*Director of the United States Patent and Trademark Office*